(12) United States Patent
Kirchhoff et al.

(10) Patent No.: US 8,369,311 B1
(45) Date of Patent: Feb. 5, 2013

(54) METHODS AND SYSTEMS FOR PROVIDING TELEPHONY SERVICES TO FIXED AND MOBILE TELEPHONIC DEVICES

(75) Inventors: Leland W. Kirchhoff, Santa Barbara, CA (US); David S. Trandal, Santa Barbara, CA (US); Colin Kelley, Santa Barbara, CA (US)

(73) Assignee: Callwave Communications, LLC, Santa Barbara, CA (US)

( * ) Notice: Subject to any disclaimer, the term of this patent is extended or adjusted under 35 U.S.C. 154(b) by 1659 days.

(21) Appl. No.: 11/496,968

(22) Filed: Aug. 1, 2006

Related U.S. Application Data

(63) Continuation-in-part of application No. 11/480,277, filed on Jun. 30, 2006.

(60) Provisional application No. 60/696,135, filed on Jul. 1, 2005, provisional application No. 60/752,521, filed on Dec. 20, 2005, provisional application No. 60/704,522, filed on Aug. 1, 2005.

(51) Int. Cl.
  *H04L 12/66* (2006.01)
  *H04M 3/42* (2006.01)
  *H04M 11/10* (2006.01)

(52) U.S. Cl. .............. 370/352; 379/207.12; 455/413

(58) Field of Classification Search ........... 370/260, 370/352–356; 379/93.24, 207.12; 455/413
See application file for complete search history.

(56) References Cited

U.S. PATENT DOCUMENTS

| | | |
|---|---|---|
| 3,936,613 A | 2/1976 | Nishigori et al. |
| 3,956,595 A | 5/1976 | Sobanski |
| 4,009,337 A | 2/1977 | Sakai et al. |
| 4,022,983 A | 5/1977 | Braun et al. |
| 4,277,649 A | 7/1981 | Sheinbein |
| 4,485,470 A | 11/1984 | Reali |
| 4,736,405 A | 4/1988 | Akiyama |
| 4,809,321 A | 2/1989 | Morganstein et al. |
| 4,850,007 A | 7/1989 | Marino et al. |
| 4,893,336 A | 1/1990 | Wuthnow |
| 4,994,926 A | 2/1991 | Gordon et al. |
| 5,040,208 A | 8/1991 | Jolissaint |
| 5,046,087 A | 9/1991 | Sakai |
| 5,291,302 A | 3/1994 | Gordon et al. |
| 5,321,740 A | 6/1994 | Gregorek et al. |
| 5,361,295 A | 11/1994 | Solomon et al. |
| 5,384,831 A | 1/1995 | Creswell et al. |
| 5,404,537 A | 4/1995 | Olnowich et al. |
| 5,434,908 A | 7/1995 | Klein |
| 5,440,620 A | 8/1995 | Slusky |
| 5,448,625 A | 9/1995 | Lederman |

(Continued)

FOREIGN PATENT DOCUMENTS

| | | |
|---|---|---|
| CA | 1329852 | 9/1989 |
| EP | 1 120 954 | 8/2001 |

(Continued)

OTHER PUBLICATIONS

Johnson, Dave; Article; "Now You're Talking—voice—response systems for home offices—Product Information"; http://www.findarticles.com; Feb. 1999.

*Primary Examiner* — Chandrahas Patel
*Assistant Examiner* — Joel Hamel
(74) *Attorney, Agent, or Firm* — Knobbe, Martens, Olson & Bear LLP

(57) ABSTRACT

The present invention relates generally to telecommunications and in particular to systems and methods for routing telephone calls. A first address, such as a first phone number, can be associated with a telephonic terminal, such as a fixed or mobile phone. Incoming calls to the first address can be routed using an Internet Protocol, such as SIP, or other protocol to the telephonic terminal or to other destinations based on telephonic terminal status and/or based on a user instruction.

103 Claims, 22 Drawing Sheets

U.S. PATENT DOCUMENTS

| | | |
|---|---|---|
| 5,459,584 A | 10/1995 | Gordon et al. |
| 5,467,388 A | 11/1995 | Redd, Jr. et al. |
| 5,509,052 A | 4/1996 | Chia et al. |
| 5,526,524 A | 6/1996 | Madduri |
| 5,533,102 A | 7/1996 | Robinson et al. |
| 5,533,106 A | 7/1996 | Blumhardt |
| 5,548,636 A | 8/1996 | Bannister et al. |
| 5,577,111 A | 11/1996 | Iida et al. |
| 5,583,918 A | 12/1996 | Nakagawa |
| 5,619,557 A | 4/1997 | Van Berkum |
| 5,640,677 A | 6/1997 | Karlsson |
| 5,651,054 A | 7/1997 | Dunn et al. |
| 5,668,861 A | 9/1997 | Watts |
| 5,751,795 A | 5/1998 | Hassler et al. |
| 5,774,067 A | 6/1998 | Olnowich et al. |
| 5,805,587 A | 9/1998 | Norris et al. |
| 5,809,128 A | 9/1998 | McMullin |
| 5,812,551 A | 9/1998 | Tsukazoe et al. |
| 5,825,867 A | 10/1998 | Epler et al. |
| 5,832,060 A | 11/1998 | Corlett et al. |
| 5,835,570 A | 11/1998 | Wattenbarger |
| 5,835,573 A | 11/1998 | Dee et al. |
| 5,862,208 A | 1/1999 | MeLampy et al. |
| 5,894,504 A | 4/1999 | Alfred et al. |
| 5,912,948 A | 6/1999 | Nelson et al. |
| 5,940,484 A | 8/1999 | DeFazio et al. |
| 5,946,386 A | 8/1999 | Rogers et al. |
| 5,960,064 A | 9/1999 | Foladare et al. |
| 5,960,073 A | 9/1999 | Kikinis et al. |
| 5,963,629 A | 10/1999 | Jung |
| 5,991,367 A | 11/1999 | Robuck |
| 5,995,594 A | 11/1999 | Shaffer et al. |
| 5,995,603 A | 11/1999 | Anderson |
| 5,999,806 A | 12/1999 | Kaplan et al. |
| 6,014,436 A | 1/2000 | Florence et al. |
| 6,023,503 A | 2/2000 | Schneider et al. |
| 6,031,896 A | 2/2000 | Gardell et al. |
| 6,032,051 A | 2/2000 | Hall et al. |
| 6,034,956 A | 3/2000 | Olnowich et al. |
| 6,035,031 A | 3/2000 | Silverman |
| 6,041,103 A | 3/2000 | La Porta et al. |
| 6,044,059 A | 3/2000 | Olnowich |
| 6,055,430 A | 4/2000 | Cooper et al. |
| 6,078,581 A | 6/2000 | Shtivelman et al. |
| 6,084,628 A | 7/2000 | Sawyer |
| 6,100,873 A | 8/2000 | Bayless et al. |
| 6,101,249 A | 8/2000 | Weber |
| 6,104,800 A | 8/2000 | Benson |
| 6,144,644 A | 11/2000 | Bajzath et al. |
| 6,160,881 A | 12/2000 | Beyda et al. |
| 6,167,127 A | 12/2000 | Smith et al. |
| 6,169,795 B1 | 1/2001 | Dunn et al. |
| 6,169,796 B1 | 1/2001 | Bauer et al. |
| 6,173,054 B1 | 1/2001 | Beyda et al. |
| 6,175,622 B1 | 1/2001 | Chiniwala et al. |
| 6,178,183 B1 | 1/2001 | Buskirk, Jr. |
| 6,181,691 B1 | 1/2001 | Markgraf et al. |
| 6,208,638 B1 | 3/2001 | Rieley et al. |
| 6,212,261 B1 | 4/2001 | Meubus et al. |
| 6,230,009 B1 | 5/2001 | Holmes et al. |
| 6,243,378 B1 | 6/2001 | Olnowich |
| 6,253,249 B1 | 6/2001 | Belzile |
| 6,278,704 B1 | 8/2001 | Creamer et al. |
| 6,292,478 B1 | 9/2001 | Farris |
| 6,304,565 B1 | 10/2001 | Ramamurthy |
| 6,310,939 B1 | 10/2001 | Varney |
| 6,337,898 B1 | 1/2002 | Gordon |
| 6,350,066 B1 | 2/2002 | Bobo, II |
| 6,353,660 B1 | 3/2002 | Burger et al. |
| 6,353,663 B1 | 3/2002 | Stevens et al. |
| 6,363,414 B1 | 3/2002 | Nicholls et al. |
| 6,374,102 B1 | 4/2002 | Brachman et al. |
| 6,381,459 B1 | 4/2002 | Gervens et al. |
| 6,400,806 B1 | 6/2002 | Uppaluru |
| 6,405,035 B1 | 6/2002 | Singh |
| 6,411,601 B1 | 6/2002 | Shaffer et al. |
| 6,411,692 B1 | 6/2002 | Scherer |
| 6,411,805 B1 | 6/2002 | Becker et al. |
| 6,438,216 B1 | 8/2002 | Aktas |
| 6,438,222 B1 | 8/2002 | Burg |
| 6,477,246 B1 | 11/2002 | Dolan et al. |
| 6,496,569 B2 | 12/2002 | Pelletier et al. |
| 6,496,576 B2 | 12/2002 | Tanaka et al. |
| 6,501,750 B1 | 12/2002 | Shaffer et al. |
| 6,505,163 B1 | 1/2003 | Zhang et al. |
| 6,510,162 B1 | 1/2003 | Fijolek et al. |
| 6,510,417 B1 | 1/2003 | Woods et al. |
| 6,512,930 B2 | 1/2003 | Sandegren |
| 6,519,258 B1 | 2/2003 | Tsukazoe et al. |
| 6,529,587 B1 | 3/2003 | Cannon et al. |
| 6,539,084 B1 | 3/2003 | Long |
| 6,545,589 B1 | 4/2003 | Fuller et al. |
| 6,546,087 B2 | 4/2003 | Shaffer et al. |
| 6,549,612 B2 | 4/2003 | Gifford et al. |
| 6,553,222 B1 | 4/2003 | Weiss |
| 6,564,264 B1 | 5/2003 | Creswell et al. |
| 6,564,321 B2 | 5/2003 | Bobo, II |
| 6,567,505 B1 | 5/2003 | Omori et al. |
| 6,574,319 B2 | 6/2003 | Latter et al. |
| 6,614,896 B1 | 9/2003 | Rao |
| 6,621,892 B1 | 9/2003 | Banister et al. |
| 6,631,186 B1 | 10/2003 | Adams et al. |
| 6,643,034 B1 | 11/2003 | Gordon et al. |
| 6,647,257 B2 | 11/2003 | Owensby |
| 6,658,100 B1 | 12/2003 | Lund |
| 6,658,250 B1 | 12/2003 | Ganesan et al. |
| 6,658,254 B1 | 12/2003 | Purdy et al. |
| 6,661,785 B1 | 12/2003 | Zhang et al. |
| 6,661,886 B1 | 12/2003 | Huart et al. |
| 6,662,232 B1 | 12/2003 | Nicholls et al. |
| 6,690,785 B1 | 2/2004 | Stelter et al. |
| 6,748,058 B1 * | 6/2004 | Schwend et al. ........... 379/88.21 |
| 6,751,299 B1 | 6/2004 | Brown et al. |
| 6,775,370 B2 | 8/2004 | Burg |
| 6,782,088 B1 | 8/2004 | Gabara |
| 6,785,021 B1 | 8/2004 | Gordon et al. |
| 6,792,094 B1 | 9/2004 | Kirkpatrick |
| 6,829,332 B2 | 12/2004 | Farris et al. |
| 6,857,074 B2 | 2/2005 | Bobo, II |
| 6,898,275 B2 | 5/2005 | Dolan et al. |
| 6,937,699 B1 | 8/2005 | Schuster et al. |
| 6,968,174 B1 | 11/2005 | Trandal et al. |
| 7,003,087 B2 | 2/2006 | Spencer et al. |
| 7,006,455 B1 * | 2/2006 | Fandrianto et al. ........... 370/260 |
| 7,043,232 B2 | 5/2006 | Pelaez et al. |
| 7,120,455 B1 | 10/2006 | Chen et al. |
| 7,209,964 B2 | 4/2007 | Dugan et al. |
| 7,231,029 B1 | 6/2007 | Kirkpatrick |
| 7,254,219 B1 | 8/2007 | Hansen et al. |
| 7,382,773 B2 | 6/2008 | Schoeneberger et al. |
| 7,388,949 B2 | 6/2008 | Contractor et al. |
| 7,409,048 B2 | 8/2008 | Trandal et al. |
| 7,412,050 B2 | 8/2008 | Renner et al. |
| 7,433,454 B2 | 10/2008 | Watanabe |
| 7,522,580 B2 | 4/2009 | Miller et al. |
| 7,548,756 B2 | 6/2009 | Velthius et al. |
| 7,688,958 B2 | 3/2010 | Dolan et al. |
| 7,839,987 B1 | 11/2010 | Kirchhoff et al. |
| 8,041,604 B1 | 10/2011 | Glaser |
| 2002/0009184 A1 | 1/2002 | Shnier |
| 2002/0010616 A1 | 1/2002 | Itzhaki |
| 2002/0035616 A1 | 3/2002 | Diamond et al. |
| 2002/0097710 A1 | 7/2002 | Burg |
| 2003/0039339 A1 | 2/2003 | Luehrig et al. |
| 2003/0055974 A1 | 3/2003 | Brophy et al. |
| 2003/0063731 A1 | 4/2003 | Woodring |
| 2003/0095541 A1 | 5/2003 | Chang et al. |
| 2003/0108172 A1 * | 6/2003 | Petty et al. ............... 379/142.08 |
| 2003/0108178 A1 * | 6/2003 | Nguyen et al. ........... 379/220.01 |
| 2003/0123076 A1 | 7/2003 | Hussain et al. |
| 2003/0128691 A1 | 7/2003 | Bergman et al. |
| 2003/0156700 A1 | 8/2003 | Brown et al. |
| 2003/0191823 A1 | 10/2003 | Bansal et al. |
| 2003/0215078 A1 | 11/2003 | Brahm et al. |
| 2004/0028203 A1 | 2/2004 | Wurster et al. |
| 2004/0066926 A1 | 4/2004 | Brockbank et al. |
| 2004/0073566 A1 | 4/2004 | Trivedi |

| | | |
|---|---|---|
| 2004/0105536 A1 | 6/2004 | Williams |
| 2004/0141594 A1* | 7/2004 | Brunson et al. ............ 379/88.12 |
| 2004/0141598 A1 | 7/2004 | Moss et al. |
| 2004/0174983 A1 | 9/2004 | Olschwang et al. |
| 2004/0190706 A1 | 9/2004 | Fleischer, III et al. |
| 2004/0196867 A1* | 10/2004 | Ejzak et al. ................... 370/468 |
| 2004/0240641 A1 | 12/2004 | Cohen et al. |
| 2004/0247105 A1 | 12/2004 | Mullis et al. |
| 2004/0249650 A1 | 12/2004 | Freedman et al. |
| 2004/0258220 A1 | 12/2004 | Levine et al. |
| 2005/0010573 A1 | 1/2005 | Garg |
| 2005/0025295 A1 | 2/2005 | Christie |
| 2005/0053216 A1 | 3/2005 | Spencer et al. |
| 2005/0078612 A1 | 4/2005 | Lang |
| 2005/0117726 A1 | 6/2005 | DeMent et al. |
| 2005/0123118 A1 | 6/2005 | Terry et al. |
| 2005/0152525 A1* | 7/2005 | Kent et al. ................ 379/207.02 |
| 2005/0186950 A1 | 8/2005 | Jiang |
| 2005/0201362 A1* | 9/2005 | Klein et al. ................... 370/352 |
| 2005/0207432 A1* | 9/2005 | Velez-Rivera et al. ........ 370/401 |
| 2005/0207556 A1 | 9/2005 | Gonzalez et al. |
| 2005/0215229 A1 | 9/2005 | Cheng |
| 2005/0265322 A1 | 12/2005 | Hester |
| 2005/0265349 A1 | 12/2005 | Garg |
| 2005/0286498 A1 | 12/2005 | Rand et al. |
| 2006/0013374 A1 | 1/2006 | Fleischer, III et al. |
| 2006/0077957 A1* | 4/2006 | Reddy et al. ................... 370/352 |
| 2007/0003047 A1 | 1/2007 | Batni et al. |
| 2007/0116227 A1 | 5/2007 | Vitenson et al. |
| 2007/0153999 A1 | 7/2007 | Daigle |
| 2007/0160188 A1 | 7/2007 | Sharpe et al. |
| 2007/0217584 A1 | 9/2007 | Bi et al. |
| 2009/0100027 A1 | 4/2009 | Malik |
| 2010/0008356 A1 | 1/2010 | Boni et al. |
| 2010/0142685 A1 | 6/2010 | Dolan et al. |
| 2012/0022950 A1 | 1/2012 | Gilbert et al. |

FOREIGN PATENT DOCUMENTS

| | | |
|---|---|---|
| EP | 1120954 | 8/2001 |
| JP | 10-513632 | 12/1998 |
| JP | 11-506292 | 6/1999 |
| JP | 2001-168989 | 6/2001 |
| WO | WO 97/26749 | 7/1997 |
| WO | WO 00 60840 | 10/2000 |
| WO | WO 01/76210 | 10/2001 |

* cited by examiner

METHODS AND SYSTEMS FOR PROVIDING TELEPHONY SERVICES TO FIXED AND MOBILE TELEPHONIC DEVICES

PRIORITY CLAIM

This application is a continuation-in-part of U.S. patent application Ser. No. 11/480,277, filed, Jun. 30, 2006, which claims priority from U.S. Patent Application No. 60/696,135, filed Jul. 1, 2005, and U.S. Patent Application No. 60/752,521, filed Dec. 20, 2005, and this application further claims priority from U.S. Patent Application No. 60/704,522, filed Aug. 1, 2005, the contents of which are incorporated herein in their entirety.

BACKGROUND OF THE INVENTION

1. Field of the Invention

The present invention relates generally to telecommunications and in particular to systems and methods for routing telephone calls.

2. Description of the Related Art

People are increasingly associated with more phone numbers and phone types. For example, a person may be associated with a cell phone number, a work phone number, a home phone number, and a Voice Over IP (VoIP) phone number. It has thus become more difficult for a caller attempting to reach someone to decide which phone number to call.

SUMMARY OF THE INVENTION

An example embodiment provides systems and methods for routing telephone calls.

An example embodiment provides a method of processing calls, the method comprising: receiving over a network at a call processing system a first call from a calling party directed to a called party's phone address, wherein signaling information associated with the first call includes the calling party's phone address; originating a second call from the call processing system to a telephonic device associated with the called party, wherein the telephonic device is coupled to a broadband data connection; transmitting, while the first call is in progress, a call alert notification regarding the first call, including at least a portion of the signaling information, to a networked computer associated with the called party via a communication channel; bridging the first call with the second call and the communication channel associated with the networked computer; providing a greeting to the calling party via the call processing system; receiving a voice communication from the calling party at the processing system; streaming at least a first portion of the voice communication via the call processing system in substantially real time to the telephonic device and/or the networked computer while ensuring that sound does not travel back to the calling party from the telephonic device or networked computer associated with the called party to thereby allow the called party to screen the caller call from the telephonic device or networked computer while the calling party is unaware that the call screening is being performed; providing a first user interface via the telephonic device or networked computer that when a first input is provided by the called party, causes duplex communication to be provided to the telephonic device or networked computer so that the called party can converse with the calling party; and providing a second user interface via the telephonic device or networked computer that, when a second input is provided by the called party, at least in part causes a third call to be originated to another telephonic device and/or networked computer.

An example embodiment provides a method of processing calls, the method comprising: receiving over a network at a call processing system a first call from a caller directed to a first phone address of the called party, wherein signaling information associated with the first call includes the phone address of the caller; originating a second call from the call processing system to a telephonic destination coupled to a data network and associated with the called party, wherein signaling information associated with the second call includes an identifier associated with the caller; enabling the called party to screen the caller prior to providing full duplex communication between the caller and the called party; and using an Internet protocol to cause the caller and the called party to be connected with full duplex communication.

An example embodiment provides a method of processing calls, the method comprising: receiving over a data network at a call processing system a first call from a caller directed to a called party's first phone address, wherein signaling information associated with the first call includes the caller's phone address; querying a wireless network system for the status and/or phone address of a wireless telephonic destination associated with the called party's phone address; originating a second call from the call processing system to the wireless telephonic destination associated with the called party; transmitting, while the first call is in progress, a call alert notification of the first call, the call alert notification including at least a portion of the signaling information, to a networked computer associated with the called party; and bridging the first call with the second call.

An example embodiment provides a method of processing calls, the method comprising: receiving over a network at a call processing system a first call from a caller; providing a greeting to the caller via the call processing system; receiving a voice communication from the caller at the processing system; streaming at least a first portion of the voice communication via the call processing system in substantially real time to a telephonic device having a broadband connection and associated with the called party while ensuring that sound does not travel back to the caller from the telephonic device to thereby allow the called party to screen the call from the telephonic device while the caller is unaware that their call is being screened; and providing a first user interface via the telephonic device, wherein the called party provides a first user interface input, the first input is then received at the call processing system using an Internet protocol, and full duplex communication with the caller is provided to the telephonic device.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

DETAILED DESCRIPTION OF PREFERRED EMBODIMENTS

Figure 1:
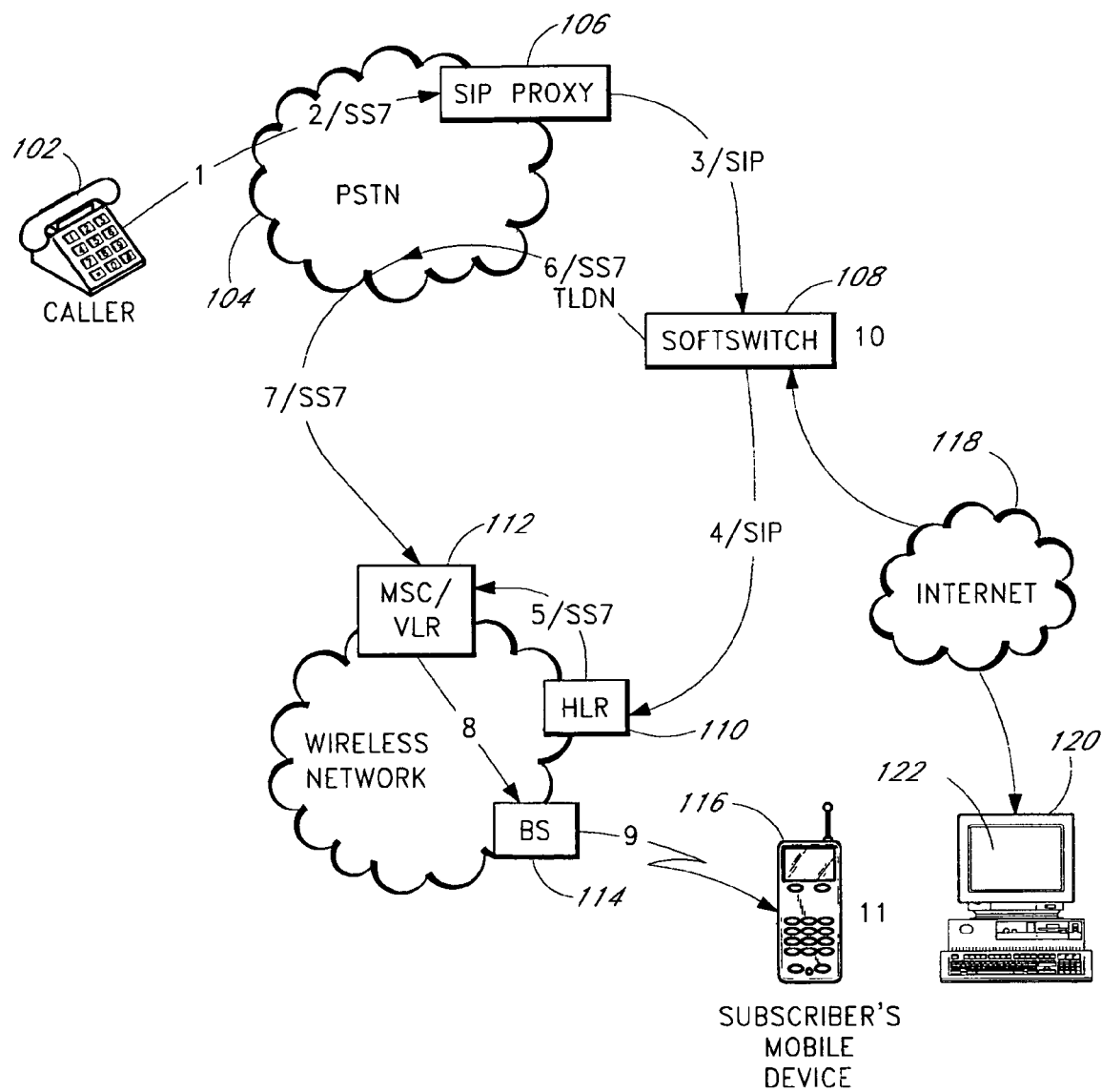
FIG. 1 illustrates an example telecommunications system and an example call handling sequence.

Embodiments described herein enable the provisioning of enhanced call processing services for calls directed to or from a phone address, such as a phone address associated with a mobile telecommunications device, such as a cell phone. Certain example embodiments described herein relate to call processing of calls directed to or from a phone (e.g., a fixed phone), optionally shared by multiple users. In certain embodiments one or more of the users sharing a phone may also have a personal phone (e.g., a phone that typically is not shared by more than one user), such as a mobile cell phone.

Throughout the following description, the term "Web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well. In addition, unless otherwise indicated, the functions described herein are preferably performed by executable code and instructions running on one or more general-purpose computers. However, the present invention can also be implemented using special purpose computers, state machines, and/or hardwired electronic circuits.

With respect to the example processes disclosed herein, not all states need to be reached, and the states do not necessarily need to be performed in the same order as that illustrated. Unless otherwise specified, the term phone number refers generally to a telephonic address, such as, without limitation, a standard POTs telephone number, an E.164 phone number (ITU-T recommendation which defines the international public telecommunication numbering plan and telephone format used in the PSTN and certain data networks), or a VoIP address.

Optionally, the VoIP processes described herein are performed using the H.323 standardized protocol established by the International Telecommunications Union (ITU). Advantageously, H.323 provides specifications for real-time, interactive videoconferencing, data sharing and audio applications such as IP telephony. The Session Initiation Protocol (SIP), established by the Internet Engineering Task Force (IETF), can optionally be used. SIP is generally more efficient than the H.323 protocol as SIP is specifically intended for IP telephony. Proprietary protocols can also be used.

SIP, by way of example, enables one or more of the following services to be provided, using proxy servers and end user client systems:

1. Call forwarding: call forwarding can be provided in response to one or more of the following conditions: ring—no answer, busy, unconditional call forwarding, address manipulations (such as permanent numbers {e.g. 700 numbers}, free phone numbers {e.g. 800, 866 numbers}, and paid information numbers {e.g. 900 numbers}).
2. Call recipient and calling number identification
3. Personal mobility
4. Caller and call recipient authentication
5. Invitations to a multicast conference
6. Basic Automatic Call Distribution (ACD)

A call may be routed partially over the Internet, using SIP, and partially over a circuit-switched network, such as a PSTN (public switched telephone network). The PSTN may utilize a variety of signaling and other standards, such as the SS7 signaling protocol. Thus, calls disclosed herein (e.g., calls to the softswitch disclosed herein, and outbound calls from the softswitch, including call transfers and/or conferenced calls), can be associated with SS7 signaling, SIP signaling, ISDN-PRI signaling and/or other types of signaling. In addition, calls disclosed herein may originate over the PSTN, a VoIP network, or other network-type.

SIP is a request-response protocol. In one embodiment, SIP can be used for establishing, manipulating and tearing down user sessions, wherein several users can optionally participate in a session. A session can optionally involve multimedia elements including audio, video, instant messaging, and/or other real-time data communications. By way of further example, a session can be an Internet multimedia conference, an Internet telephone call and/or a multimedia distribution session. Optionally, session members can communicate using multicast and/or using a mesh of unicast relations.

SIP can optionally run over UDP (User Datagram Protocol), TCP, IP, ATM, X.25 and/or other protocols. In one embodiment, SIP can work in the Application layer of the Open Systems Interconnection (OSI) communications model.

In one embodiment, SIP invitations are used to create sessions. The invitation can carry session descriptions which enable participants to agree on a set of compatible media types. SIP enables user mobility by providing proxy services and redirecting requests to the user's current location. For example, users can register their current location so that calls can be directed to a telephone or other terminal corresponding to the location.

An example system that can be used to support SIP can include some or all of the following components:

1. An endpoint component, sometimes referred to as a user agent (UA), which can be a hardware and/or software device implementing or compatible with SIP, such as an Internet Protocol (IP) phone or other terminal. The endpoint components can include a client used to initiate calls and a server used to answer calls. By way of further example, a SIP Proxy, a call manager, and a SIP phone, which are discussed herein, can be SIP endpoints.
2. A SIP network server that handles signaling associated with one or more calls. By way of example, in an optional embodiment, the network server provides name resolution and user location. The SIP network server can include one or more additional servers. For example, the SIP server can include a Register server used to receive registration messages from endpoints regarding current user location. Using a mapping database, the Register server can map the SIP addresses with the physical location or locations in the domain where the endpoint is located. The SIP network server can also include a proxy system that transmits call setup and tear down information and optionally forwards SIP messages to multiple proxy servers, creating a search tree, in order for the SIP messages to reach their destination. In addition, a SIP proxy can discover endpoint characteristics of an endpoint by consulting a list of registration templates, including dynamic configuration parameters, for that endpoint. The SIP proxy (which can be in the form of a server) can aid in routing requests to a given user's current location. In addition, a SIP proxy can be used to authenticate users for services and to implement provider call-routing policies. The network server can also include a SIP Redirect server that enables endpoints to locate a desired address by redirecting one or more of the endpoint to another server.

SIP addresses can be the form of uniform resource locators (URL). By way of example, SIP addresses can optionally be embedded in Web pages. In certain applications, a user can click on a SIP address embedded in a Web or other electronic document, and in response, a call can be placed from the user terminal to the SIP address, and the user can then talk to the person or system associated with the SIP address and/or send data files to the person or system associated with the SIP address.

When making a SIP call using a SIP terminal, the SIP terminal locates the appropriate server and then sends a SIP request, such as an invitation that initiates a session. The request may directly reach the intended call recipient, or the request may be redirected or may trigger a chain of new SIP requests by proxies. If a call is to be routed through a number of different proxy servers, a redirect server can be used. When a caller's user agent sends an INVITE request to the redirect server, the redirect server contacts the location server to determine the path to the called party, and then the redirect server sends that information back to the caller. The caller terminal then acknowledges receipt of the information. The caller terminal then sends a request to the device indicated in the redirection information (which could be the call recipient terminal or another server that will forward the request). Once the request reaches the call recipient terminal, the recipient terminal transmits a response and the caller acknowledges the response.

SIP defines the following methods (commands):

SIP Method Description
INVITE Invites a user to a call
ACK Used to facilitate reliable message exchange for INVITEs
BYE Terminates a connection between users or declines a call
CANCEL Terminates a request, or search, for a user
OPTIONS Solicits information about a server's capabilities
REGISTER Registers a user's current location
INFO Used for mid-session signaling The following are SIP responses:

1xx Informational (e.g. 100 Trying, 180 Ringing)
2xx Successful (e.g. 200 OK, 202 Accepted)
3xx Redirection (e.g. 302 Moved Temporarily)
4xx Request Failure (e.g. 404 N of Found, 482 Loop Detected)
5xx Server Failure (e.g. 501 Not Implemented)
6xx Global Failure (e.g. 603 Decline)

A SIP Request line can have the following format: Method type, request, URI (SIP address of called party), SIP version.

A SIP Response line can have the following format: Status line: SIP version, response code, reason phrase.

The Real Time Protocol (RTP), Real Time Control Protocol (RTCP), and/or other appropriate protocols can be used to send audio using packets over the Internet to allow the caller and call recipient to verbally communicate. By way of example, the packets can optionally be UDP packets.

Optionally, calls directed to one more selected numbers can be routed by a SIP provider to a call processing system optionally operated by a separate entity than the SIP provider. The call processing system can provide telephone services by integrating with one or more Internet Services Providers (ISP), SIP providers and/or other telephony providers.

A SIP protocol element is optionally provided for returning mobile device status with the TLDN on the SIP Redirect that the MVNE SIP User Agent sends in response to the SIP Invite from a softswitch. The status returned includes the geographic location and whether the device is roaming.

The following is a glossary of abbreviations used herein.
ATA—Analog Telephone Adapter
B2B—Business-to-Business
B2BUA—Back-to-Back User Agent
BS—Base Station
BSP—Broadband Service Provider (e.g., a cable company or phone company that provides broadband service)
DIAMETER—AAA (authentication, authorization and accounting) protocol
Enhanced SP—Enhanced Service Provider
HLR—Home Location Register
HSS—Home Subscriber Server
LNP—Local Number Portability
MSC—Mobile Switching Center
MVNE—Mobile Virtual Network Enabler
MVNO—Mobile Virtual Network Operator
RTP—Real Time Transport Protocol
SIM—Subscriber Identity Module
SIP—Session Initiation Protocol
TLDN—Temporary Local Directory Number
VLR—Visitor Location Register VoiceXML—standard XML format for specifying interactive voice dialogues between a human and a computer VoIP—Voice over Internet Protocol VSP—VoIP Service Provider FIG. 1 illustrates an example telecommunications system and an example call handling sequence. In this example, a network enabler, such as a Mobile Virtual Network Enabler (MVNE), interfaces with an enhanced call processing service provider to provide enhanced call processing services to a subscriber such as call screening, call transfer, call conferencing, and/or distinctive ring-back. By way of example, the MVNE may offer billing and backend network elements to other entities that want to offer mobile phone services.

By way of example, the enhanced call processing service provider can be a Mobile Virtual Network Operator (MVNO) or the enhanced call processing service provider and/or an MVNE can offer some or all of the services described herein to MVNO's. By way of further example, an MVNO does not have to own a licensed frequency spectrum, and can resell wireless services under its brand name, using the network of another mobile phone operator.

In the illustrated system, a caller 102 connects to a PSTN 104. The PSTN 104 is in communication with an enhanced call processing service provider's softswitch 108 via a SIP proxy 106 (e.g., associated with a VoIP service provider) and via SS7 signaling protocol. Optionally, a caller's call may be associated with other types of signaling, such as ISDN-PRI. The PSTN 104 is also coupled to a wireless network MSC/VLR 112 using the SS7 signaling protocol. The MSC/VLR 112 is coupled to a base station 114, and the base station 114 wirelessly connects to a mobile phone 116 (e.g., a cellular phone). While the examples described herein refer to a subscriber's mobile or wireless phone, other embodiments utilize a wireline or VoIP communications terminal/phone. The phone address associated with the subscriber may have been number ported to the softswitch 108. The softswitch 108 communicates with an HLR 110 (e.g., optionally associated with an MVNE) using SIP protocol.

Optionally, the subscriber has a terminal 120 (e.g., a personal computer, smart phone, interactive television, etc.) that communicates with the softswitch 108 over a data network 118 (e.g., the Internet). The terminal is optionally equipped with a telecommunications client application 122 that receives and displays call information (e.g., in substantially real-time) regarding calls received for the subscriber at the softswitch 108. The terminal 120 is optionally equipped with a microphone, speaker, and VoIP software and can act as a telephonic device (e.g., a VoIP phone).

Optionally, the softswitch 108 can stream voice messages being left by callers for the subscriber in substantially real time to the client 122. In addition, a call alert, including signaling information associated with a given call, can be transmitted in substantially real time to the client 122. Some or all of the call alert information can be displayed to the user via a terminal display (e.g., a personal computer, wireless phone etc.). Optionally, the call alert notification includes call transition information for a call in substantially real time. Optionally, a sound (e.g., a beep, waves, music, etc.) can be played by the terminal 120 in response to, or under the command of the call alert. Optionally, the subscriber can activate a client control to take the call at the terminal 120, or the subscriber can activate a control to transfer the call to another destination (e.g., another phone/terminal). Optionally, the user can access a call log of calls (e.g., including caller/called party identifiers (e.g., caller name), caller location, phone address, time of call, length of call, etc.) and recorded messages (e.g., recorded and stored on the softswitch). Thus, the client application 122 can be used to screen calls, take calls, and review past calls and associated voice messages. The client application 122 optionally maintains and/or accesses from a remote location the subscriber's contact list, which can be automatically populated from call information.

Presence detection can be performed by the softswitch 108 polling or pinging the subscriber terminal 120 via the telecommunications client application, or by the telecommunications client application transmitting a "Login/I'm alive" message and subsequent periodic "keep alive" messages to the softswitch 108. Optionally, just prior to the normal termination of an online Internet session, the client application 120 sends a "Logout" message to the softswitch 108. Optionally, abnormal Internet session termination conditions are detected by the softswitch 108 timing out the expected Client "Keep alive" message. Thus, the softswitch 108 is aware of the offline/online status of the terminal 120 and client application 122.

FIG. 1 depicts an example call scenario in which a caller initiates a call to a subscriber's destination address answered by the softswitch 108, and the call is routed to the subscriber's mobile device 116 via the softswitch 108 using information from the MVNE HLR 110. The caller's call may have originated over the PSTN or a VoIP network by way of examples. The example call handling sequence is as follows:

1. A caller (via a caller telephonic device) dials a first address (e.g., a phone number) associated with a subscriber's mobile phone 116 (optionally, the first address is associated with the mobile phone 116 by an enhanced call processing service provider associated with the softswitch 108). In another example, the call may have been forwarded to the first address. In this example, the PSTN 104 is informed that that the first address is associated with (e.g., owned by) the VoIP provider discussed above.

2. The first address is recognized in the PSTN (104) as being associated with the VoIP provider and so the call is routed to the VoIP provider switch serving that address.

3. The VoIP provider SIP proxy 106 converts the PSTN call to SIP and informs the softswitch 108 of the call.

4. The softswitch 106 queries the MVNE Home Location Register (HLR) 110 via SIP to obtain the status of the subscriber's mobile device, wherein the softswitch will route/process the call and optionally select a greeting timing using some or all of the information returned by the HLR 110 in response to the query. By way of example, the status can include Ready, Busy with Call Waiting, Busy, Off, No Service, or Available Minutes 5. The MVNE HLR 110 in turn queries the Visitor Location Register 112 of the Mobile Switching Center (MSC) currently serving the mobile device 116. The mobile device 116 in this example is ready to accept a call, and the VLR 112 therefore returns a Temporary Local Directory Number (TLDN) to the HLR 110 for use in routing the call to the device 116. The HLR 110 returns the TLDN and part of the status transmitted to the softswitch 108.

6. The softswitch 108 "dials" the TLDN via SS7, SIP, or other protocol.

7. The PSTN 104 utilizes the TLDN to route the call to the MSC 112 serving the subscriber's mobile device 116 in the given wireless network.

8. The MSC 112 uses the TLDN to consult its VLR for the current location of the mobile device 116 so that it can route the call to the specific base station (BS) 114 serving the device 116.

9. The BS 114 delivers the call to the mobile device 116, and the subscriber answers the call. This causes an Answer indication to be propagated back through the networks to the softswitch 108.

10. When the softswitch 108 receives the Answer indication from the mobile device 116, it opens a channel to a voice mail system within the softswitch 108 and establishes a half-duplex connection. The half-duplex connection enables the subscriber to screen the call while a message from the caller is being recorded by the softswitch (e.g., optionally, the softswitch plays a message, such as a prerecorded message from the subscriber, asking the caller to record a message, and the caller leaves a verbal message). The subscriber can hear a voice message being left by the caller and streamed in substantially real time to the mobile device 116, but the caller cannot hear the called party (e.g., the return talk path is muted). Optionally, the called party can later retrieve the recorded and stored caller message via a telephonic device or a networked computer. Optionally, the voice message is streamed in substantially real time to a networked computer associated with the subscriber and coupled over a network, such as the Internet, to the softswitch 108.

11. The subscriber provides as user input, such as by pressing the 1 key on the mobile device 116 (when key presses are referred to, other appropriate user interfaces, such as other hard or "soft keys, voice commands, etc., can be used as well), to take the call. When the softswitch detects the key press (e.g., detects the corresponding Dual-tone multifrequency (DTMF) tone), optionally, the softswitch stops recording the caller message, and opens up a full-duplex talk path between the caller and the subscriber so that the caller and the subscriber can converse.

While the call is active, the subscriber has the option of providing an instruction (e.g., by keypressing 1) to take the call (end screening), to transfer the call (e.g., by keypressing 2), or to conference in other parties (e.g., by keypressing 3). If the subscriber's mobile device had been turned off or busy, the softswitch 108 would be so informed in response to the HLR query and would act appropriately (e.g., by taking a message or by delivering the call to a different phone/destination used by the subscriber).

Optionally, when the mobile device 116 originates a call, the call does not pass through the softswitch 108 (e.g., the call is routed conventionally and/or using routing mechanisms that are standard at the time the call is routed). Optionally, even if the call is not routed via the softswitch 108, the call detail records for the call are sent to the softswitch operator (e.g., via the MVNE) for use in accounting/billing. For example, the call detail record can contain system usage information, such as the identities of sources, destination/endpoint identities, the duration of each call, the amount billed for each call, the total usage time in the billing period, the total free time remaining in the billing period, and/or the running total charged during the billing period. The mobile device optionally supports data connections to Internet-based services. Optionally, each data session is reported to the softswitch and/or softswitch operator by the MVNE after the session completes so that the usage can be tracked and billed.

A user can subscribe to one or more services and/or purchase/lease a communications device (e.g., a mobile telecommunications device), as described herein, via a website hosted by the softswitch 108 and/or operated by the softswitch operator. For example, the user can register via a web page form, and provides some or all of the following information which is stored in a softswitch subscriber database:

Name
Billing address
Shipping address,
Home phone number
Email address
Billing method selected
Optional credit card number and expiration date
Account preferences An account management interface (e.g., in the form of one or more Web pages) can be accessed by the subscriber. Via the account management interface, subscribers can access account information and make configuration changes. The interface optionally includes one or more of the following sections:

Account Summary—summarizes selected service, phone numbers, and address information
Choose Features—lists features with their current settings and allows subscriber to modify them
Review Billing—lists current outstanding charges and how billing is to occur; for Postpaid service this includes charges per call; it also states any SMS and data connection charges
Get Help—menu of areas in which to get help
Tell Your Friends—opportunity to tell others about the service offered by the softswitch operator.

The softswitch optionally hosts and stores electronic address books for subscribers, wherein a subscriber can update the address book, edit contact records, or add contact records via Web forms hosted by the softswitch.

If the user purchases a mobile device, such as mobile device 116 described herein, the mobile device is optionally shipped to the specified shipping address. Optionally, the user may purchase the mobile device at a "brick and mortar" physical retail location. The mobile device can be configured for and used for some or all of the following: making and receiving calls; composing, sending, and receiving SMS messages; for instant messaging; for sending and receiving emails, etc. The mobile device can comply with one or more wireless network standards (e.g., GSM, CDMA, GPRS, HSCSD, 1xRTT, EDGE, W-CDMA, 1xEV, TD-SCDMA, HSDPA, HSUPA, other protocol, etc.).

Optionally, the mobile device is equipped with a SIM card (e.g., a subscriber identity module which securely stores a mobile phone service subscriber identifier, subscription information, contact lists (e.g., including some or all of the following: names, phone numbers, addresses, email addresses, etc.) preferences, text messages, and/or network state information, such as its current location area identity (LAI)), or the like. The SIM card in the mobile device, and the mobile device itself, are uniquely identified to the wireless network. Optionally, the SIM card and mobile device identities are captured and recorded in the softswitch 108 as part of provisioning prior to shipping the device 116 to the user. Provisioning optionally involves interfacing with the MVNE Business-to-Business (B2B) interface to provision the assigned mobile device in the MVNE HLR 110.

The mobile device 116 optionally includes a display, including icons (which can be turned on and off, change their appearance, and/or change their color) for indicating if there is unheard voice mail, for indicating SMS message status, for indicating if there is unread email, etc. Optionally, the mobile device is configured with a speed dial (e.g., the 1 key) for accessing voice mail. Optionally, the mobile device supports data connections (e.g., has wireless Internet access), is equipped with a browser, has an email client to receive/send emails, and has instant messaging client to receive/send instant messages.

Optionally, the mobile device is configured to synchronize the contact list stored in its SIM card with the subscriber's contact list stored in the softswitch. The synchronization is optionally performed when manually requested by the subscriber from the mobile device or via an account manager user interface. Optionally, the synchronization is automatically performed when an edit has been made to the SIM contact list or the subscriber's softswitch contact data store, if the mobile device is on and connected.

The account provisioned for the subscriber can include some or all of the features/services listed in the tables above, and/or additional or different features/services. The subscriber account record (stored in the subscriber database) can include corresponding settings, with optional defaults.

TABLE 1

| Feature | Description | Default Setting |
| --- | --- | --- |
| Mobile Call Screening | The ability to answer a call and listen while the caller records a message without the caller hearing the subscriber. The subscriber may enable it for all calls and enable/disable it for individual contacts. During a call the subscriber can end screening by keypressing 1. | On |
| Mobile Call Transfer | The ability of a subscriber to transfer a call by providing a corresponding user input (e.g., keypressing 2) during a call The subscriber may configure the Mobile Call Transfer Number to be used for the transfer. Multiple transfer numbers can be specified if the Mobile Location feature is enabled. | Home phone number |
| Mobile Locator | Knowledge of the geographic location of the mobile device when delivering calls to the subscriber. The package subscribed to determines whether this feature is allowed. If the feature is allowed, the subscriber may enable/disable the feature. With this feature, the subscriber is allowed to specify multiple Mobile Call Transfer Numbers and associate a geographic location with each to assist in determining where to transfer a call. | Depends on service package subscribed to |
| Follow Me Home | Auto-transfer to the Mobile Call Transfer Number when the mobile device is off or out-of-range. The subscriber may enable/disable this feature. | Depends on service package subscribed to |
| Conferencing | The ability of a subscriber to conference in additional parties during a call by providing a corresponding user input (e.g., keypressing 3). Optionally, a limit on the number of participants is set in the package offer and/or a global limit is set. | Depends on service package subscribed to |
| Distinctive Ringback | The subscriber can select from a set of ring tones to be used when playing ringback to the caller. | Standard ringback |
| Private Number Screening | Prompting callers whose caller ID is blocked to reveal/unblock their caller ID in order for the call to be presented to the subscriber. The subscriber may enable/disable this feature. | Depends on service package subscribed to |
| Telemarketer Blocking | Testing a call for telemarketing behavior and if detected, reject the call by returning busy. The subscriber may enable/disable this feature. | Depends on service package subscribed to |
| Spoken Greeting | The greeting that is played to the caller in conjunction with screening or taking a message can be a standard system greeting, a spoken name greeting, or a personal greeting The subscriber may record a name or personal greeting and may choose whether prompts are to be in a male or female voice. | Standard system greeting in female voice |
| Payment Plan | The payment for mobile service can be, by way of example, Prepaid, Postpaid, or Flat Rate. With Prepaid payment, once the allocated minutes are consumed, limited services are provided until the minutes are recharged (e.g., emergency 911 calls may be allowed, but not other calls). With Postpaid payment, the cost of individual service usage is summarized in the billing section of the user's account which is accessible online (e.g., via a browser or a dedicated client). This feature is configured as per the package subscribed to. | Depends on service package subscribed to |
| Domestic Roaming | The ability of the subscriber to use their mobile device within the US but outside of their local mobile serving area. This feature is enabled or disabled per the package subscription with region-based rates. When this feature is enabled, the softswitch is aware of whether the mobile device is in roaming mode or not when the Softswitch is determining how to handle and incoming call. | Depends on service package subscribed to |

Optionally, some or all of the feature/service/default settings can be adjusted by the subscriber via an account management user interface, optionally hosted by the softswitch 108. By way of example, the subscriber can optionally access the account management user interface as a Web page via a browser, or by phone by calling an automated interactive voice response system and/or a human operated service center.

The phone number assigned to the subscriber for some of the services described herein is sometimes referred to herein, for convenience and not by way of limitation, as a mobile access address. By way of example, the mobile access address can be a United States or foreign phone number assigned directly by the enhanced call processing service provider (e.g., the operator of the softswitch 108), by the enhanced call processing service provider via its VoIP provider partnership, by a third party, or otherwise. Optionally, the initial use of the mobile access address service may be limited to a particular geographical/regional area (e.g., a particular portion of the United States or a foreign country) and not involve both partners.

In an example optional embodiment, where the enhanced call processing service provider and an MVNE are involved in providing some or all of the services described herein, when the mobile access address is assigned to a subscriber, a Business-to-Business (B2B) interface between the enhanced call processing service provider and the MVNE propagates the phone address into the MVNE HLR. This causes the phone address to be directly associated with the mobile device in terms of addressing for voice/data network connections to/from the device.

A subscriber may have additional virtual phone numbers assigned to their account, e.g., a number with an area code of another locality so that family and friends in that locality can make a local call to the subscriber. The subscriber can receive calls on these additional numbers. Optionally, these virtual numbers will not be used as the caller ID in an outgoing call, although optionally the virtual numbers will be used as the caller ID in an outgoing call.

Optionally, the mobile access address/virtual phone number are ported to/from the softswitch or a partner of the softswitch operator via Local Number Portability (LNP).

The call routing processes and controls will now be described in greater detail.

In the example illustrated in FIG. 1, incoming calls to the subscriber's mobile access address route through the softswitch 108. The softswitch handles the incoming call per the subscriber's service/feature settings, examples of which are described in Table 1 above, and the current device status. The status of the subscriber's mobile device is obtained by querying the HLR 110 via the MVNE SIP User Agent. Examples of possible status values returned and the associated action are described in Table 2 below, and additional, fewer, or different status values can be used.

TABLE 2

Mobile Device Status from HLR

| Status | Description | Action |
|---|---|---|
| Ready | Mobile device is ready to accept a call, | Route call to device via supplied TLDN. |
| Busy w/Call Waiting | Mobile device is servicing a call but has Call Waiting enabled and thus is ready to accept another call | Route call to device via supplied TLDN. |
| Busy | Mobile device is servicing a call or data session and is unable to service another call. | Record a message. |
| Off | Mobile device turned off or out-of-range | Deliver call to Mobile Call Transfer Number if configured; otherwise take a message. |
| No Service | No wireless service on record for this number | This indicates the service is misconfigured. Throw an exception and record a message. |

As part of the status information, the MVNE HLR 110 optionally returns an indication as to whether the mobile device is roaming and/or the geographic coordinates of the mobile device. This information assists in determining where to transfer a call. If the subscriber has prepaid calling, the softswitch optionally also uses the minute balance it maintains to determine how to handle the call.

As previously discussed, the softswitch can determine the online/offline status of the telecommunications client hosted on the subscriber's terminal. If the client is running and the terminal is online, incoming calls are optionally presented via the telecommunications as well as to the mobile device. The subscriber has the option of ignoring the call (in which case the softswitch will optionally record a message from the caller for later retrieval and playback by the subscriber), screening the call (in which case the communication path is in half-duplex mode so that the subscriber can hear the caller leave a message, but the caller cannot hear the subscriber), taking the call (in which case the communication path is in full duplex mode so that the caller and the subscriber can converse and hear each other), or by transferring the call via either the mobile device or the client application to another destination. If a user of the telecommunications client user and a user of the mobile device both choose to take or transfer the call and that action is successful, the users of the client and mobile device are conferenced together with the caller.

Note that for the mobile access address service, in an example embodiment a Gateway MSC is not required since calls to the mobile device do not have to route directly to the wireless network. In such an example embodiment, the softswitch and MVNE HLR perform the gateway function.

Application of the above routing processes and controls is described in more detail below with respect to several example call scenarios. In these example scenarios, the ringback to the caller is controlled by the distinctive ringback feature setting, although a default, standard ring can be used as well.

In this example, the softswitch is configured to deliver a call to the subscriber's mobile device if the subscriber's account is not out of minutes and the device's status is Ready or Busy w/Call Waiting. To route the call, the softswitch uses the TLDN returned by the MVNE HLR as part of the request for status. The HLR database contains the address of the VLR associated with the MSC currently serving the mobile device and it is from this VLR that it obtains the TLDN.

The softswitch dials the TLDN to deliver the call. The following scenarios may result depending on the feature settings and the subscriber behavior:

Call is not answered, so a message is recorded by the softswitch

Call is answered and screening is disabled, so a full duplex call path is established.

Call is answered with screening enabled and while a message is being recorded, the subscriber provides a user input (e.g., presses key 1) to cause the call path to be changed from half- to full-duplex.

After a call is answered, the subscriber provides a user input (e.g., keypresses 2) to transfer the call to the Mobile Call Transfer Number independent of whether screening is active.

After a call is answered, the subscriber provides a user input (e.g., keypresses 3) to conference in other parties independent of whether screening is active.

Call is answered and the account runs out of minutes before it completes.

In the forgoing scenarios private number screening and telemarketer blocking may be invoked at the beginning of the call depending on the subscriber's feature settings and the type of call.

These call scenarios are described in more detail below. In the example scenarios, where a connection to the mobile device is established, optionally minutes of usage is tracked and deducted from the subscriber's account if prepaid calling is configured.

Figure 2:
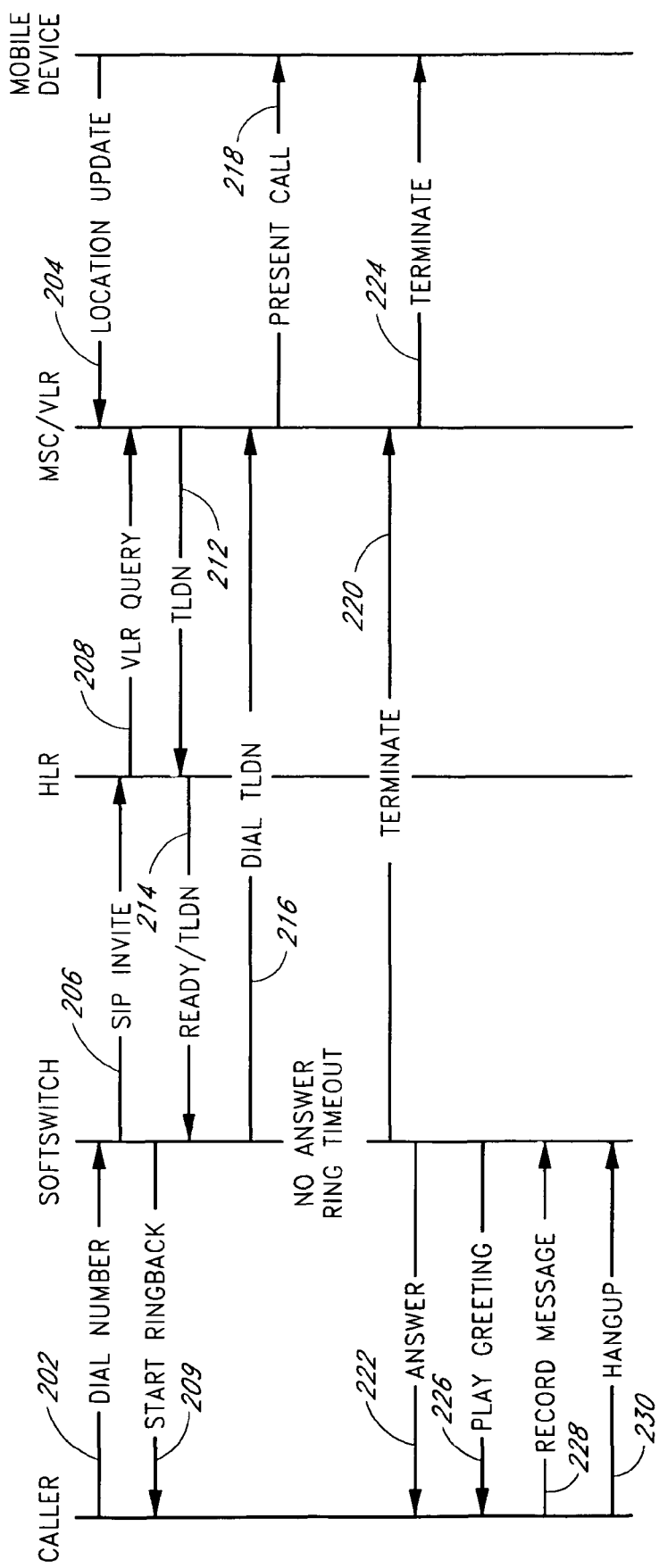
FIG. 2 illustrates an example call process for an unanswered call.

If, during the period between receiving the mobile device status from the HLR and attempting to deliver the call, the status of the mobile device changes (e.g., the subscriber initiates a call from the mobile device, turns the phone off, or goes out of range), the softswitch prompts the caller to record a message similar to the scenario illustrated in FIG. 2.

FIG. 2 illustrates an example call process for an unanswered call. In this example, in the MVNE HLR, forwarding on busy and no answer is disabled for subscribers with the mobile access address service so that the softswitch can handle voice mail for the subscriber.

At state 202, a caller (via a caller telephonic device) dials a mobile access address associated with a subscriber's mobile device and the caller's call reaches a softswitch. At state 204, a location update for the mobile device is performed by the MSC/VLR. At state 206, the softswitch transmits a SIP invite to the HLR. At state 208, the HLR transmits a VLR query to the MSC/VLR. At state 209, the softswitch initiates a ringback to the caller telephone. At state 212, the MSC/VLR returns the TLDN to the HLR for use in routing the call to the mobile device. At state 214, the HLR returns the TLDN and the status of Ready to the softswitch. At state 216, the softswitch "dials" the TLDN via SS7, SIP, or other protocol. The PSTN utilizes the TLDN to route the call to the MSC serving the subscriber's mobile device. The MSC uses the TLDN to consult its VLR for the current location of the mobile device so that it can route the call to the base station serving the mobile device.

At state 218, the base station presents the call to the mobile device. In this example, the wireless device is not answered, and at state 220, after a predetermined amount of time or number of rings, a timeout condition occurs, and the softswitch designates the call unanswered, and at state 224, the call to the mobile device is terminated. At state 222, the softswitch answers the call. At state 226, the softswitch plays a greeting to the caller which prompts the caller to leave a message. At state 228, the caller provides a verbal message which is recorded by the softswitch and stored in voicemail for later retrieval by the subscriber. At state 230, the softswitch terminates the inbound call from the caller.

Figure 3:
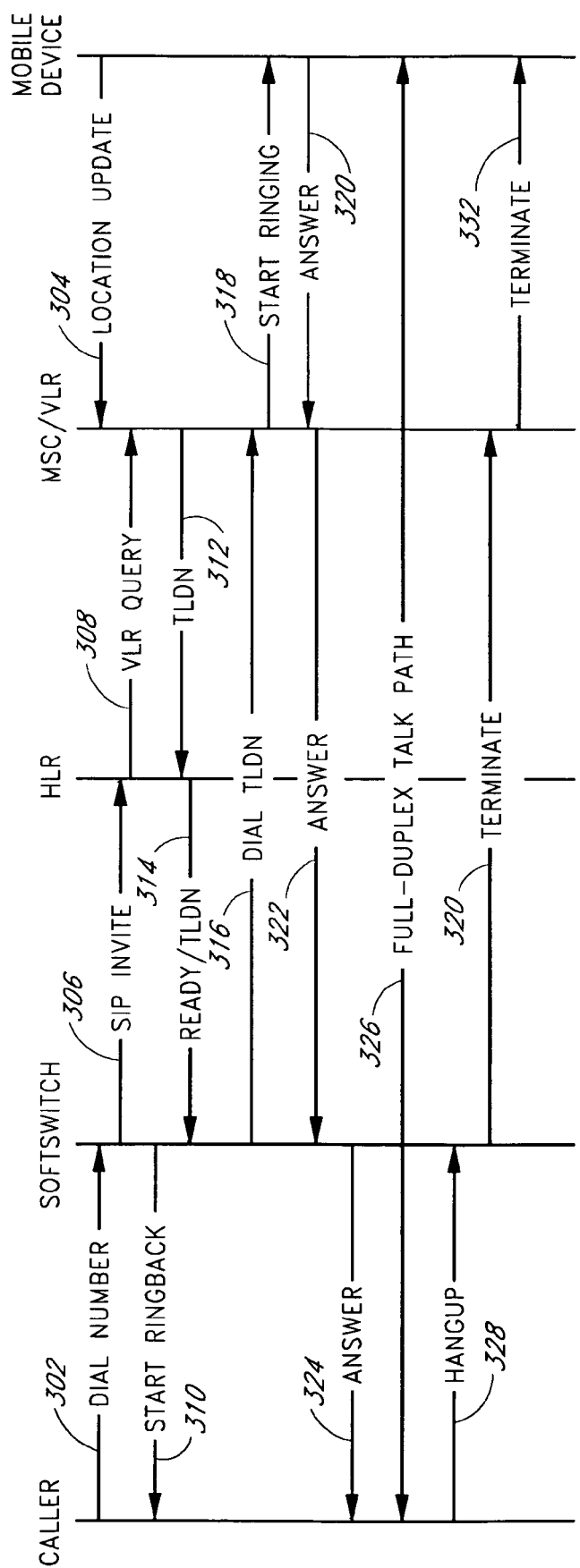
FIG. 3 illustrates an example call process for an answered call.

FIG. 3 illustrates example call handling for the scenario where the mobile device is answered and mobile call screening is disabled. At state 302, a caller (via a caller telephonic device) dials a mobile access address associated with a subscriber's mobile device, and the caller's call reaches a softswitch. At state 304, a location update for the mobile device is performed by the MSC/VLR. At state 306, the softswitch transmits a SIP invite to the HLR. At state 308, the HLR transmits a VLR query to the MSC/VLR. At state 310, the softswitch initiates a ringback to the caller telephone. At state 312, in response to the query, the MSC/VLR returns the TLDN to the HLR for use in routing the call to the mobile device. At state 314, the HLR returns the TLDN and the status of Ready to the softswitch. At state 316, the softswitch "dials" the TLDN via SS7, SIP, ISDN-PRI, or other protocol, to place an outcall to the mobile device. The PSTN utilizes the TLDN to route the call to the MSC serving the subscriber's mobile device. The MSC uses the TLDN to consult its VLR for the current location of the mobile device so that it can route the call to the base station serving the mobile device.

At state 318, the base station associated with the MSC/VLR rings the mobile device. At state 320, the subscriber answers the mobile device. At state 322, an Answer status is returned from the MSC/VLR to the softswitch, and at state 324, the softswitch answers the inbound call from the caller. The caller call and the outcall are bridged, and because call screening is not enabled, at state 326, a full duplex talk path is automatically established between the caller and the wireless device. At state 328, the caller hangs up. At state 330, the softswitch sends a terminate indication to the MSC/VLR, and at state 332 the call is terminated at the mobile device. If the subscriber has Prepaid or Postpaid service, the softswitch updates the subscriber's usage records in its database when the call terminates.

Figure 4:
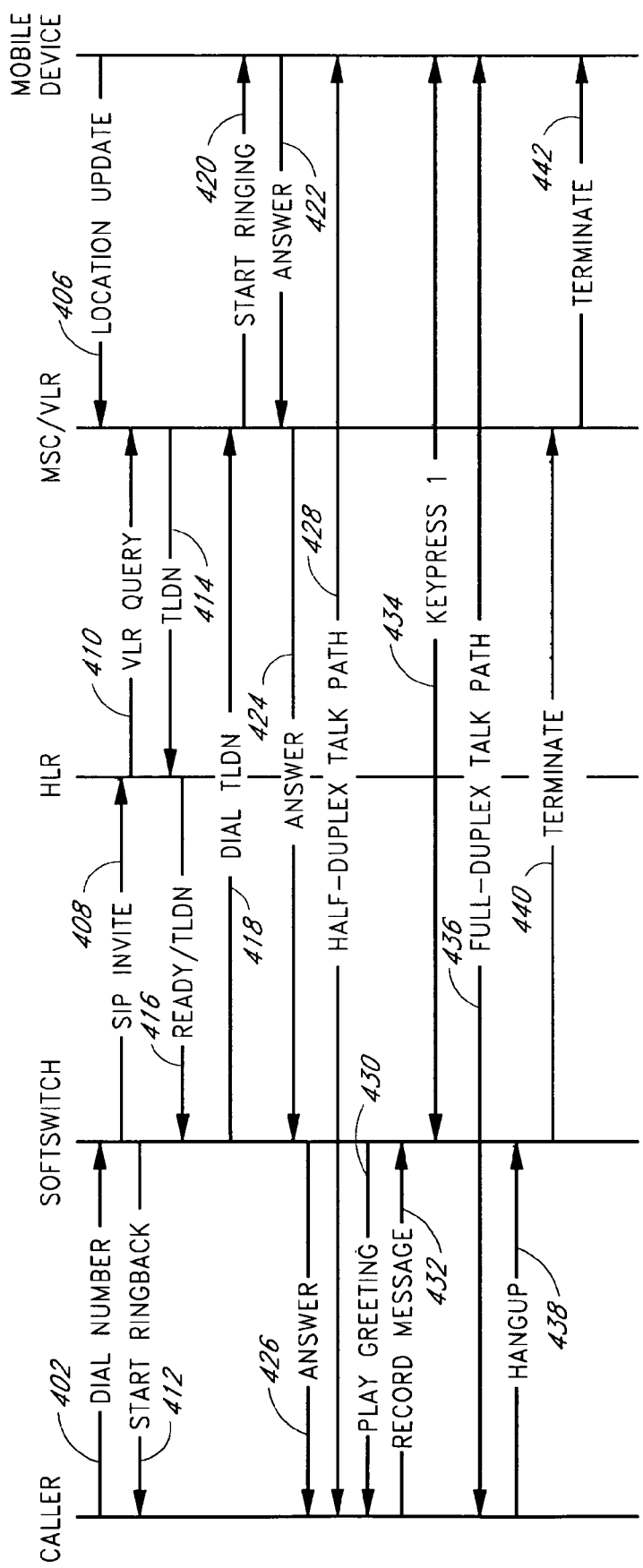
FIG. 4 illustrates an example call screening process.

FIG. 4 illustrates an example call screening process. In this example, the mobile device is answered and mobile call screening is enabled. The subscriber instructs the softswitch to end call screening and to connect the subscriber to the caller in full duplex mode (e.g., by pressing the 1 key to end screening and take the call).

At state 402, a caller (via a caller telephonic device) dials a mobile access address associated with a subscriber's mobile device and the caller's call reaches a softswitch. At state 406, a location update for the mobile device is performed by the MSC/VLR. At state 408, the softswitch transmits a SIP invite to the HLR. At state 410, the HLR transmits a VLR query to the MSC/VLR. At state 412, the softswitch initiates a ringback to the caller telephone. At state 414, the MSC/VLR returns the TLDN to the HLR for use in routing the call to the mobile device. At state 416, the HLR returns the TLDN and the status of Ready to the softswitch. At state 418, the softswitch "dials" the TLDN to place an outcall to the mobile device. The PSTN utilizes the TLDN to route the call to the MSC serving the subscriber's mobile device. The MSC uses the TLDN to consult its VLR for the current location of the mobile device so that it can route the call to the base station serving the mobile device.

At state 420, the base station associated with the MSC/VLR rings the mobile device. At state 422, the subscriber answers the mobile device. At state 424, an Answer status is returned from the MSC/VLR to the softswitch, and at state 426, the softswitch answers the inbound call from the caller. The caller call and the softswitch outcall are bridged. Because call screening is enabled, at state 428, a half duplex talk path is automatically established between the caller and the wireless device so that the subscriber can hear a message left by the caller, and the caller cannot hear the called party.

At state 430, the softswitch plays a message to the caller asking the caller to leave a message. At state 432, the softswitch records a message from the caller. At state 434, the subscriber activates a control (e.g., presses the 1 key on the mobile device) to indicate that the subscriber wants to accept the call. At state 436, the softswitch establishes a full duplex communication path.

At state 438, the caller hangs up. At state 440, the softswitch sends a terminate indication to the MSC/VLR, and at state 442 the call is terminated at the mobile device. If the subscriber has Prepaid or Postpaid service, the softswitch updates the subscriber's usage records in its database when the call terminates.

Figure 5:
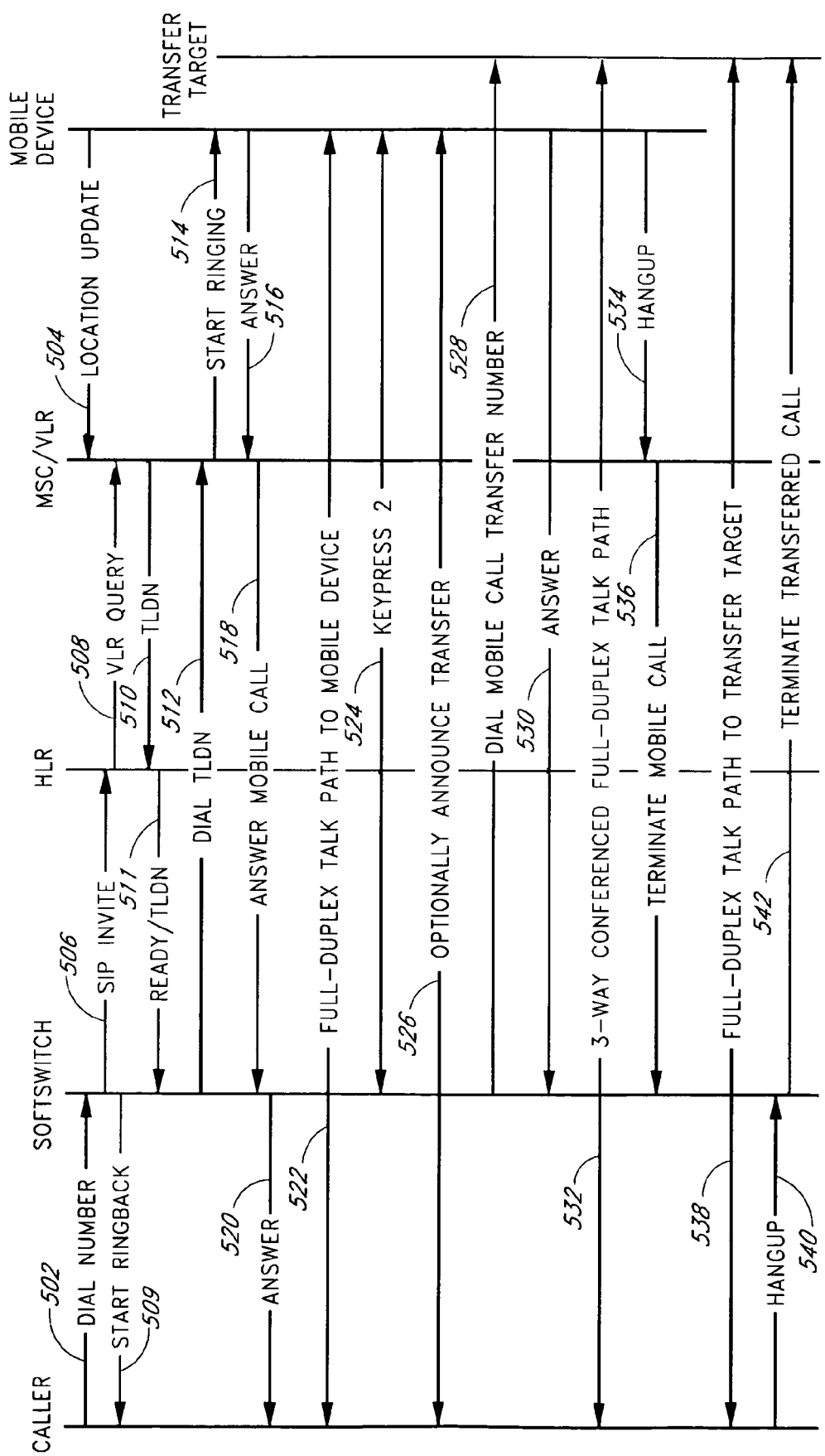
FIG. 5 illustrates an example call transfer process.

FIG. 5 illustrates an example call transfer process. In this example, the mobile device is answered and the subscriber provides a call transfer instruction to transfer the call to a mobile call transfer number, assuming one is configured. The subscriber can hang up the mobile device after providing the transfer instruction, and if that leg of the call is not terminated before the transferred call leg is established, the three call legs are conferenced together. A party associated with the legs can hang up without affecting the communication path between the other two terminals.

If, during a call transfer, the softswitch detects that the called number is busy, not answered, or answered by voice mail or an answering machine, the softswitch optionally announces to the remaining call participants that the transfer failed.

If the Mobile Locator feature is enabled and multiple Mobile Call Transfer Numbers are configured, the geographic location of the subscriber's mobile device, if available, is compared to that of each number to determine whether the device is in its proximity. If there is a match, the call is transferred to that number; otherwise all of the Mobile Call Transfer Numbers are optionally called simultaneously and conferenced together as they are answered.

Referring to FIG. 5, at state 502, a caller (via a caller telephonic device) dials a mobile access address associated with a subscriber's mobile device and the caller's call reaches a softswitch. At state 504, a location update for the mobile device is performed by the MSC/VLR. At state 506, the softswitch transmits a SIP invite to the HLR. At state 508, the HLR transmits a VLR query to the MSC/VLR. At state 509, the softswitch initiates a ringback to the caller telephone. At state 510, the MSC/VLR returns the TLDN to the HLR for use in routing the call to the mobile device. At state 511, the HLR returns the TLDN and the status of Ready to the softswitch. At state 512, the softswitch "dials" the TLDN to place an outcall to the mobile phone. The PSTN utilizes the TLDN to route the call to the MSC serving the subscriber's mobile device. The MSC uses the TLDN to consult its VLR for the current location of the mobile device so that it can route the call to the base station serving the mobile device.

At state 514, the base station associated with the MSC/VLR rings the mobile device. At state 516, the subscriber answers the mobile device. At state 518, an Answer status is returned from the MSC/VLR to the softswitch, and at state 520, the softswitch answers the inbound call from the caller. At state 522, a full duplex talk path is automatically established between the caller and the wireless device. At state 524, the subscriber provides a call transfer instruction (e.g., by pressing the 2 key on the mobile device).

At state 526, the softswitch transmits a voice message to the caller and the subscriber, informing them that a call transfer is about to take place. At state 528, in response to the transfer instruction, the softswitch dials a mobile call transfer number associated with a transfer target device. At state 530, the subscriber answers the device associated with the mobile call transfer number. At state 532, the softswitch establishes a 3-way conferenced full-duplex talk path between the caller, the mobile device, and the transfer target device. At state 534, the subscriber hangs up the mobile device. At state 536, the MSC/VLR sends a call terminate message to the softswitch. At state 538, a full-duplex path between the caller and the transfer target is maintained even though the mobile device has hung up. At state 540, the caller hangs up. At state 542, the softswitch terminates the transferred call to the transfer target device. If the subscriber has Prepaid or Postpaid service, the softswitch updates the subscriber's usage records in its database when the call terminates.

Figure 6:
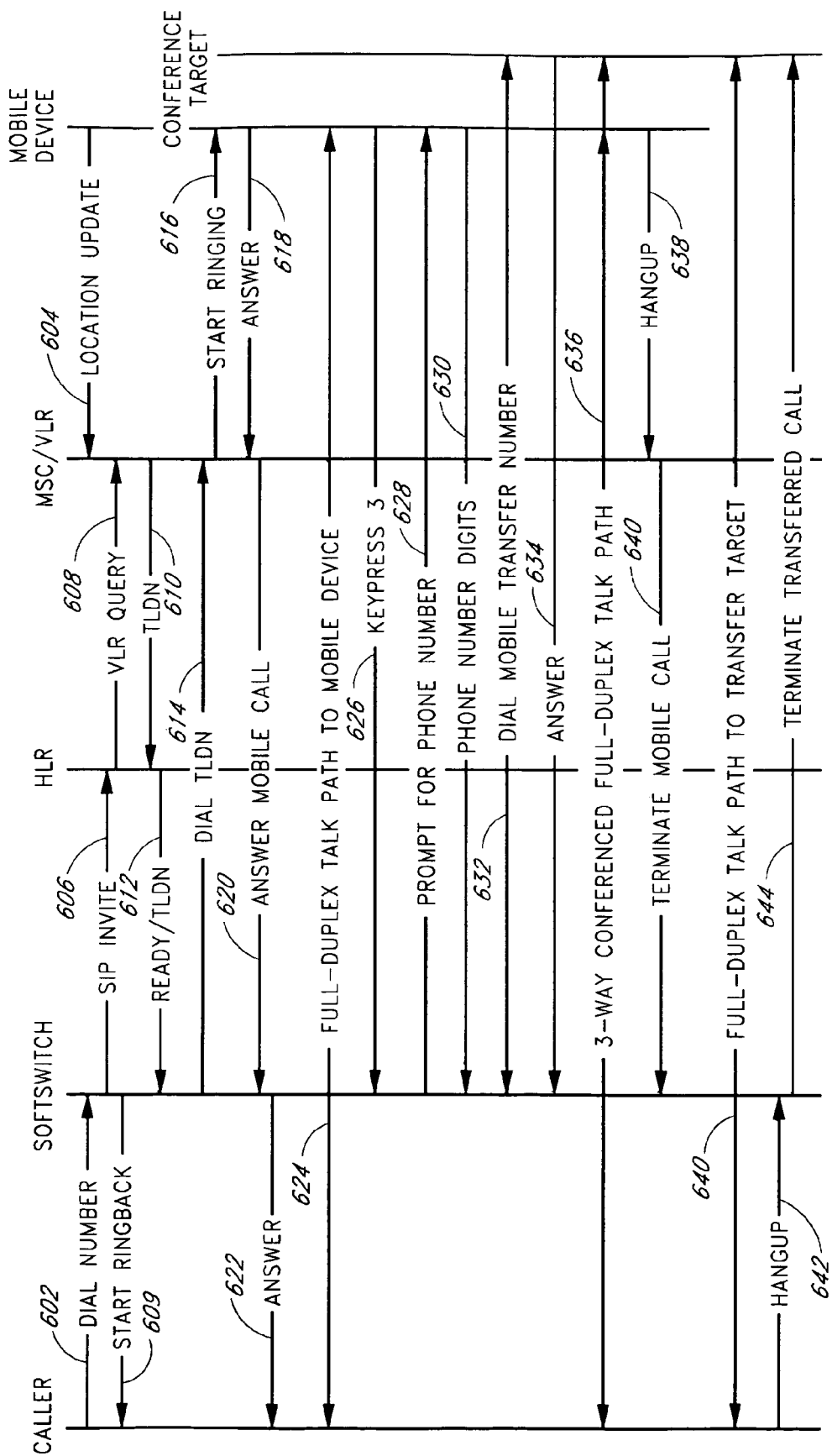
FIG. 6 illustrates an example call conferencing process.

FIG. 6 illustrates an example call conferencing process. In this example, the subscriber answers the mobile device, and instructs the softswitch (e.g., via a key press of 3 on the mobile device key pad) to conference in another party. Optionally, if conferencing is enabled, a maximum number of participants allowed in a conference is controlled in the feature package for the subscriber. Thus, for example, some subscribers may be restricted to a 3-way conference, while some subscribers may be allowed up to a 6-way conference. Optionally, all the subscribers may be limited to a certain number of conference legs (e.g., a 6-way conference).

Optionally, the conference will not terminate just because one member of the conference hangs up. Optionally, the conference will be maintained as long as two participants remain on the call/until only one member remains on the call. Optionally, if the conference initiator/subscriber hangs up, the conference will terminate even if two or more participants still remain.

If during an attempt to add a person to the conference, the softswitch detects that the called number is busy, not answered, or answered by voice mail or an answering machine, the softswitch provides an audible and/or visual announcement to the conference attendees that the requested person is not available.

Referring to FIG. 6, at state 602, a caller (via a caller telephonic device) dials a mobile access address associated with a subscriber's mobile device and the caller's call reaches a softswitch. At state 604, a location update for the mobile device is performed by the MSC/VLR. At state 606, the softswitch transmits a SIP invite to the HLR. At state 608, the HLR transmits a VLR query to the MSC/VLR. At state 609, the softswitch initiates a ringback to the caller telephone. At state 610, the MSC/VLR returns the TLDN to the HLR for use in routing the call to the mobile device. At state 612, the HLR returns the TLDN and the status of Ready to the softswitch. At state 614, the softswitch "dials" the TLDN to place an outcall to the mobile device. The PSTN utilizes the TLDN to route the call to the MSC serving the subscriber's mobile device. The MSC uses the TLDN to consult its VLR for the current location of the mobile device so that it can route the call to the base station serving the mobile device.

At state 616, the base station associated with the MSC/VLR rings the mobile device. At state 618, the subscriber answers the mobile device. At state 620, an Answer status is returned from the MSC/VLR to the softswitch, and at state 622, the softswitch answers the inbound call from the caller. The caller call and the outcall from the softswitch are bridged.

At state 624, a full duplex talk path is automatically established between the caller and the wireless device so that the caller and subscriber can converse. At state 626, the subscriber provides a call conference instruction (e.g., by pressing the 3 key on the mobile device).

At state 628, the softswitch transmits a voice prompt to the subscriber asking for the phone address/number to which the third leg of the conference is to be directed. At state 630, the subscriber enters the desired phone number (e.g., by pressing corresponding mobile device key pad keys, by selecting a phone number for a contact database on the mobile device, by speaking the phone number, by speaking an identifier associated with the phone number, such as a name, etc.), such as a mobile transfer number. At state 632, in response to the conference instruction, the softswitch dials the specified phone number. At state 634, the call is answered at the conference target. At state 636, the softswitch establishes a 3-way conferenced full-duplex talk path to enable the three parties to converse, wherein the caller, the mobile device, and the conferenced target are conferenced together. At state 638, the subscriber hangs up the mobile device.

In response, at state 640, the MSC/VLR sends a mobile call terminate message to the softswitch. At state 640, a full-duplex path between the caller and the transfer target is maintained. At state 642, the caller hangs up. At state 644, the softswitch terminates the call to the conference target. If the subscriber has Prepaid or Postpaid service, the softswitch updates the subscriber's usage records in its database when the call terminates.

Figure 7:
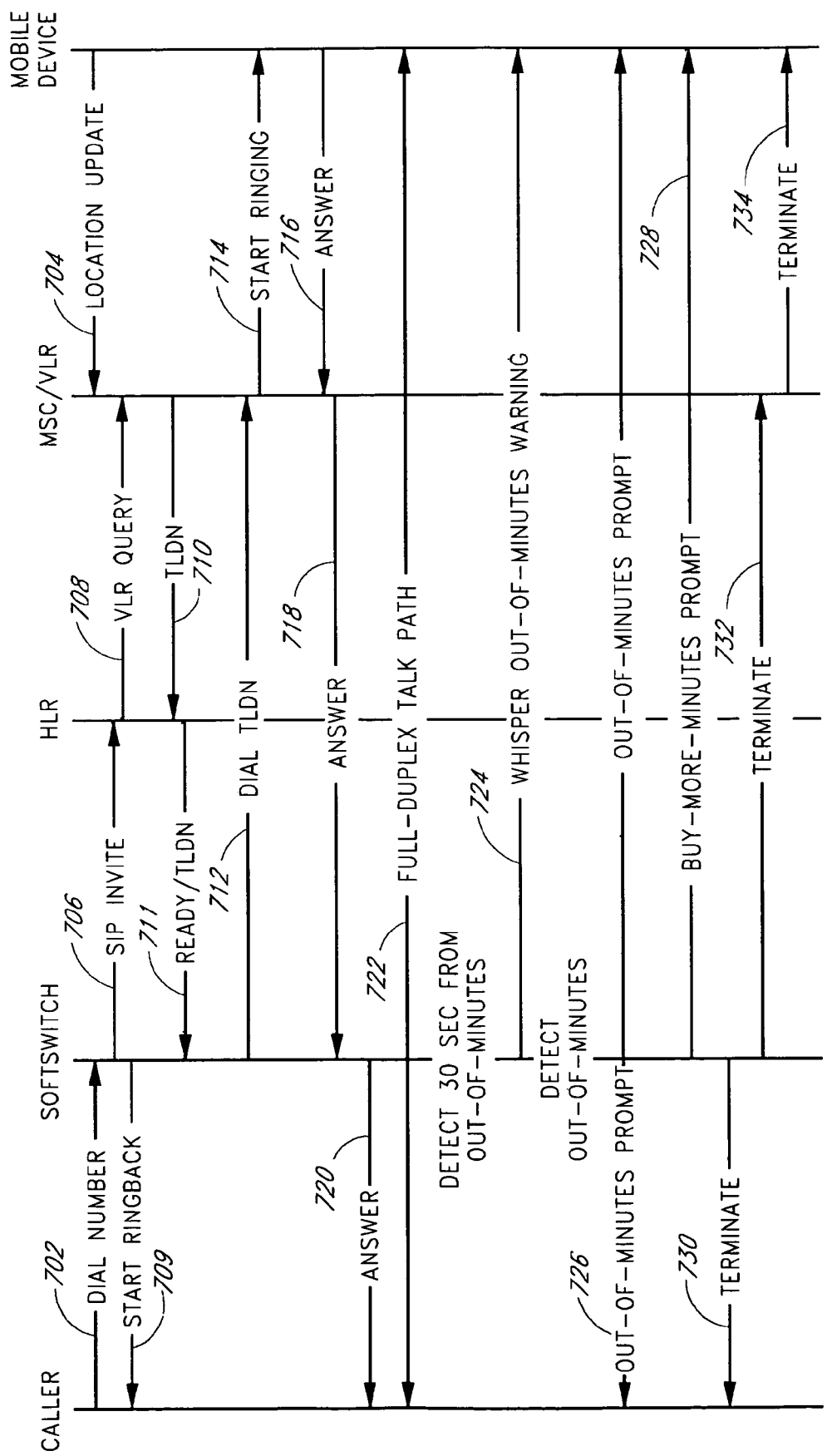
FIG. 7 illustrates an example call process wherein a call participant exhausts the participant's associated call minutes.

FIG. 7 illustrates an example call process wherein a call participant exhausts the participant's associated call minutes (e.g., prepaid call minutes associated with the subscriber's mobile device, a calling card, an access code, etc.). In this example, a warning (e.g., an audible warning, such as a beep or a verbal message that only the subscriber can hear and that the other call participants cannot hear, wherein optionally the warning is played at a relatively lower volume as compared to typical audible message played by the softswitch) when a specified/predetermined amount of call time remains (e.g., 30 seconds, 60 seconds, or other time period). The call is terminated when the minutes/prepaid calling time fully expire, but optionally, first a prompt is played to the call participants indicating that the call is being terminated.

Referring to FIG. 7, at state 702, a caller (via a caller telephonic device) dials a mobile access address associated with a subscriber's mobile device and the caller's call reaches a softswitch. At state 704, a location update for the mobile device is performed by the MSC/VLR. At state 706, the softswitch transmits a SIP invite to the HLR. At state 708, the HLR transmits a VLR query to the MSC/VLR. At state 709, the softswitch initiates a ringback to the caller telephone. At state 710, the MSC/VLR returns the TLDN to the HLR for use in routing the call to the mobile device. At state 711, the HLR returns the TLDN and the status of Ready to the softswitch. At state 712, the softswitch "dials" the TLDN via SS7, SIP, or other protocol to place an outcall to the mobile device. The PSTN utilizes the TLDN to route the call to the MSC serving the subscriber's mobile device. The MSC uses the TLDN to consult its VLR for the current location of the mobile device so that it can route the call to the base station serving the mobile device.

At state 714, the base station associated with the MSC/VLR rings the mobile device. At state 716, the subscriber answers the mobile device. At state 718, an Answer status is returned from the MSC/VLR to the softswitch, and at state 720, the softswitch answers the inbound call from the caller. Because call screening is not enabled, the inbound call and the outcall are bridged at state 722, and a full duplex talk path is automatically established between the caller and the wireless device. During the connection time, a determination is made that a first time threshold (e.g., 30 minutes) has been reached prior to the complete usage of the call time remaining. In response, at state 724, the softswitch plays or whispers (mixes incoming audio signal/called party speech with lower level audio prompt) an out-of time warning (e.g., "You have only 30 seconds of call time remaining" or a beep tone) via the talk path to the mobile device, wherein the other call participant(s) optionally are prevented from hearing the warning.

At state 726, the softswitch plays an "out of call time" warning prompt, which optionally states that the call time has been used up and/or that the call is about to be terminated. At state 728, the softswitch plays a prompt asking the subscriber if the subscriber wants to purchase additional call time. The message can specify how the subscriber can provide a response (e.g., press 5 on the telephonic device to purchase an additional 1 hour of call time, press 6 to purchase an additional 2 hours of call time, and press 7 to decline to purchase additional call time; or provide a verbal command indicating how much call time the subscriber wants to purchase). Optionally, if the subscriber does not respond to the prompt, the softswitch interprets the lack of response as indicating that the subscriber does not want to purchase additional call time during the present call.

In this example, the subscriber fails to respond to the purchase additional call time prompt within a predetermined window of time (e.g., within 5 seconds after the end of the prompt), and so at state 730, the softswitch terminates the call to the caller. At state 732, the softswitch sends a terminate indication to the MSC/VLR, and at state 734 the call is terminated at the mobile device. The softswitch updates the subscriber's usage records in its database when the call terminates.

Figure 8:
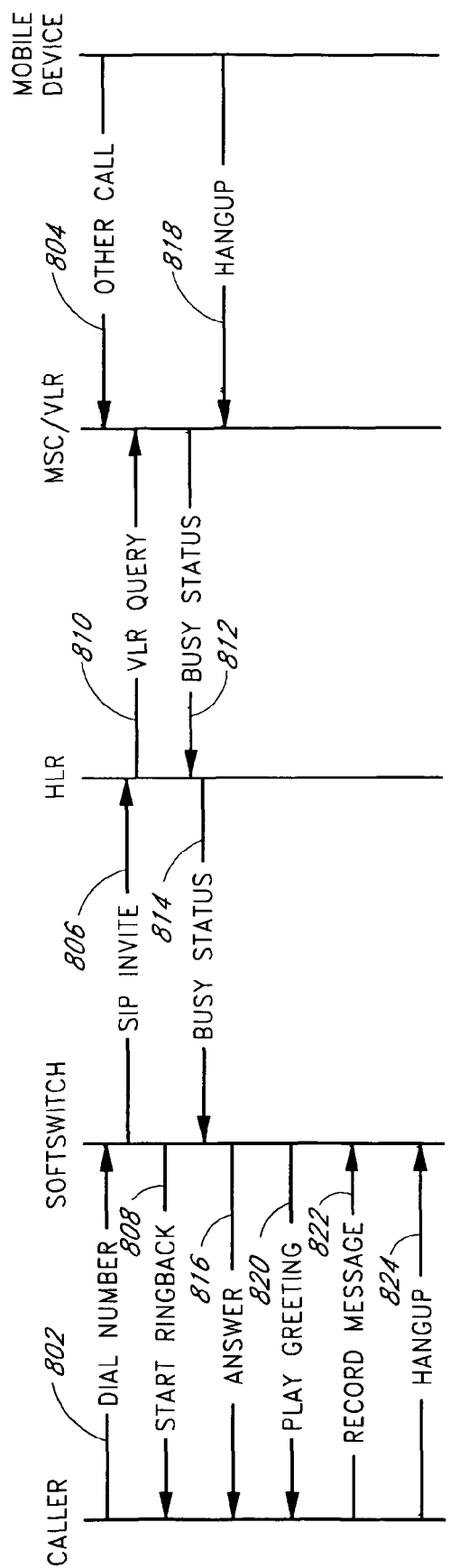
FIG. 8 illustrates an example call busy call handling process.

FIG. 8 illustrates an example call busy call handling process. If the HLR indicates that the mobile device is busy, a message is taken, as illustrated in FIG. 8. However, if Call Waiting is enabled, as is often the case for mobile devices, optionally an attempt is made to deliver the call per the scenario illustrated in FIG. 3, even though another call is in progress. With Call Waiting enabled there are relatively few boundary conditions in which the mobile device is considered "busy", (e.g., a call is being initiated from the mobile device or another call is presented while a call waiting condition is already in progress). In such "busy" conditions, the example call processing scenario illustrated in FIG. 8 is optionally performed.

Referring to FIG. 8, at state 802, a caller (via a caller telephonic device) dials a mobile access address associated with a subscriber's mobile device and the caller's call reaches a softswitch. At state 804, the mobile device is initiating a call (and hence is in a Busy state with respect to an incoming call). At state 806, the softswitch transmits a SIP invite to the HLR. At state 808, the softswitch initiates a ringback to the caller telephone. At state 810, the HLR transmits a VLR query to the MSC/VLR. At state 812, the VLR returns a Busy status to the HLR. At state 814, the HLR transmits the Busy status to the caller.

At state 816, the softswitch answers the inbound call from the caller. At state 818, the other call is terminated at the mobile device (e.g., the subscriber hangs up). At state 820, the softswitch plays a message to the caller asking the caller to leave a message. At state 822, the softswitch records a message from the caller for later retrieval by/transmission to the subscriber. At state 824, the caller hangs up and the caller's call is terminated.

Figure 9:
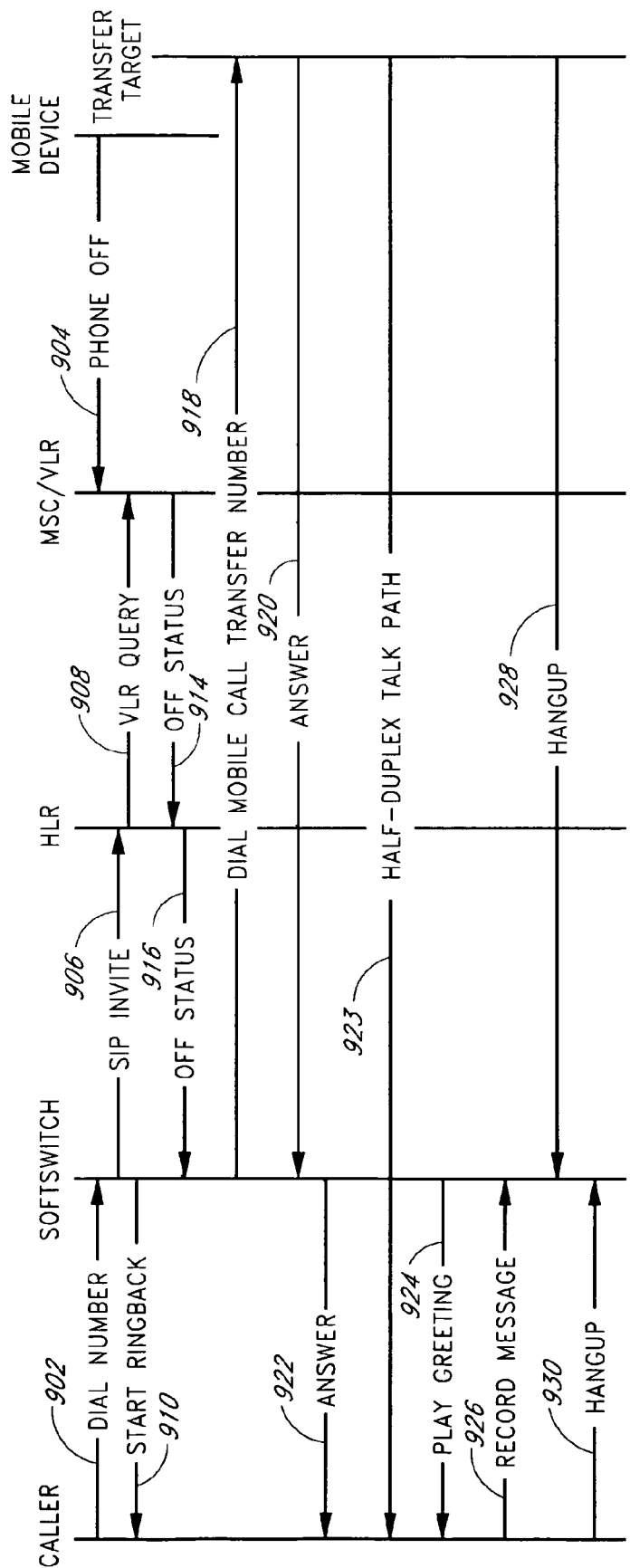
FIG. 9 illustrates an example call handling process where a called terminal is unavailable.

FIG. 9 illustrates an example call handling process where a called terminal is unavailable and call screening is enabled. For example, if the HLR indicates that the mobile device is Off, Out of Range, or otherwise unavailable, optionally an attempt is made to deliver the call to the configured mobile call transfer number (which can be another mobile device, a landline phone, a VoIP, or other destination). If the transfer fails, if it is not answered, or if no mobile call transfer number is configured, a message from the caller is recorded by the softswitch. The subscriber can then later access and playback the message. Optionally, an answer detection process is performed by the softswitch when placing an outcall that includes determining if a machine has answered the call (e.g., answering machine or voice mail), which is also optionally treated as a no answer condition.

Referring to FIG. 9, at state 902, a caller (via a caller telephonic device) dials a mobile access address associated with a subscriber's mobile device and the caller's call reaches a softswitch. At state 904, a determination is by the MSC/VLR that the mobile device is off (or unavailable). At state 906, the softswitch transmits a SIP invite to the HLR. At state 908, the HLR transmits a VLR query to the MSC/VLR. At state 910, the softswitch initiates a ringback to the caller telephone. At state 414, the MSC/VLR returns the Off status to the HLR. At state 916, the HLR returns the status of Off to the softswitch. At state 918, the softswitch "dials" the mobile call transfer number associated with the subscriber to place an outcall to the transfer target. At state 920, the transfer target associated with the transfer number is answered, and at state 922 the call between the caller and the softswitch is answered.

The inbound call and the outbound call are bridged. Because call screening is enabled, at state 923, a half duplex talk path is automatically established between the caller and the transfer target so that the subscriber can hear a message left by the caller, and the caller cannot hear the called party. At state 924, the softswitch plays a message to the caller asking the caller to leave a message. At state 926, the softswitch records a message from the caller. At state 928, the transfer target terminates the call (e.g., hangs up) between the transfer target and the softswitch. At state 930, the caller hangs up.

Figure 10:
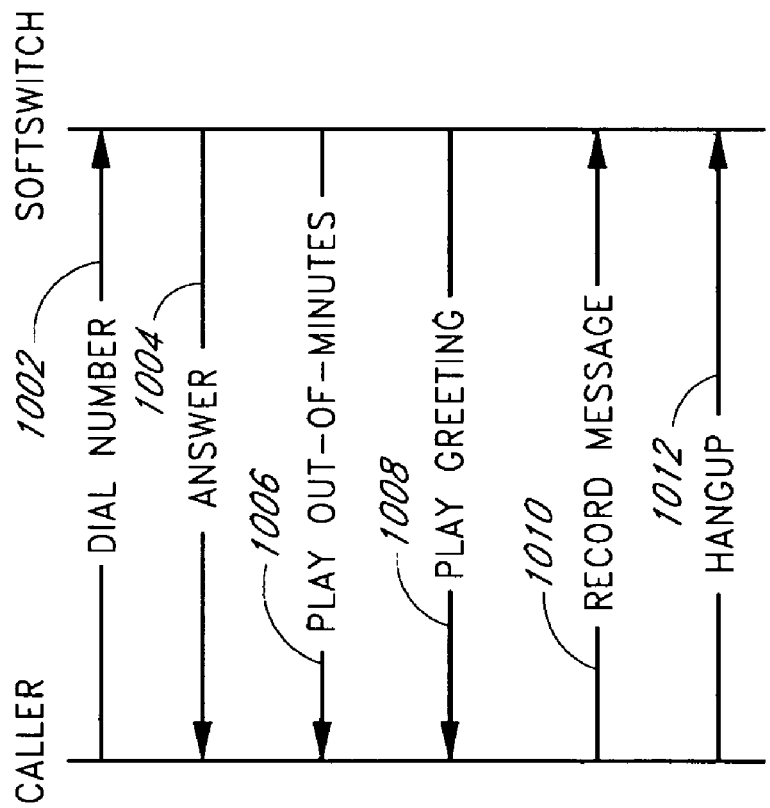
FIG. 10 illustrates another example call process wherein a call participant exhausts the participant's associated call minutes.

FIG. 10 illustrates another example call process wherein a call participant exhausts the participant's associated call minutes. If the subscriber has prepaid calling (e.g., where the subscriber has paid for a certain amount of call time, such as a certain number of minutes, prior to using the paid for call time), and there is less than a configurable predetermined amount of call time remaining in the account (e.g. one minute of call time), the caller is played a prompt informing them of the out-of-minutes condition or otherwise indicating that the call to the subscriber's terminal will not be completed, and a message is recorded as illustrated in FIG. 10.

At state 1002, the caller dials the phone number associated with the subscriber. At state 1004, the softswitch determines that an out of minutes condition is present (where the subscriber has less then a certain amount of prepaid call time remaining), and answers the call. At state 1006, the softswitch plays an "out of minutes" notification to the caller that indicates that the subscriber is out of call time or that indicates that the call to the subscriber's terminal cannot be completed (without giving a reason), and that indicates that the caller will be able to leave a message. At state 1008, the softswitch transmits a greeting to the caller asking the caller to leave a message. At state 1010, the message, if any, being left by the caller is recorded by the softswitch for later access by subscriber. At state 1012, the caller hangs up, and the call is terminated.

With respect to outcalls from the mobile device, when a phone call is placed via the mobile device, the caller ID field associated with that call is optionally populated with the subscriber's mobile access address. As similarly discussed above, in an example embodiment, outgoing calls do not route through the softswitch but optionally the MVNE does forward a call detail record to the softswitch for calls so that call time (e.g., minute) usage can be tracked.

If a subscriber has a prepaid account, the when prepaid call time (e.g., prepaid minutes) is exhausted, the softswitch optionally informs the MVNE HLR so that further outgoing call attempts from the mobile device get rejected (although certain call may still be allowed, such as calls placed to the softswitch or emergency calls to 911). Optionally, there is no announcement of remaining minutes by the softswitch when an outgoing call is initiated from the mobile device, but there is a call rejection announcement when the account is out of minutes. Optionally detecting minute depletion is performed while an outgoing call is in progress.

Figure 11:
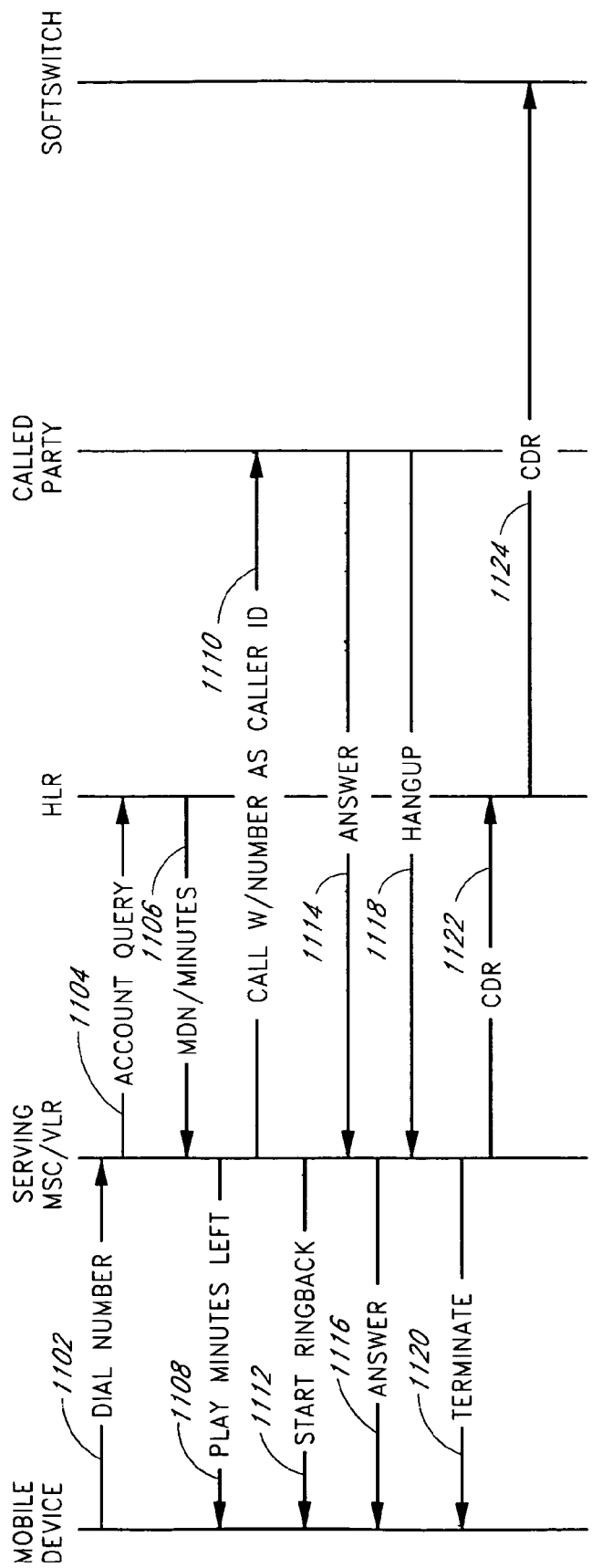
FIG. 11 illustrates an example call handling process where an outgoing call is placed from a prepaid phone terminal.

FIG. 11 illustrates an example call handling process where an outgoing call is placed from a prepaid phone terminal to a called party. At state 1102, the subscriber dials a called party phone number via the mobile device, which is received by the servicing MSC/VLR. At state 1104, the MSC/VLR transmits an account query to the HLR. At state 1106, the MVNE HLR transmits the remaining prepaid call time (e.g., the remaining minutes) to the MSC/VLR. At state 1108, the MSC/VLR informs the subscriber via the mobile device of the remaining call time.

At state 1110, the MSC/VLR provides the mobile access address in the call signaling caller ID field associated with the call to the called party. At state 1112, the MSC/VLR starts the ringback to the mobile device. At state 1114, the called party answers the call via the called party telephonic device. At state 1116, the MSC/VLR causes call completion between mobile device and the caller's telephonic device. At state 1118, the called party hangs up. At state 1120 the call connection to the mobile device is terminated. At state 1122, a call detail record (CDR) associated with the call is transmitted by the MSC/VLR to the HLR. At state 1122, the HLR sends the call detail record to the softswitch.

An outgoing call for a Postpaid or Flat Rate subscriber differs from the above process in that there is no minutes-left announcement.

Previously described are example methods of routing incoming calls to a mobile access address service. These calls route through the softswitch, with handling at least partly determined by feature settings and the current device status. Although an optional embodiment uses HLR integration, there may be situations in which HLR integration is not possible and/or desirable. In this case, features, such as Follow Me Home (wherein an incoming call is automatically transferred to a mobile call transfer number associated with the subscriber when the subscriber's mobile device is off or out-of-range) may optionally still be provided to the subscriber. For example, certain call handling features of the softswitch can be used to provide such functionality.

Figure 12:
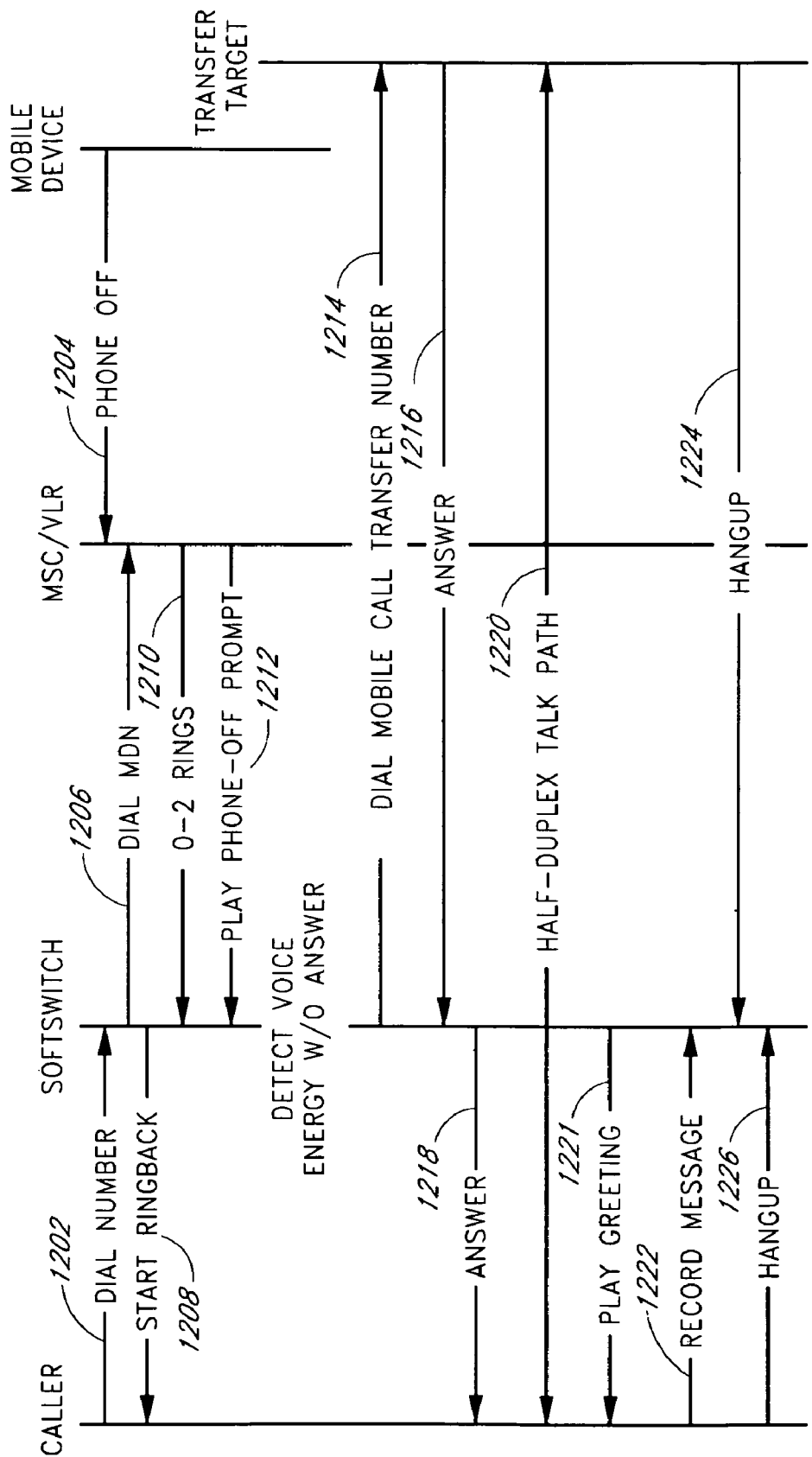
FIG. 12 illustrates another example call handling process where a called terminal is unavailable.

The example call scenario illustrated in FIG. 12 depicts status determination of a mobile device as being off/unavailable without HLR integration. This enables the softswitch to still deliver the call to the mobile call transfer number to provide Follow Me Home functionality. In this example, the mobile device has an assigned mobile access address, by which it is known to callers, and an internal Mobile Device Number (MDN), by which the softswitch connects to it in the wireless network. In this example, the mobile device is configured at the wireless carrier as having no forwarding and no voice mail service.

If the mobile device is off, after the softswitch dials the MDN, it may receive ringback from the MSC and then, without the MSC answering the call, the softswitch detects voice energy as a result of the MSC playing a phone-off prompt (normally to the caller but in this case, to the softswitch and not the caller since the softswitch has not yet connected this call leg to the caller). At this point, the softswitch knows that the mobile device is off or out-of-range, and so the softswitch dials a mobile call transfer number associated with an alternate phone of the subscriber to deliver the call to the alternate phone.

At state 1202, the caller dials the mobile access address. At state 1204, the MSC/VLR receives an indication that the subscriber's mobile device is off/unavailable. At state 1206, the softswitch dials the MDN associated with the mobile device. At state 1208, the softswitch begins the ringback to the caller telephonic device. At state 1210, a certain number of rings (e.g., 0-2) occur. At state 1212, the MSC/VLR provides an audible phone-off status prompt. The softswitch detects the voice energy associated with the prompt and the lack of a status of Answer from the MSC/VLR. At least partly in response, at state 1214, the softswitch dials the mobile call transfer number associated with a transfer target. At state 1216, the transfer target (e.g., another telephonic device) is answered. At state 1218, the call to the transfer target is bridged with the call from the caller. Because call screening is enabled, at state 1220, a half duplex talk path is automatically established between the caller and the transfer target so that the subscriber can hear a message left by the caller, and the caller cannot hear the called party.

At state 1221, the softswitch plays a message to the caller asking the caller to leave a message. At state 1222, the softswitch records a message from the caller. At state 1124, the transfer target hangs up, and at state 1226 the caller hangs up.

With respect to SMS messaging, as previously discuss, an SMS enabled mobile device can receive SMS messages originated from another mobile device. Such messages are optionally addressed directly to the device's mobile access address. A mobile device can also receive SMS messages that originate from the Internet. By way of example, such messages are addressed to <mobile access address>@<domain name>.<top level domain>. Incoming SMS messages (optionally, all SMS messages) for the mobile device route through the corresponding MVNE SMS Gateway. SMS messages (optionally, all SMS messages) originated from the mobile device optionally have the device's mobile access address as the sending address. The MVNE SMS Gateway handles routing for the outgoing SMS messages to other wireless carriers as needed.

For message accounting, the MVNE SMS Gateway optionally informs the softswitch or softswitch operator of each SMS message sent or received so that usage can be tracked for the account.

As discussed above, in certain situations, a caller may be prompted to record a message. Optionally, the prompt used is configured by the subscriber. For example, the subscriber may be provided with the option of selecting from the following prompt-types:

Standard System Greeting—generic system greeting prompt

Spoken Name Greeting—generic system greeting prompt with embedded name recorded by the subscriber Personal Greeting—prompt entirely recorded by the subscriber Optionally, the system prompts used when interacting with the caller can be in either a male or a female voice as configured by the subscriber.

If mobile call screening is enabled for a given call, the subscriber is able to listen to the caller while the message is being recorded. The subscriber can then interrupt the recording at a desired point to take the call. In this case, the message recorded up to that point is optionally stored and noted at the end as having ended because the call was taken.

When a message recording ends, a notification is sent to the locations configured/specified by the subscriber. The subscriber can optionally specify one or more of the notification mechanisms:

Email notification to a specified address, which defaults to the email address for the subscriber's account. The subscriber can also specify that the voice message is to be attached as a file to the email notification.

SMS message to the mobile device.

Voice message icon toggled on mobile device. This icon is toggled off (or other appropriate indication) when there are no un-reviewed messages.

A phone interface (e.g., an IVR) is optionally provided via the softswitch or other system for the subscriber to call in to review messages. The mobile device is optionally configured with a speed dial of 1 (or other designated user interface) for dialing the phone interface. The phone interface is also optionally accessible by directly dialing the mobile access address from the mobile device or from another phone. Optionally, access to recorded message (e.g., for playback to the subscriber) is provided upon entry of an account password associated with the subscriber account. If access is requested from the mobile device, optionally, the subscriber does not need to enter a password to review the recorded messages.

In an example embodiment, message review begins with a count of the number of new messages and then optionally immediately begins reviewing the first new message. Messages are reviewed in first-in-first out order, last-in-last-out order, via random access, or otherwise. After playing back a given message, the subscriber is given the option of deleting or saving the message. After the subscriber has reviewed new messages, the subscriber can elect to review saved messages.

Before, during, or after message review, the subscriber can elect to perform administrative functions, including some or all of the following:

Recording spoken name
Recording greeting
Setting Mobile Call Transfer Number

As similarly discussed above, a client application executing on a subscriber computer can be used to receive, edit, and display call log data from the softswitch (e.g., a list of calls placed to/received by the subscriber, or placed by the subscriber, including phone numbers, caller or called party names, date/time of the call, an indication as to whether a call was an outbound/inbound call, the city/state of the caller/called party, type of call (e.g., voice or fax), etc.), and call alert data (e.g., for an active call, listing the caller phone number, name, city/state, and/or call status (e.g., ringing, playing greeting, recording caller message, terminating call, forwarding call, conferencing call, displaying fax)). Optionally, when a call is received, the client application plays an audible signal, such as a ring tone. The client application can display a log of recorded messages from callers, and can provide playback controls (e.g., play, fast forward, rewind) for playing back or displaying the recorded message (e.g., a voice message, a video message, a fax message, etc.) via the client computer terminal. As previously discussed, the client optionally can also be used to screen calls (e.g., wherein the softswitch streams a message being left by a caller to the client so that the called party can listen to the message in substantially real time) and to instruct the softswitch to accept calls on the host computer terminal, forward calls, refuse calls, initiate call conferencing, and to otherwise provide call handling instructions.

For example, as similarly discussed above, when a call alert message is received by the client, as part of call presentation, a ringing sound is optionally played via the client host speakers. Optionally, the incoming call is displayed in a call alert user interface for a first amount of time (e.g., a set time, such as 5 seconds, or for a user configurable period of time), and then the call appears in the associated call log.

Certain embodiments described herein enable a user, such as a household, to have a phone shared by two or more household members (e.g., a phone intended to be utilized from one location, such as a home, or other shared phone-type) and personal mobile phones for individual household members. While certain embodiments refer to a shared fixed phone, the phones do not have to be fixed and/or shared. For example, a fixed phone can actually be a portable VoIP phone. While certain examples discussed herein may refer to enhanced service provider softswitch performing certain tasks, and receiving or transmitting certain messages, other communications or computer systems associated with other entities (e.g., a broadband service provider or VSP) can be used as well.

By way of example, the shared phone is optionally VoIP-based. The VoIP phone, by way of example, can be standard POTS phone (e.g., an analog phone, such as a fixed landline phone, such as a phone hardwired to a phone line, wherein a portable phone having a base station wired to a phone line is considered a standard POTs phone) or a VoIP-specific phone. The shared phone can be coupled to a broadband service provider connection (e.g., via a DSL modem, a cable modem, or other broadband interface). Optionally, the number assigned to the shared phone is ported from the customer's landline service provider (e.g., causing the underlying landline service to be canceled) or the number can be provided by a VoIP service provider. Calls to and from this phone route through a softswitch, optionally associated with an enhanced service provider, to offer enhanced call processing features such as screening, transfer, conferencing, and distinctive (optionally user selected) ringback.

With respect to the mobile telephonic devices (e.g., a telephonic device that is compatible with comply with one or more wireless network standards, such as, by way of example, GSM, CDMA, GPRS, HSCSD, 1 xRTT, EDGE, W-CDMA, 1xEV, TD-SCDMA, HSDPA, HSUPA, or other wireless protocol), household members can have their own mobile phone with a VoIP service provider local phone number assigned thereto. Calls to that number route through the softswitch to offer enhanced services, such as, by way of example, routing a call directed to the phone number to other points, such as, by way of example, the broadband service provider shared phone, another mobile phone, a conventional or unconventional landline phone, or other telephonic destination.

Figure 13:
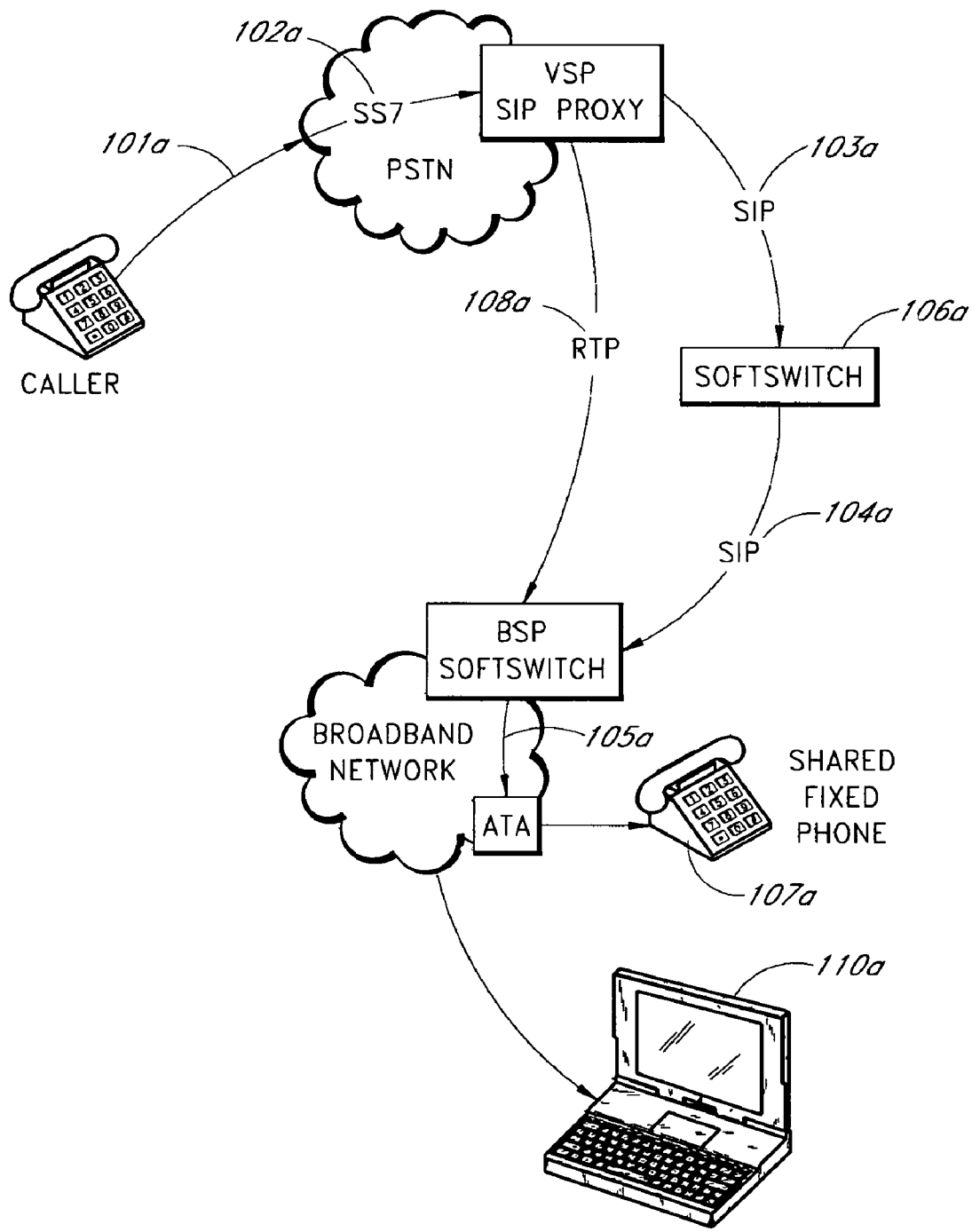
FIG. 13 illustrates an example embodiment of processing calls in a shared phone environment.

FIG. 13 illustrates example call processing, including an example of call processing with respect to a shared phone service. In this example, a caller initiates a call to a household's Broadband Service Provider (BSP) shared fixed phone/telecommunications device (e.g., an Internet Protocol telecommunications phone device coupled to a broadband data connection, such as a cable network or a DSL line), and the call is routed via a softswitch to give enhanced call processing feature control. The example enhanced service provider softswitches described below can optionally incorporate some or all of the systems, features, and functionality as described above with respect to FIGS. 1-12.

As similarly discussed above with respect to FIG. 1 and elsewhere herein, the user is optionally associated with a telecommunications client application hosted on a terminal 110A (e.g., a personal computer, laptop, interactive television, personal digital assistant, smart phone, entertainment device, etc.), via which the user can view incoming caller information (e.g., caller ID), access call logs of previously received/placed calls, access voice messages/faxes left by callers on a remote call processing system (e.g., a softswitch) and/or stored locally on the user computer system, screen calls (e.g., wherein voice messages being left by a caller on the call processing system are streamed in substantially real time to the computer system in half duplex mode so that the user can hear the caller, but the caller cannot hear the user), playback recorded messages from callers, accept screened calls, transfer calls, access an account management user interface (also referred to herein as a members' zone) to manage various features, etc. Presence detection can be performed by the enhanced service provider softswitch polling or pinging the subscriber terminal via the telecommunications client application, or by the telecommunications client application transmitting a "Login/I'm alive" message and subsequent periodic "keep alive" messages to the softswitch. Optionally, just prior to the normal termination of an online Internet session, the client application sends a "Logout" message to the softswitch. Optionally, abnormal Internet session termination conditions are detected by the softswitch timing out the expected Client "Keep alive" message. Thus, the softswitch is aware of the offline/online status of the terminal and client application.

The call processing system optionally stores user account records and provides functionality described herein.

Optionally, a call intended for a subscriber is first received at the softswitch (e.g., the caller dials or enters a phone address assigned or number ported to the softswitch and that is associated with the subscriber account). In addition, signaling (e.g., SIP or SS7 signaling) associated with the call is also received at the softswitch. By way of example, the signaling information can include the calling party's phone address and an indication as to whether the calling party phone address is restricted on blocked. The softswitch can originate a second call to a telephonic destination associated with the subscriber wherein the signaling information associated with the second call includes an identifier associated with the calling party (e.g., so that the second call appears to be originating from the calling party). The softswitch then bridges the first call with the second call so that the caller and subscriber can converse. Optionally, the softswitch will initially prevent the caller from hearing the subscriber (e.g., by muting the talk path from the subscriber to the caller telephonic device) and the softswitch plays a message asking the caller to record a message. While the caller leaves a message, the softswitch records the message and streams the message to the subscriber so that the subscriber can screen the call. Then, if the subscriber so desires, the subscriber can instruct the softswitch to establish a full duplex talk path so that the parties can converse.

Referring to FIG. 13, the example call handling sequence is as follows:

101A. A caller dials the phone number assigned to the shared phone (e.g., a fixed phone associated with a BSP)). Optionally, the subscriber also has a computer or other terminal 110A hosting a telecommunications client, as similarly discussed above, which is coupled to the enhanced service provider softswitch via the Internet.

102A. The phone number is recognized in the PSTN as assigned to/owned by the VoIP Service Provider (VSP) and so the call is routed to the VSP's switch serving that number.

103A. The VSP SIP Proxy converts the PSTN call to SIP format and informs a softswitch associated with an enhanced service provider of the call.

104A. The enhanced service provider softswitch recognizes the call as being directed to a BSP subscriber with the converged service (e.g., by comparing the called number/address with those in a subscriber database, determining that the called party is a subscriber, accessing the subscriber's account record, and determining that the subscriber has converged service enabled) and so the softswitch initiates a SIP call to a BSP softswitch serving the broadband network. As similarly described above, the ESP softswitch can transmit some or all of the call signaling information associated with the call and/or other information, such as the caller name, calling phone number, caller location, whether the call is private or restricted, and/or the calling device type, etc, to the telecommunications client, wherein the client can provide a call alert notification, and present some or all of the information to the subscriber.

105A. The BSP softswitch, which optionally includes a mapping of phone numbers to Analog Telephone Adapter attachments stored in memory, maps the phone number being called to the ATA (Analog Telephone Adapter) to which the shared fixed phone is attached, and initiates ringing. When someone answers the shared phone, an Answer indication is propagated back through the networks.

106A. When the enhanced service provider softswitch receives the Answer indication, the enhanced service provider softswitch opens a channel to a voice mail system (optionally hosted by the ESP softswitch or optionally separate from the ESP softswitch) and establishes a one-way, half-duplex talk path (e.g., wherein the talk path from the called party phone to the caller phone is muted) to the shared fixed phone so that the person answering the phone can screen the call while a message is being recorded (the called party can hear the caller leave a message) and the caller cannot hear the called party. In this example, during screening the RTP stream (or other appropriate packet format) associated with the caller message routes from the VSP SIP Proxy to the enhanced service provider softswitch to the BSP softswitch.

107A. The person that answered the shared phone provides a first designated input, such a keypresses 1 (when keypresses are referred to, other appropriate user interfaces, such as other hard or soft keys, voice commands, etc. can be used as well), to end screening and take the call (so the called party can converse with the caller).

108A. The enhanced service provider softswitch detects the DTMF corresponding to the keypress of '1' (or other appropriate user input), optionally ends the recording of the caller message, and opens up a two-way talk path between the caller and the person that answered the shared phone. In this example, the two-way, full duplex talk path is established by rerouting the RTP stream to go directly between the VSP SIP Proxy and the BSP softswitch, optionally without being routed through the enhanced service provider softswitch. In this example, the enhanced service provider softswitch remains in control of the call via its SIP connections to the VSP SIP Proxy and the BSP softswitch, and receives DTMF out-of-band signaling for call processing feature controls, if any (e.g., keypress 2 to transfer the call, or keypress 3 to conference in other parties). For example, the signaling can be provided to the ESP softswitch by the BSP softswitch using a SIP Info message.

Once the parties are connected in full duplex mode, the ATA can digitize and packetize voice communications from the fixed phone user, prior to transmitting the voice communications via SIP.

If the call to the shared fixed phone goes unanswered (e.g., is not answered after a subscriber or system specified number of rings or time period, such is optionally specified in the subscriber's account record) the enhanced service provider softswitch detects that the call has not been answered and, based on the subscriber account record (e.g., wherein the subscriber or the system operator specified call treatment for unanswered calls) acts appropriately to take a message or deliver the call to one or more mobile phones (e.g., one or more of the personal mobile phones associated with a household member) with or without screening enabled. One or more household members are optionally notified via their mobile phone or other device of missed calls via instant messaging, an icon, SMS and/or email as desired (e.g., as specified by the user and/or system operator in the account record associated with the shared phone). In addition, if a message was left, optionally the BSP softswitch is requested by the voice mail system to turn on the message waiting indicator for the shared fixed phone (e.g., wherein the indicator is displayed via the telecommunications client and/or on one or more personal mobile phones associated with one or more household members).

In an example embodiment, when a call originates from the shared fixed phone, the call is routed in the reverse direction of that illustrated in FIG. 13, with a direct RTP stream between the BSP softswitch and the VSP SIP Proxy (optionally without the voice portion passing through the ESP softswitch), and with SIP control passing through the enhanced service provider softswitch so that the transfer and conferencing features are available to the person making the call.

Figure 14:
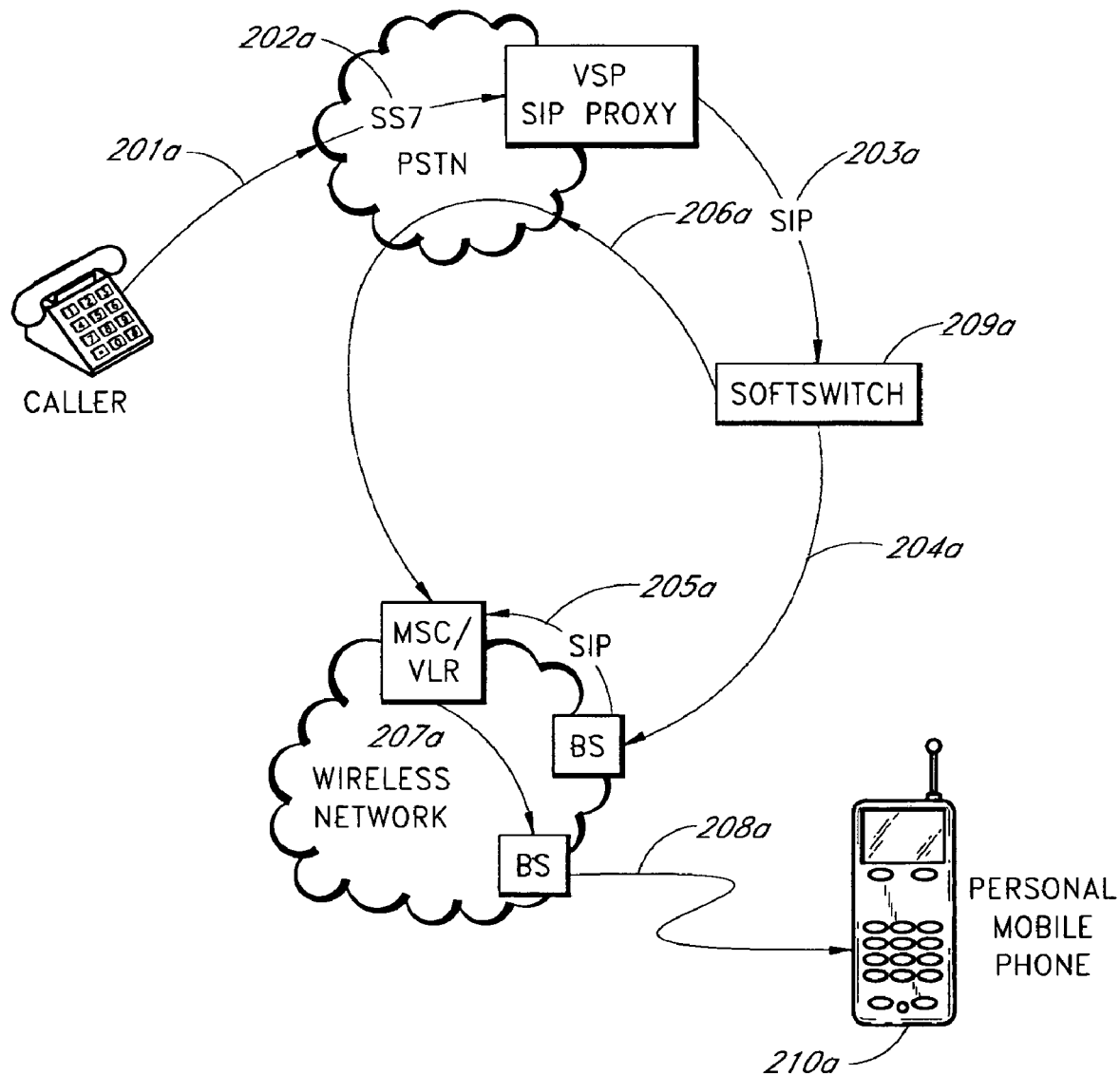
FIG. 14 illustrates an example embodiment of processing a call directed to a personnel mobile phone.

FIG. 14 illustrates an example embodiment of processing a call directed to a personnel mobile phone associated with a subscriber. In this example, it is assumed that the mobile service is being offered by the BSP, although the mobile service can be offered by another entity. For example, the BSP can offer the service directly or through an MVNO arrangement via the enhance service provider.

In particular, in this example, a caller initiates a call to a BSP personal mobile phone and the call is routed to the mobile phone via the enhanced service provider softswitch. The example call handling sequence is as follows:

201A. A caller dials the phone number assigned to the personal mobile phone.

202A. The phone number is recognized in the PSTN as associated with/owned by the VSP and so the call is routed to the VSP's switch serving that number.

203A. The VSP SIP Proxy converts the PSTN call to SIP and transmits a notification to the enhanced service provider softswitch regarding the call.

204A. The enhanced service provider softswitch queries the HLR (or other database including mobile phone status) to obtain the status of the personal mobile phone so that the enhanced service provider can determine how to handle the call.

205A. The HLR in turn queries the Visitor Location Register (VLR) (or other database providing status and/or location information) of the Mobile Switching Center (MSC) currently serving the personal mobile phone to determine its status and location.

206A. In this example scenario, the personal mobile phone is accessible, so the enhanced service provider softswitch routes the call through the PSTN to the MSC serving the personal mobile phone in the given wireless network.

207A. The MSC consults its VLR for the current location of the personal mobile phone so that the MSC can route the call to the specific Base Station (BS) serving the phone.

208A. The BS delivers the call to the personal mobile phone and the user of the phone answers. This causes an Answer indication to be propagated back through the networks.

209A. When the enhanced service provider softswitch receives the Answer indication from the personal mobile phone, it opens a channel to a voice mail system (which can be included in or separate from the softswitch) and establishes a one-way, half-duplex talk path to the mobile phone so that the person answering the phone can screen the call while a message is being recorded without the caller being able to hear the person answering the phone.

210A. The person that answered the phone keypresses 1 (or provides other appropriate user input) to take the call and when the enhanced service provider softswitch detects the DTMF signal, the voice mail system optionally ends the recording and opens up a two-way, full-duplex talk path between the two parties, so that the caller and the person answering the phone can converse.

While the call is active, the person answering the phone has the option of keypressing 1 (or providing other appropriate user input) to take the call (end screening), 2 (or other appropriate user input) to transfer the call to the shared fixed phone or another phone, or 3 (or other appropriate user input) to conference in other parties. If the given personal mobile phone had been turned off or was busy, the enhanced service provider softswitch would know via the response to the HLR query, and could act appropriately to take a message or deliver the call to the BSP shared fixed phone or to another configured phone. The owner of the personal mobile phone is notified of missed calls via the phone's message waiting icon, SMS, client application, browser interface, and/or email as desired (e.g., as specified in the account record associated with the personal mobile phone owner).

When a call is originated from a personal mobile phone, the call is optionally routed through the enhanced service provider softswitch to give the subscriber call transfer and conferencing feature control as similarly described above with respect to inbound calls. This also enables the enhanced service provider softswitch to perform substantially real time usage tracking (e.g., tracking of call time, called phone addresses, etc.).

Optionally, the BSP is a point of registration for the converged fixed/mobile phone service embodiments described herein, although optionally other or additional points of registration can be provided (e.g., the enhanced service provider, a cell phone provider, or other entity). Optionally, a customer subscribing to this service is limited to one shared fixed phone (phone address) but can have one or more personal mobile phones with corresponding phone addresses. Optionally, a customer subscribing to this service can have one or more shared fixed phones. Optionally, the number of mobile phones that a customer can utilize as part of the service is recorded in an account record associated with the customer, and optionally is based, at least in part, on the service package subscribed to by the customer.

In an example embodiment, when a converged fixed/personal phone customer subscribes to service via the BSP, an account is manually or automatically created for that customer at the enhanced service provider system (e.g., on a softswitch or other computer system), and the fixed and/or mobile phone being purchased at that point is associated with that new account. If an additional phone is purchased under this service agreement, optionally, another enhanced service provider account is created for that phone and aggregated with the original account. Optionally, the aggregated account tracks the feature settings and ongoing call/message data associated with the new phone, thus providing individual feature control and privacy per phone (e.g., stored in one or more account records associated with a given customer and the customer's phones).

The term subscriber is used in the discussion below to refer to a person or entity associated with an account, (e.g., the primary user of one of the fixed or mobile phones purchased as part of the service, or someone subscribing on behalf of such a user). The term customer is used here to more broadly refer to the overall owner of the service being purchased, such as the person or entity responsible for paying the bill. While certain examples below may refer to a subscriber performing a certain act or receiving certain information, optionally the customer may perform the act or receive the information.

Optionally, provisioning of service for a shared fixed phone may be dependent upon whether the customer has requested to port the phone number from their current landline service. The table below describes example states involved in one embodiment of provisioning the new service for a fixed phone when porting has been requested. In other embodiments, the responsibilities can be otherwise assigned. For example, the BSP and/or the VSP can also provide some or all of the functionality of the enhanced service provider.

TABLE 3

| State | Responsibility | Action |
|---|---|---|
| 1 | BSP | Gather customer information including some or all of the following: name, service address, billing address for current service, phone number to be ported, current service provider, desired cutover date, contact phone number, email address The BSP forwards the customer information to the enhanced service provider. |
| 2 | Enhanced service provider | Create account to initialize service. Initiate number port with VSP. Contact customer as needed to resolve any porting issues. Communicate committed cutover date to BSP. |
| 3 | VSP | Interact with customer's existing carrier to initiate number port. |
| 4 | BSP/VSP | Configure softswitches and proxies to service new number. |
| 5 | BSP/Customer | Provide VoIP phone and/or install Analog Telephony Adapter (to connect one or more standard analog telephones to a Voice over IP based network), and/or broadband modem (e.g., cable modem or DSL modem). Optionally run connectivity tests. |
| 6 | BSP | Inform customer that service has been cutover. Connect phone and begin service. |

If number porting is not involved or needed, the BSP does not need to gather current phone service information. The BSP optionally substantially immediately assigns a local phone number from the VSP number pool when the customer registers. Service optionally begins for the customer as soon as the VoIP phone is connected or as soon as an ATA (optionally including a RJ-11 jack) is installed and an analog phone is plugged in.

The fixed phone telecommunications device used for this part of the service is optionally defined by the BSP, but in a landline replacement situation, optionally the customer is able to reuse their existing POTS phone (e.g., by plugging it into the RJ-11 jack of the ATA). Optionally, the ATA is locked so it cannot be used with another provider company, and optionally the user can only partly change its configuration. Optionally, the ATA is unlocked so it can be used with another provider company, and optionally the user can fully change its configuration.

The ATA communicates with a remote VoIP server using a VoIP protocol. For example, the ATA can utilize SIP, H.323, IAX, MGCP or other protocol. The ATA encodes (e.g., digitizes and packetizes for transmission over an IP network) and decodes a user's voice signal using a voice codec. Optionally, a SIP-compatible phone can be used. The SIP phone can be plugged into an ATA jack (e.g., a RJ-45 jack) of a broadband modem. Other phone-types can be used as well (e.g., including phone compatible with other open or closed VoIP protocols, and/or with peer-to-peer models) such as a Skype compatible phone or an H.323 compatible phone.

Where the BSP and the enhanced service provider are separate entities, in an example embodiment during provisioning the BSP transmits customer and/or subscriber information to the enhanced service provider and the service provider returns the account number or other identifier associated with the customer and/or subscriber. For example, the BSP can communicate with the service provider via a Business-to-Business (B2B) interface. The information transmitted by the BSP can include some or all of the following:

Name
Service address
Assigned phone number
Contact phone number
Account number
Email address
Whether number to be ported, and if so
Service provider
Billing address
Chosen feature package offer
Parent enhanced service provider account number, if any The enhanced service provider account provisioned for the subscriber optionally includes some or all of the features discussed in the table below. The features are optionally associated with the example default settings described below. Different subscribers can have different features and/or different default settings. The features can be defined in a package offer associated with the given subscriber registration. Optionally, the feature package offers can be defined in part by the enhanced service provider and/or is deferred to the BSP per their marketing campaigns for this service. Subscriber customization of the feature set is optionally stored in an account record associated with the subscriber.

TABLE 4

| Feature | Description, | Default Setting |
|---|---|---|
| Call Screening | The ability to answer a call and listen while the caller records a message without the caller hearing the subscriber. The subscriber may enable it for all calls and enable/disable it for individual contacts (wherein the system can determine if a caller has been designated for screening based on the caller ID associated with the call, wherein the caller ID is used compared with those in the subscriber's call screening designations). During a call the subscriber can end screening by providing a corresponding user input (e.g., keypressing 1). | Per package offer/user account configuration |
| Call Transfer | The ability of a subscriber to transfer a call by providing a corresponding user input (e.g., keypressing 2) during a call. The subscriber may configure multiple Call Transfer Numbers to be used for the transfer, | Optionally, personal mobile phone numbers, if any, otherwise contact |

TABLE 4-continued

| Feature | Description | Default Setting |
|---|---|---|
| | optionally each with an associated DTMF digit (or other specified user input) (e.g., that can be keypressed following the call transfer 2 keypress) to direct the call to a specific phone. Optionally, if personal mobile phones are associated with the account, these numbers implicitly become the Call Transfer Numbers. The association of the user input (e.g., keypad number) with a call transfer number is stored in the user's account record. | phone number |
| Conferencing | The ability of a subscriber to conference in additional parties during a call by providing a corresponding user input (e.g., keypressing 3). If the 3 keypress is followed by a DTMF digit (or other appropriate subscriber input), the DTMF digit selects the conference participant from the configured Call Transfer Numbers. Optionally, the limit on the number of participants is set in the package offer. Optionally, an overall limit is set on a system wide basis (e.g., 8). | Per package offer/user account configuration |
| Distinctive Ringback | The subscriber can select from a set of ring tones to be used when playing ringback to the caller. | Standard ring tone |
| Private Number Screening | Prompting callers whose caller ID is blocked to reveal their caller ID in order for the call to be presented to the subscriber. The subscriber may enable/disable this feature. | Per package offer/user account configuration |
| Spoken Greeting | The greeting that is played to the caller in conjunction with screening or taking a message can be a standard system greeting, a spoken name greeting (generic system greeting prompt with embedded name recorded by the subscribed), or a personal greeting prompt recorded by the subscriber. The subscriber may record a name or personal greeting and may choose whether prompts and/or the standard system greeting are to be in a male or female voice and can optionally select from a variety of male/female accents | Standard system greeting in female voice |
| Caller Name Display | Use the signaling information (callerID) information) associated with the caller to locate and look up from a contact database the caller name. The caller name is then optionally transmitted to the subscriber computer/telephonic device for display. | Per package offer/user account configuration |
| Contact List Auto-Population | Use of incoming call information to auto-matically populate a contact list for the sub-scriber, optionally including telephonic addresses. The package offer controls the call frequency level required for a caller to be added to the list (e.g., automatically offer the user the ability to add a particular caller to the user's contact database upon receiving a specified number of calls from a given caller, optionally within a specified time period). | Per package offer/user account configuration |
| Computer client | Client, which can be downloaded by the subscriber to, and hosted on a computer (e.g., a personal computer) associated with the subscriber. The client can be used to screen calls, take calls, make calls, and/or review past calls and associated voice messages, if any, from the computer. The client is optionally branded with the BSP name/logo/skin/trademarks | Per package offer/user account configuration |

The subscriber can adjust feature settings via an account management user interface (e.g., a BSP-branded enhanced service provider members' zone on the Internet) or by calling an account service person associated with the enhanced service provider and/or the BSP (e.g., a BSP-branded enhanced service provider customer care office).

As discussed above, optionally, the BSP is a point of registration for a personal mobile phone. Optionally, the BSP is responsible for supplying a mobile device chosen by the customer or subscriber to the customer or subscriber. Optionally, instead, another entity can be a point of registration for a personal mobile phone and can be responsible for supplying the chosen mobile device to the customer or subscriber. The table below defines example states involved in provisioning the new service.

TABLE 5

| State | Responsibility | Action |
|---|---|---|
| 1 | BSP | Gather customer information including name and email address. Assign local phone number from VSP number pool. Send customer information to enhanced service provider. |
| 2 | Enhanced Service Provider | Create account and initialize service. |
| 3 | BSP | Supply customer with configured personal mobile phone. |

As similarly discussed above, during provisioning, the BSP transmits customer and/or subscriber information (e.g., some or all of the following name, assigned phone number, mobile device identifier, email address, instant messaging address, feature package selected by the subscriber, parent account number, etc.) to the enhanced service provider via a B2B interface and the enhanced service provider returns the account number.

In an example embodiment, the enhanced service provider account provisioned for the customer/subscriber is based on the personal mobile phone feature package. This feature package for a mobile phone can include some or all of the features defined in Table 5 above and/or some or all of the features defined in Table 6 below. The features are optionally associated with the example default settings described below. Different customers/subscribers can have different features and different default settings. The features can be defined in a package offer associated with the given customer/subscriber registration. Optionally, the feature package offers can be defined in part by the enhanced service provider and/or is deferred to the BSP per their marketing campaigns for this service. Customer/subscriber customization of the feature set is optionally stored in an account record associated with the customer/subscriber.

TABLE 6

| Feature | Description | Default Setting |
|---|---|---|
| Follow Me Home | Auto-transfer to the Call Transfer Number when the mobile phone is off or out-of-range. The subscriber may enable/disable this feature. | Auto-transfer to the shared fixed phone |
| Mobile Locator | Knowledge of the geographic location of the phone when delivering calls to the subscriber. The package offer determines whether this feature is allowed/enabled. If it is allowed the subscriber may enabled/disable it. With this feature, the subscriber is allowed to specify multiple Call Transfer Numbers and associate a geographic location with each to assist in determining where to transfer a call. | Per package offer/user account configuration |
| Enhanced Outcall | The availability of call transfer and conferencing features on outgoing calls. This feature is configured per the package offer. | Per package offer/user account configuration |
| Payment Plan | The payment for mobile service can be, by way of example, Prepaid, Postpaid, or Flat Rate. With Prepaid payment, once the allocated minutes are consumed, limited services are provided until the minutes are recharged (e.g., emergency 911 calls may be | Per package offer/user account configuration |

TABLE 6-continued

| Feature | Description | Default Setting |
|---|---|---|
| | allowed, but not other calls). With Postpaid payment, the cost of individual service usage is summarized in the billing section of the user's account which is accessible online (e.g., via a browser or a dedicated client). This feature is configured as per the package subscribed to. | |
| Domestic Roaming | The ability of the subscriber to use their mobile device within the US but outside of their local mobile serving area. This feature is enabled or disabled per the package subscription, optionally with region-based rates. When this feature is enabled, the enhanced service provider softswitch is aware of whether the mobile device is in roaming mode or not when the softswitch is determining how to handle and incoming call | Per package offer/user account configuration |

As similarly described above, the customer/subscriber can adjust feature settings via an account management user interface (e.g., a BSP-branded enhanced service provider members' zone, on the Internet) or by calling an account service person associated with the enhanced service provider and/or the BSP (e.g., a BSP-branded enhanced service provider customer care office).

A personal mobile phone subscriber is supplied with a mobile phone (e.g., by the BSP or the enhanced service provider). The underlying network may be GSM, CDMA, GPRS, HSCSD, 1xRTT, EDGE, W-CDMA, 1xEV, TD-SCDMA, HSDPA, HSUPA, or other wireless protocol, as chosen by the BSP. In an example embodiment, the mobile phone includes some or all the following capabilities:

Supports voice calls
Supports SMS messaging;
Has icons for indicating voice mail and SMS message status;
Has speed dial for use in accessing voice mail;
Has an email client;
Has an instant messaging client.

The mobile phone optionally includes the capability to synchronize its internal contact list (e.g., stored on a SIM card or otherwise) with the subscriber's contact list stored in the enhanced service provider softswitch and/or on a local computer associated with the subscriber (e.g., a personal computer). The synchronization is optionally performed when manually requested by the subscriber from the mobile device, via an account manager user interface, or otherwise. Optionally, the synchronization is automatically performed when an edit has been made to the internal contact list, the subscriber's softswitch contact data store, or the subscriber's local computer-based contact list, if the mobile device is on and connected.

A converged fixed/mobile phone may have additional virtual phone numbers assigned to it, (e.g., a number in another locality so that family and friends can make a local call to the subscriber). The subscriber can then receive calls on these additional numbers. Optionally, these virtual numbers will not be used as the caller ID in an outgoing call, although optionally the virtual numbers will be used as the caller ID in an outgoing call.

The additional virtual phone numbers are optionally assigned by the BSP from the VSP number pool and are communicated to enhanced service provider via the B2B interface.

Optionally, a subscriber may install a telecommunications client (e.g., a BSP-branded client provided by enhanced service provider) on one or more of terminals (e.g., a personal computer, laptop, interactive television, personal digital assistant, smart phone, entertainment device, etc.) to help manage calls and/or their contacts, as similarly described above. The client application can be used to provide some or all of the following features: receive, edit, and display call log data from the enhanced service provider and/or other softswitch (e.g., a list of calls placed to/received by the subscriber, or placed by the subscriber, including phone numbers, caller or called party names, date/time of the call, an indication as to whether a call was an outbound/inbound call, the city/state of the caller/called party, type of call (e.g., voice or fax), etc.), and call alert data (e.g., for an active call, listing the caller phone number, name, city/state, and/or call status and/or state transitions (e.g., ringing, playing greeting, recording caller message, terminating call, forwarding call, conferencing call, displaying fax)). Optionally, when a call is received, the client application plays an audible signal, such as a ring tone. The client application can display a log of recorded messages from callers, and can provide playback controls (e.g., play, fast forward, rewind) for playing back or displaying the recorded message (e.g., a voice message, a video message, a fax message, etc.) via the client computer terminal. As previously discussed, the client optionally can also be used to screen calls (e.g., wherein the softswitch streams a message being left by a caller to the client so that the called party can listen to the message in substantially real time) and to instruct the softswitch to accept calls on the host computer terminal, forward calls, refuse calls, initiate call conferencing, and to otherwise provide call handling instructions.

For example, as similarly discussed above, when a call alert message is received by the client, as part of call presentation, a ringing sound is optionally played via the client host speakers. Optionally, the incoming call is displayed in a call alert user interface for a first amount of time (e.g., a set time, such as 5 seconds, or for a user configurable period of time), and then the call appears in the associated call log.

Optionally, a separate call/message log is kept for each phone issued to a given customer and used with the service. Access to the enhanced service provider account associated with a particular phone is optionally controlled via individual subscriber logins.

The telecommunications client also optionally maintains the subscriber's contact list, which can be automatically populated from call signaling data.

A subscriber can originate a call from the telecommunication client using a call log entry (e.g., by selecting/clicking on an entry and, in an example embodiment, by activating a call control displayed on the host terminal display), a contact list entry (e.g., by selecting/clicking on an entry and, in an example embodiment, by activating a call control displayed on the host terminal display), or by entering a phone number into a user interface (e.g., using a keyboard). The enhanced service provider softswitch makes the call to the requested destination and then bridges it with a call to the phone associated with the account, e.g., the shared fixed phone.

With respect to call routing, as similarly discussed above, in an example embodiment, incoming calls to a shared fixed phone or a personal mobile phone route through the enhanced service provider softswitch. The softswitch handles incoming call based on the phone's status (e.g., busy, busy with call waiting, off, unavailable, available, no answer, almost out of call time—number of minutes remaining, etc.) and/or feature settings, examples of which are described in the tables above.

When the enhanced service provider softswitch receives a call, the softswitch determines the status of the phone being called. For a personal mobile phone, some or all of this information is obtained from the HLR serving that phone prior to attempting a connection. For a shared fixed phone the status is determined upon the softswitch attempting a connection to the called phone.

Example phone status values and associated example routing actions are shown in the table below. Other routing actions can be specified by the customer/subscriber and/or a system operator.

TABLE 7

Inbound Call Routing

| Status | Description | Action |
| --- | --- | --- |
| Ready | Phone is ready to accept a call | Route call to phone |
| Busy w/Call Waiting | Phone is servicing a call but has Call Waiting enabled and thus is ready to accept another call | Route call to phone |
| Busy | Phone is servicing a call or data session and is unable to service another call | Record a message |
| No Answer | Phone not answered after a configured time limit or number of rings | Record a message |
| Off | Turned off or out-of-range. Applies to personal mobile phone | Route call to Call Transfer Number if Follow Me Home feature is configured; otherwise record a message |
| Out of Minutes | Less than a configured amount of time (e.g., a minute) of service available for the phone. Applies to personal mobile phone with Prepaid service | Announce no service to caller and record a message |

Optionally, the enhanced service provider softswitch is also aware of the status of the telecommunication client associated with the phone being called (e.g., associated with the customer/subscriber being called). If the telecommunications client for the given account is active, incoming calls are presented to the client and/or to the phone being called. The user has the option of ignoring, screening, taking, or transferring the call at either device by activating an appropriate control (e.g., pressing a key on the phone and a user interface button on the client). If the telecommunications client user and the phone user both choose to take the call and those actions are successful, optionally the multiple parties are conferenced together with the caller.

Prior to routing an incoming call, Private Number Screening is applied, if enabled. If the caller has blocked their caller ID, the caller is prompted by the softswitch (e.g., via a verbal prompt) to reveal their caller ID (e.g., by pressing a release code, such as *82, and redialing the called party phone number). If the caller refuses to unblock their caller ID, and the feature is configured to require that the caller ID be revealed, the call is rejected.

Prior to an incoming call being answered, the caller hears ringback. The maximum length of this ringback is configured by the subscriber with a default (e.g., 24 seconds or other specified time period). If Distinctive Ringback is configured, the ring tone played is the one chosen by the subscriber, as indicated in the subscriber account record.

With respect to outgoing calls, in an example embodiment, calls originating from a shared fixed phone route through the enhanced service provider softswitch. Optionally, calls originating from a personal mobile phone route through the enhanced service provider softswitch only if the Enhanced Outcall feature is enabled for the account. Optionally, calls originating from a personal mobile phone route through the enhanced service provider softswitch whether or not the Enhanced Outcall feature is enabled for the account. Optionally, calls that route through the enhanced service provider softswitch can utilize call conferencing and call transfer features.

On an incoming call, if Call Screening is enabled for the account and if Call Screening is not disabled in the subscriber's contact list for the given caller, call screening is invoked by the enhanced service provider softswitch at the start of the call. The configured greeting is played by the voice mail system as configured by the customer/subscriber (e.g., the greeting can ask the caller to record a message) to the caller and a one-way talk path is established between the phone being called and the enhanced service provider telecommunications client so that the subscriber can listen to the caller as the caller is leaving a message before deciding to take the call. The message is recorded via the voice mail system.

During call screening, the customer/subscriber can choose to take the call by providing a corresponding user input (e.g., by keypressing 1) via the phone or by clicking a Take Call control (or other corresponding control) on the telecommunications client. If a "take the call" instruction is provided via the phone, the softswitch substantially immediately causes the talk path to become two-way. Additionally, optionally, the telecommunications client drops away from the call. If a "take the call" instruction is provided via the telecommunications client, the call is substantially immediately routed to the default Take Call location or to a phone selected from a client menu (e.g., listing pre-specified phone destinations and/or associated numbers). Once the transfer has been performed, the phone user is so informed. Optionally, in response to a take the call instruction, the voice mail stops recording the caller's speech for later retrieval. Optionally, the recording up until the "take the call" instruction was received is available for later retrieval by the subscriber. Optionally instead, the recording is deleted at least partly in response to the "take the call" instruction.

The Call Transfer feature enables a customer/subscriber to transfer a call to a configured Call Transfer Number during a call by providing an appropriate input (e.g., keypressing the 2 key). The call transfer instruction can be provided by the customer/subscriber during or after screening.

The subscriber can hang-up the phone after providing the call transfer instruction. If the leg of the call to the original phone is not terminated before the transferred call leg is established, the three call legs are optionally conferenced together and optionally any of the legs can hang-up without causing the other two (or more legs) to be terminated.

If, during a call transfer, the enhanced service provider softswitch detects that the called number is busy, not answered, or answered by voice mail or an answering machine, optionally the softswitch informs (e.g., via an audible announcement) some or all of the remaining call participants that the transfer failed.

If multiple Call Transfer Numbers are configured for the account, the subscriber also can specify to which Call Transfer Number the call should be transferred to. For example, the subscriber can first provide a call transfer instruction (e.g., 2 keypress) followed by a transfer destination instruction. By way of illustration, the softswitch may verbally instruct the subscriber via the phone to keypress another number associated with a specific Call Transfer Number. For example, press 3 to transfer to a home phone, press 4 to transfer to a work for phone, press 5 to transfer to a specific mobile phone, etc. Optionally, if multiple Call Transfer Numbers are configured for a given customer/subscriber/account, and the user does not actively specify (e.g., via a corresponding keypress) to which destination the call is to be transferred, the softswitch automatically transfer the call to a default destination (e.g., the first Call Transfer Number, unless the Mobile Locator feature is enabled).

Optionally, if the Mobile Locator feature is enabled and multiple Call Transfer Numbers are configured, the geographic location of the personal mobile phone, if available, is compared to that of each number to determine whether the device is in its proximity. By way of example, each phone number (or a subset thereof) is optionally provisioned with a location (e.g., a GPS location, a latitude/longitude location, an address, a zip code, etc.), by way of example, which is stored in the subscriber's account record. If the subscriber's location is known and the subscriber wants to transfer a call from his/her mobile phone to a wireline phone, the system will place a call to the phone number associated with the location closest to the subscriber's mobile phone based on the location information associated with the mobile phone and that retrieved from the subscriber account record. If there is a match, optionally the call is transferred to that number, otherwise some or all of the customer/subscriber Call Transfer Numbers are called substantially simultaneously and optionally, any calls that are answer are conferenced together. Optionally, instead, the first call answered is connected, and the legs to the other Call Transfer Numbers are dropped.

As discussed above, a conferencing features is provided via which a subscriber can conference one or more other party's by providing an appropriate instruction (e.g., by keypressing the 3 button). A subscriber can add one or more conferees during a two-way call or during a multi-party conference. Optionally, a maximum number of participants allowed in a conference is set in the feature package associated with the subscriber, as indicated in the account record associated with the subscriber. Optionally, if so enabled, this feature can be available on all calls routed through the enhanced service provider softswitch to the subscriber.

As similarly described elsewhere herein, after providing a call conferring instruction (e.g., by keypressing the 3 button), the subscriber may enter another instruction (e.g., by pressing another phone button) to select the new conference participant from the set of Call Transfer Numbers configured for the account. Optionally, if no additional instruction is entered after the initial conferring instruction with a predetermined amount of time, the ESP softswitch plays a prompt requesting that a phone number for the other party be entered. If during the attempt to connect to that phone number the enhanced service provider softswitch detects that it is busy, not answered, or answered by voice mail or an answering machine, the ESP softswitch announces to the subscriber and/or the other conference participants that the requested person is not available.

When a conference participant hangs up (or otherwise terminates the participant's leg of the call), optionally the conference does not terminate until only one person remains on the call. Optionally, the conference will terminate if one or no subscriber remains on the conference call.

As previously discussed, when a caller calls a subscriber number assigned to the ESP softswitch, optionally a voice message is recorded by the voice mail system. When a message recording ends, optionally, a notification is sent to one or more destinations configured or specified by the subscriber. The subscriber and/or a system operator can configure one or more of the following notification mediums:

An email notification, wherein an email notification is sent to a specified address, which optionally defaults to the email address for the account as specified in the customer/subscriber account record. Optionally, the subscriber can specify that the voice mail message be attached to the email as a file, or that a link to the voice message is to be attached or embedded in the email.

An SMS message, wherein an SMS message is sent to the configured mobile phone. For a personal mobile phone account, the SMS message destination defaults to the personal mobile phone associated with the subscriber. For a shared fixed phone account, optionally there is no default, or the default is to a non-phone SMS enabled device associated with the account.

In addition, a voice message indicator can be toggled on the subscriber phone (audio and/or visual depending on the phone). For example, a personal mobile phone a voice message indicator is often provided in the form of a visual icon and/or text notification. For a shared fixed phone, a variety of notifications can be provided, which may be a function of the BSP softswitch to which the enhanced service provider softswitch communicates the message waiting status.

Optionally, a phone interface is provided via which the subscriber can call in to review messages. Optionally, a personal mobile phone is configured with a dedicated control (e.g., speed dial keypress of 1) for dialing the voice mail interface. Optionally, the voice mail interface is also accessible by directly dialing the phone number for the account from other phones, transmuting the message recording session to a message review session by keypressing * or by providing other appropriate control, and entering a password.

Optionally, the voice mail system initially provides, via a voice interface, with a count of the number of new messages. Optionally, the voice interface substantially immediately begins playing back the first new message via the subscriber phone. Optionally, messages are reviewed in first-in-first out order. Optionally, messages are reviewed in last-in-first out order. Optionally, the user can skip messages, delete messages, and save messages. For example, after a given message, the subscriber is given the option of deleting or saving the message. After new messages are reviewed or skipped, the user can review previously saved messages.

Via the phone interface and/or the client application (e.g., during message review or otherwise), the user can perform administrative operations. For example, the user can select one or more of the following operations:

Record a spoken name
Record a greeting
Set a Call Transfer Number

The number of call minutes to and/or from a personal mobile phone is optionally tracked by the enhanced service provider softswitch. Optionally, such call minute tracking is not performed for a mobile phone associated with Flat rate service. Such call minute tracking can be provided to one or more entities/customers/subscribers described herein as a report or otherwise.

As similarly discussed elsewhere herein, for a phone with Prepaid service, the current number of call minutes remaining in the corresponding account affects the call handling behavior. For example, as indicated in the tables above, an incoming call to a phone that is out of minutes optionally results in an announcement of no service to the caller. Optionally, a message from the caller is still recorded for later retrieval by the called party.

For example, if a determination is made by the ESP softswitch or other system that a first time threshold (e.g., 30 minutes) has been reached prior to the complete usage of the call time remaining, the softswitch plays or whispers (mixes incoming audio signal/called party speech with lower level audio prompt) an out-of time warning (e.g., "You have only 30 seconds of call time remaining" or a beep tone) via the talk path to the mobile device, wherein the other call participant(s) optionally are prevented from hearing the warning. When there is no call time remaining in the account, the softswitch plays an "out of call time" warning prompt, which optionally states that the call time has been used up and/or that the call is about to be terminated. Such prompt is optionally played to both the caller and the called party.

Optionally, when the subscriber is out of call time or reaches a certain other threshold of call time, the softswitch plays a recorded or voice synthesized prompt asking the subscriber if the subscriber wants to purchase additional call time. The message can specify how the subscriber can provide a response (e.g., press 5 on the telephonic device to purchase an additional 1 hour of call time, press 6 to purchase an additional 2 hours of call time, and press 7 to decline to purchase additional call time; or provide a verbal command indicating how much call time the subscriber wants to purchase, wherein the additional time is billed to the account associated with the subscriber and/or phone). Optionally, if the subscriber does not respond to the prompt, the softswitch interprets the lack of response as indicating that the subscriber does not want to purchase additional call time during the present call and terminates the call. Optionally, rather than using an automated prompt process, a live operator interacts with the subscriber to determine if the subscriber wants to purchase additional call time and to process such purchase.

When a call is originated from a phone with Prepaid service, optionally there is an announcement of the remaining minutes if the call is routed through the enhanced service provider softswitch. Optionally, the call is rejected with an announcement played to the caller if the phone is out of minutes.

As similarly described above, an account management interface (e.g., in the form of one or more Web pages) can be accessed by the subscriber. Via the account management interface, subscribers can access account information and make configuration changes. The interface optionally includes one or more of the following sections, which are optionally provided as tabbed user interfaces:

Account Summary—summarizes selected service, phone numbers, and address information Choose Features—lists features with their current settings and allows subscriber to modify them Review Billing—lists current outstanding charges and how billing is to occur; for Postpaid service this includes charges per call; it also states any SMS and data connection charges Get Help—menu of areas in which to get help Tell Your Friends—opportunity to tell others about the service offered by the softswitch operator.

The ESP softswitch optionally hosts and stores electronic address books for subscribers, wherein a subscriber can update the address book, edit contact records, or add contact records via Web forms hosted by the softswitch.

Optionally, a first level of customer service is provided by the enhanced service provider, optionally with BSP-branding. Optionally, the BSP and/or its partners provide second and third level support. Optionally instead, the first level of customer service is provided by the BSP and/or its partners. Optionally, billing interactions with Converged Fixed/Mobile Phone Service customers is via the BSP and/or the ESP.

An example embodiment of the integration between the ESP and the BSP for the Converged Fixed/Mobile Phone Service are described below.

First, several example call scenarios that illustrate the interaction between network components for routing calls to/from a fixed phone will be described. These embodiments provide the ability to route keypresses (e.g., DTMF phone keypad keypresses) to the enhanced service provider softswitch from the BSP softswitch and the VSP SIP Proxy when the SIP Media Session bypasses the enhanced service provider softswitch.

Figure 15:
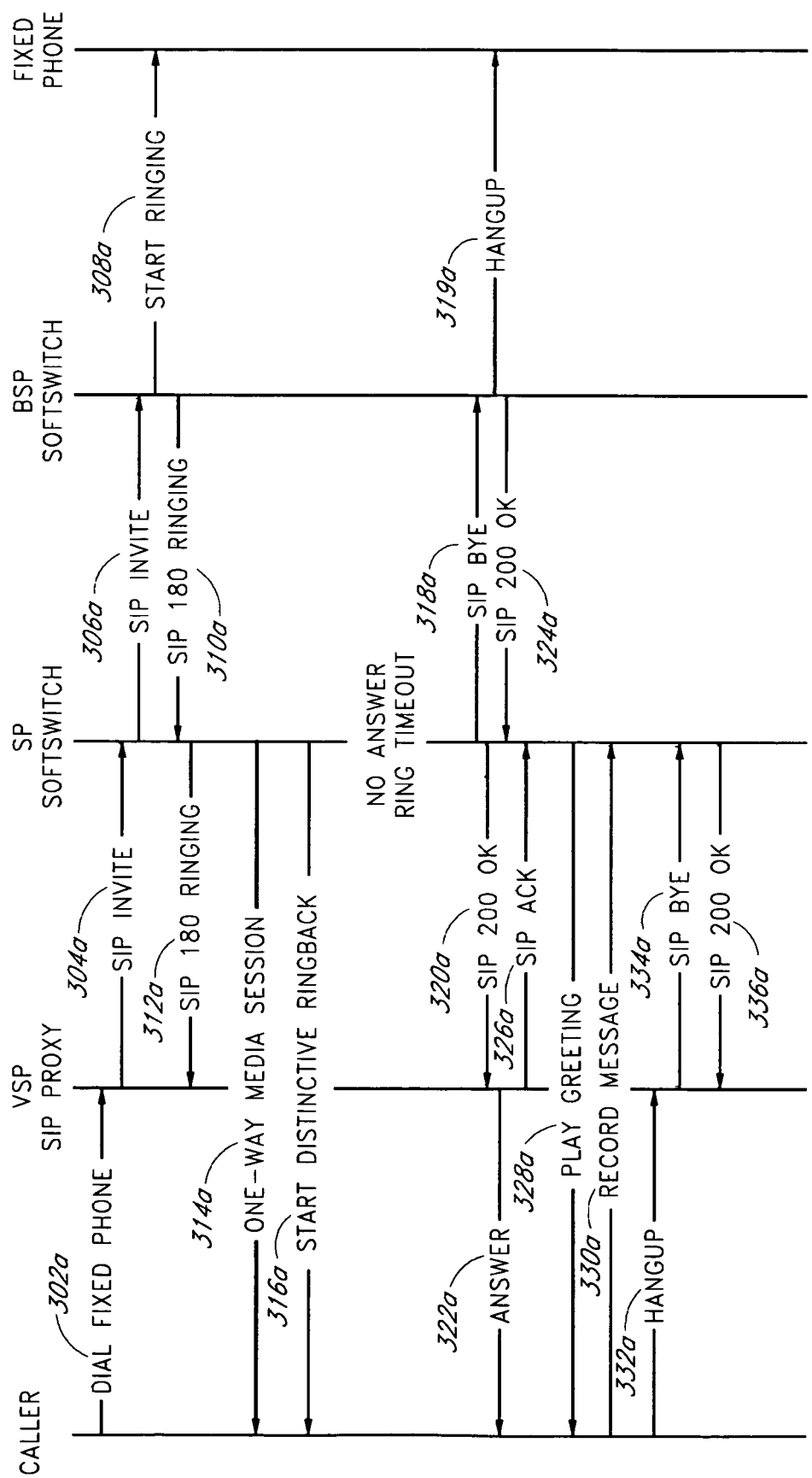
FIG. 15 illustrates an example embodiment of processing an unanswered call directed to a shared phone.

With reference to the example process illustrated in FIG. 15, if a call delivered to a fixed phone is not answered after the configured number of rings/period of time, the enhanced service provider softswitch plays the configured greeting to prompt the caller to record a message. In this example, the subscriber has Distinctive Ringback to the caller configured. Therefore, the enhanced service provider softswitch uses a SIP 180 Ringing response to set up a one-way media session to present the ringback that was configured by the subscriber.

At state 302A, a caller uses a telecommunications device (e.g., a phone) to place a call to a shared fixed phone (e.g., such as a SIP phone or POTs phone equipped with an ATA). The call is directed to a VSP SIP proxy, which receives the call including signaling information (e.g., including the phone address associated with the caller phone). At state 304A, the SIP proxy transmits a SIP invite message to the ESP softswitch which indicates that the fixed phone is being invited to join a call session. At state 306A, the ESP softswitch transmits the SIP invite message to a BSP softswitch. At state 308A, the BSP softswitch rings the fixed phone. At state 310A, a SIP 180 ringing response is presented by the BSP softswitch to the ESP softswitch. At state 312A, the SIP 180 ringing response is transmitted from the ESP softswitch to the VSP SIP proxy. At state 314A, a one-way media session is set up by the ESP softswitch to present a subscriber-customized ringback to the caller.

At state 316A, the distinctive ringback is initiated. In this example, the call is not answered via the fixed phone within a certain number of rings or amount of time (e.g., as specified system wide or for the particular customer/subscriber). In response to the failure to answer the fixed phone, at state 318A, a SIP Bye message is transmitted from the ESP softswitch to the BSP softswitch to terminate the call to the fixed phone. At state 319A, the leg to the fixed phone is terminated. At state 324A, the BSP softswitch transmits a SIP 200 OK response message to the ESP softswitch.

At state 320A, a SIP OK response message is transmitted from the ESP softswitch to the VSP SIP proxy, indicating that the invite was successful (in this case the ESP softswitch will answer the call). At state 322A, the VSP SIP proxy transmits an Answer indication which is provided to the caller phone. At state 326A, a SIP ACK acknowledge message is transmitted by the VSP SIP proxy to the ESP softswitch. At state 328A, the ESP softswitch plays a greeting which is transmitted to the caller telecommunications device. At state 330A, the ESP softswitch records a message being left by the caller. At state 332A, the caller finishes leaving a message and hangs up. At state 334A, the VSP SIP proxy transmits a SIP Bye message to the ESP softswitch to terminate the call. At state 336A, the ESP softswitch transmits a SIP OK response message to the VSP SIP proxy, and the call session ends.

Figure 16:
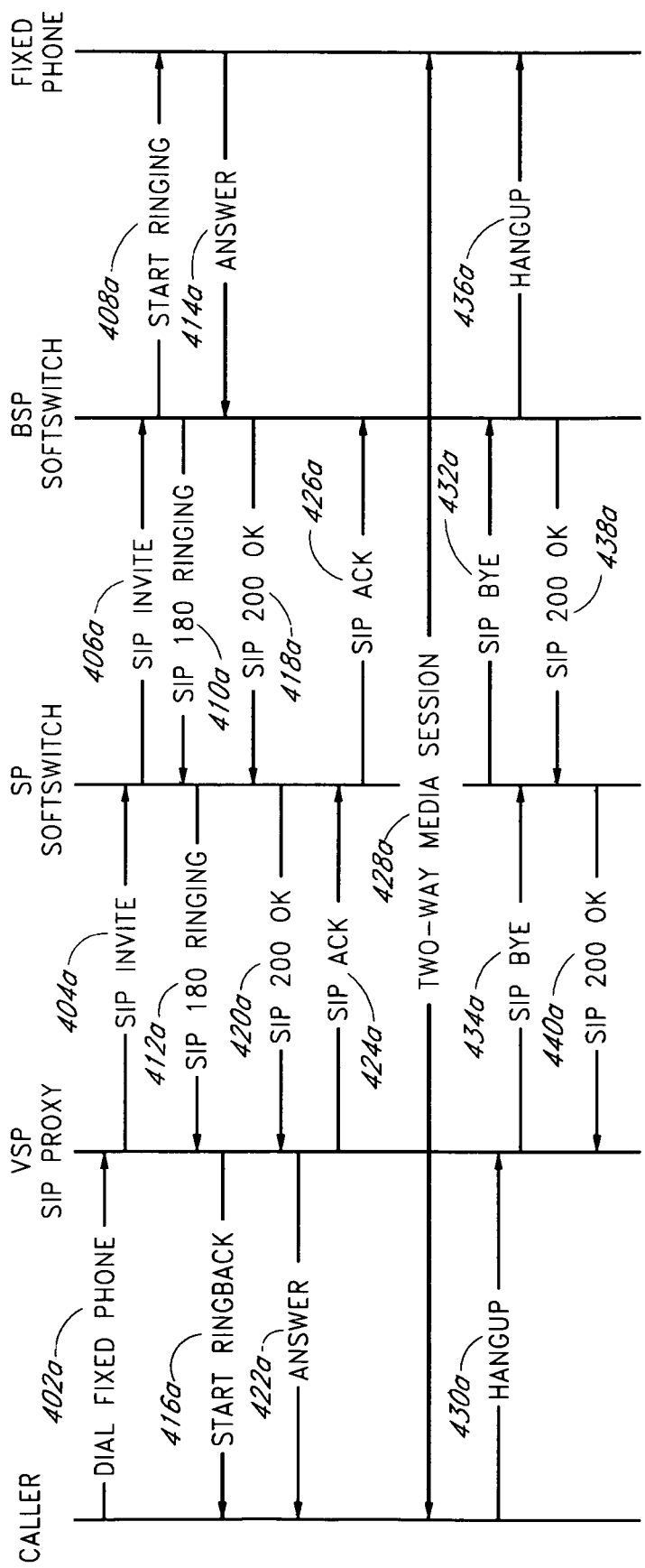
FIG. 16 illustrates an example embodiment of processing an answered call directed to a shared phone.

FIG. 16 illustrates an example call handling wherein a phone is answered and Call Screening is disabled. In this example, the fixed phone is answered, and the enhanced service provider softswitch creates a two-way media session directly between the VSP SIP Proxy and the BSP softswitch.

At state 402A, a caller uses a telecommunications device (e.g., a phone) to place a call to a fixed phone (e.g., such as a SIP phone or POTs phone equipped with an ATA). The call is directed to a VSP SIP proxy, which receives the call including signaling information (e.g., including the phone address associated with the caller phone). At state 404A, the SIP proxy transmits a SIP invite message to the ESP softswitch which indicates that the fixed phone is being invited to join a call session. At state 406A, the ESP softswitch transmits the SIP invite message to a BSP softswitch. At state 408A, the BSP softswitch rings the fixed phone. At state 410A, a one-way media session is set up by the ESP softswitch to present a subscriber-customized ringback to the caller.

At state 412A, the ESP softswitch transmits a SIP 180 Ringing message to the VSP SIP proxy, at state 414A, the fixed phone is answered, and at state 416A, the distinctive ringback is presented to the caller. At state 418A, the BSP softswitch transmits a SIP 200 OK response message to the ESP softswitch. At state 420A, the ESP softswitch transmits a SIP 200 OK message to the VSP SIP proxy. At state 422A, the VSP SIP Proxy provides the caller with an indication that the fixed phone is answered. At state 424A, the VSP SIP proxy transmits a SIP ACK acknowledge response to the ESP softswitch. At state 426A, The ESP softswitch transmits a SIP acknowledge response to the BSP softswitch. At state 428A, the ESP softswitch creates a two-way media session between the VSP SIP Proxy and the BSP softswitch, which is optionally not routed through the ESP softswitch.

At state 430, the caller ends the call by hanging up. At state 434A, the VSP SIP proxy detects the hang-up condition, and transmits a SIP Bye message to the ESP softswitch indicating that the call is being terminated. At state 432A, the ESP softswitch transmits a SIP Bye message to the BSP softswitch. At state 436A, the BSP drops the call leg to the fixed phone. At state 438A, the BSP softswitch transmits a SIP 200 OK message to the ESP softswitch. At state 440A, the ESP softswitch transmits a SIP 200 OK message to the VSP SIP proxy.

Figure 17:
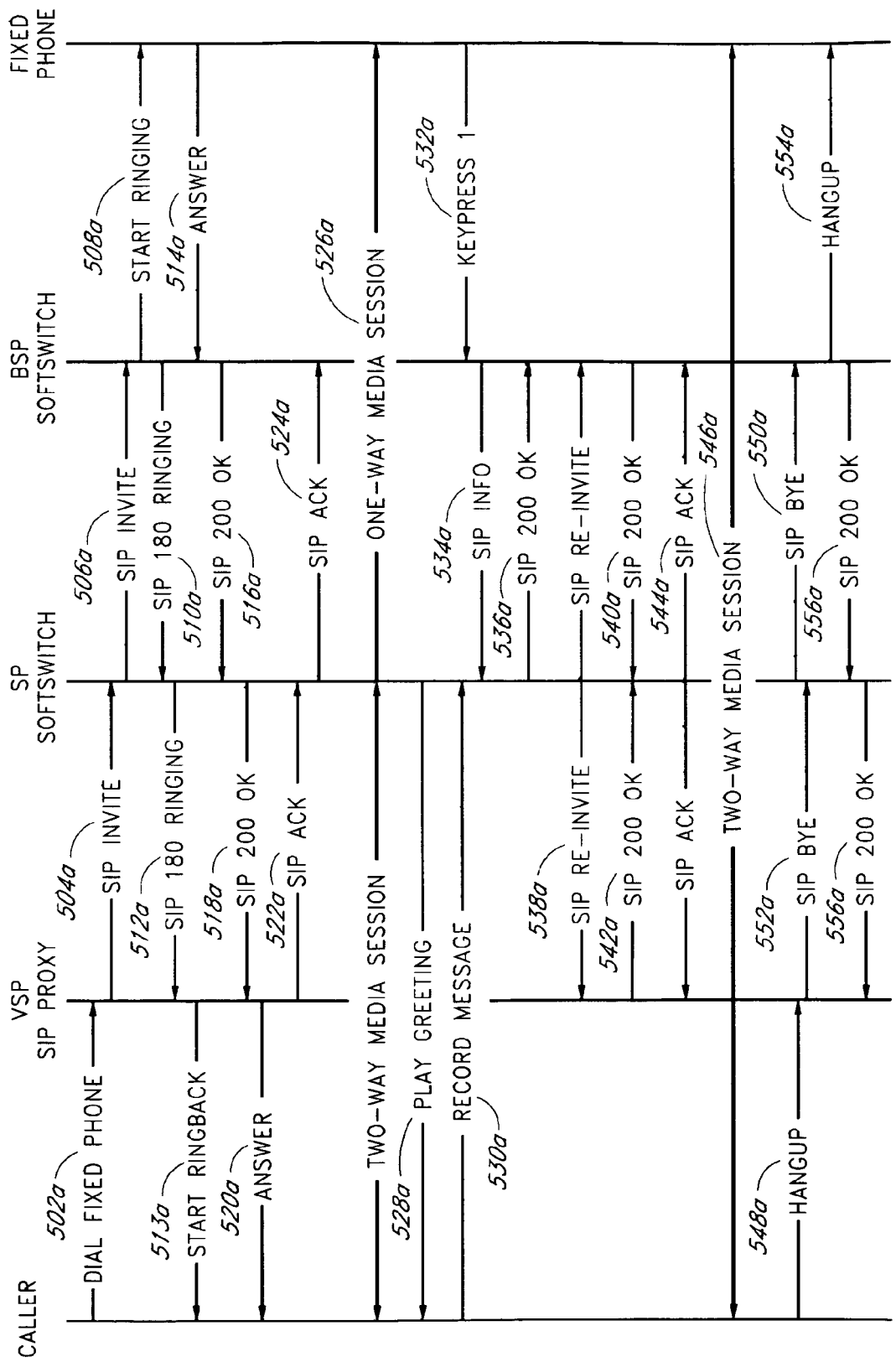
FIG. 17 illustrates an example embodiment of processing a call directed to a shared phone with call screening.

FIG. 17 illustrates an example call handling process, wherein the fixed phone is answered and call screening is enabled. During the screening process, a two-way media session is established by the ESP softswitch between the caller device and the ESP softswitch, and a one-way media session is established by the ESP softswitch and the fixed phone. In this example, the fixed phone user provides a "take-the-call" instruction (e.g., keypresses 1, which ends screening and causes a two-way media session to be established between the caller and the fixed phone user).

In particular, while screening is active there is a two-way media session between the caller and the service provider softswitch but there is only a one-way media session between the enhanced service provider softswitch and the fixed phone (e.g., the return talk path from the fixed phone is muted with respect to the caller). After the fixed phone user keypresses 1, the service provider softswitch uses a SIP Invite to change the half-duplex media session to a two-way media session that flows directly between the VSP SIP proxy and the BSP softswitch. From that point on in the call, the ESP softswitch can monitor and is aware of further keypresses (e.g., to transfer the call) via SIP Info messages.

Referring to FIG. 17, at state 502A, a caller uses a caller telecommunications device (e.g., a phone) to place a call to a fixed phone. The call is directed to a VSP SIP proxy, which receives the call including signaling information (e.g., including the phone address associated with the caller phone). At state 504A, the SIP proxy transmits a SIP invite message to the ESP softswitch which indicates that the fixed phone is being invited to join a call session. At state 506A, the ESP softswitch transmits the SIP Invite message to a BSP softswitch. At state 508A, the BSP softswitch rings the fixed phone. At state 510A, a one-way media session is set up by the ESP softswitch to present a subscriber-customized ringback to the caller. At state 512A, the ESP softswitch transmits an SIP 180 Ringing message to the VSP SIP proxy, at state 514A, the fixed phone is answered, and at state 513A, the distinctive ringback is presented to the caller.

At state 516A, the BSP softswitch transmits a SIP 200 OK response message to the ESP softswitch. At state 518A, the ESP softswitch transmits a SIP 200 OK message to the VSP SIP proxy. At state 520A, the VSP SIP Proxy provides the caller with an indication that the fixed phone is answered. At state 522A, the VSP SIP proxy transmits a SIP acknowledge response to the ESP softswitch. At state 524A, The ESP softswitch transmits a SIP ACK acknowledge response to the BSP softswitch. At state 526A, the ESP softswitch creates a two-way media session with the caller telecommunications device, and a one-way media session with the fixed phone.

At state 528A, the ESP softswitch plays a message to the caller (e.g., asking the caller to leave a message). At state 530A, the ESP softswitch records the message being left by the caller. The message is streamed by the ESP softswitch in substantially real time to the fixed phone. At state 532A, the fixed phone user provides an indication (e.g., by pressing a phone key, such as the 1 key) that the user wants to take the call (establish a two-way talk path with the caller) and end screening.

At state 534A, the BSP softswitch transmits a SIP Info message to the ESP softswitch, which informs the ESP softswitch of the take-the-call key press (e.g., that the 1 key was activated). At state 536A, the ESP softswitch transmits a 200 OK response to the BSP softswitch. At state 538A, the ESP softswitch transmits a SIP Re-invite message to the VSP SIP proxy and the BSP softswitch (to establish a full duplex call session between the caller device and the fixed phone). At state 540A, the BSP softswitch transmits a SIP 200 OK message to the ESP softswitch. At state 542A, the VSP SIP proxy transmits a SIP 200 OK message to the ESP softswitch. At state 544A, the ESP softswitch transmits SIP ACK acknowledge responses to the VSP SIP proxy and the BSP softswitch.

At state 546A, the ESP softswitch establishes a two-way media session between the caller telecommunication device and the called party fixed phone, so that the caller and called party can converse. At state 548A, the caller terminates the call by hanging up. At state 552A, the VSP SIP proxy transmits a SIP Bye message to the ESP softswitch. At state 550A, the ESP softswitch transmits a SIP Bye message to the BSP softswitch. At state 554A, the BSP softswitch drops the leg of the call with the fixed phone. At state 556A, the BSP softswitch transmits a SIP 200 OK response message to the ESP softswitch. At state 556A, the ESP softswitch transmits a SIP 200 OK response message to the VSP SIP proxy.

Figure 18:
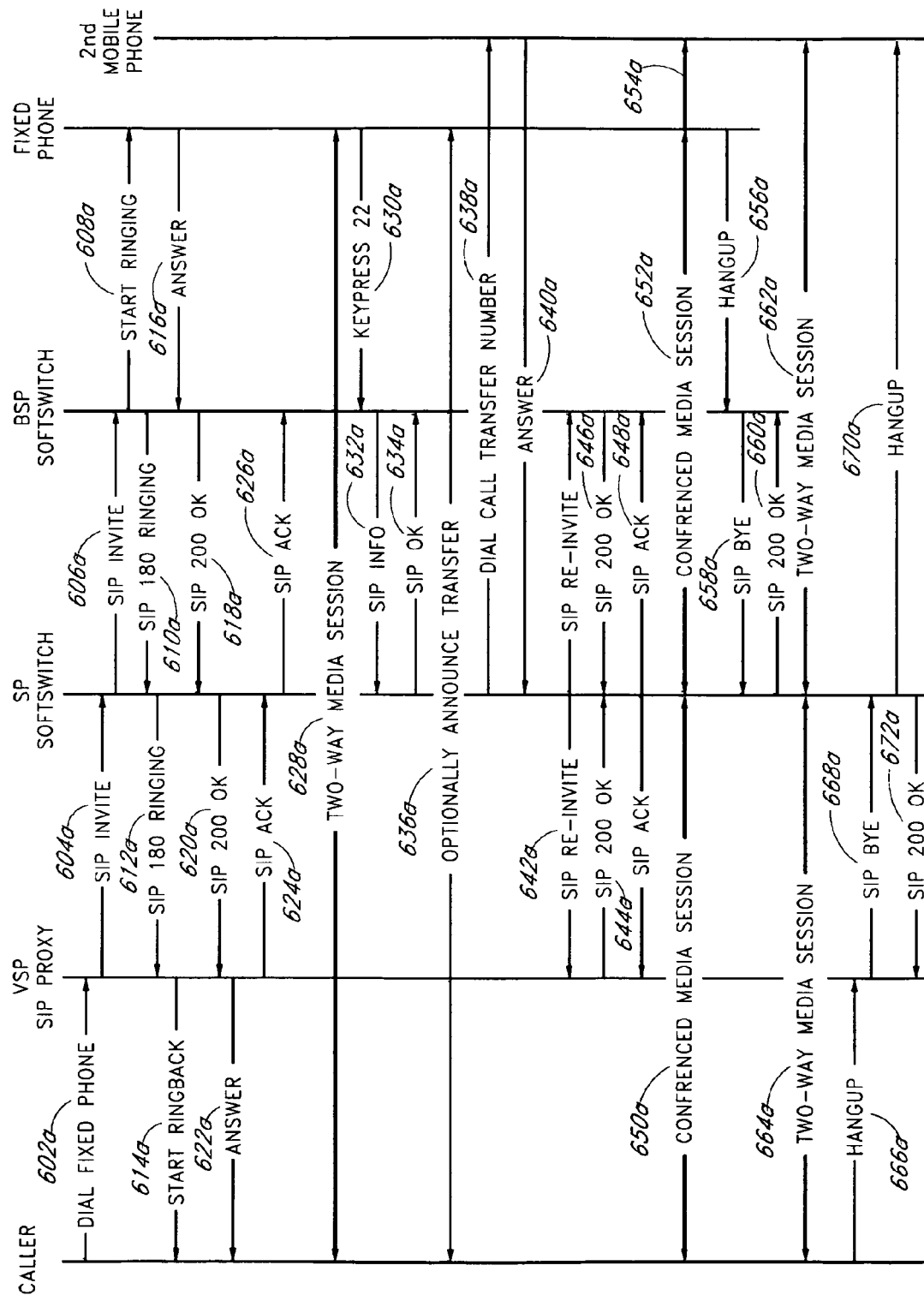
FIG. 18 illustrates an example embodiment of processing a call directed to a shared phone with call transfer.

FIG. 18 illustrates an example call handling process, wherein the fixed phone is answered, call screening is disabled, the called party provides an instruction (e.g., via a key press of voice command) via the fixed phone to transfer the call to another phone (e.g., a mobile phone) associated with the fixed phone (e.g., associated with the subscriber that is associated with the mobile phone). Such a call transfer process can also be performed with call screening enabled and in progress, or after the called party elected to terminate screening and then took the call on the fixed phone.

In this example, the two-way media session established towards the start of the call does not route through the enhanced service provider softswitch (although in other embodiments it may), and so the instruction (e.g., via key press) to initiate the transfer is communicated to the enhanced service provider softswitch via a SIP Info message (although other techniques can be used as well).

The subscriber/fixed phone user can hang up the fixed phone after providing the call transfer instruction. If the call leg is not terminated before the transferred call leg is established, optionally the three call legs are conferenced together in the enhanced service provider softswitch. In this example, during the conference a conference participant can hang-up without affecting the ability of the remaining conference participants to continue the conference. Optionally, instead, if the fixed phone user hangs up, the ESP softswitch can cause all call legs to terminate to thereby end the call.

If, during a call transfer the enhanced service provider SP softswitch detects that the called number is busy, not answered, or answered by voice mail or an answering machine, the ESP optionally announces to the remaining call participants (or optionally just to the fixed phone user) that the transfer failed.

Referring to FIG. 18, at state 602A, a caller uses a caller telecommunications device (e.g., a phone) to place a call to a fixed phone (e.g., not a cell phone). The call is directed to a VSP SIP proxy, which receives the call including signaling information (e.g., including the phone address associated with the caller phone). At state 604A, the SIP proxy transmits a SIP Invite message to the ESP service provider softswitch which indicates that the fixed phone is being invited to join a call session. At state 606A, the ESP softswitch transmits the SIP invite message to a BSP softswitch. At state 608A, the BSP softswitch rings the fixed phone. At state 610A, the BSP softswitch transmits an SIP 180 Ringing message to the ESP softswitch. At state 612A, the ESP softswitch transmits the SIP 180 Ringing message to the VSP SIP proxy. At state 614A, the VSP Proxy rings the caller telecommunication device.

At state 616A, the fixed phone user answers the call. At state 618A, the BSP softswitch transmits a SIP 200 OK response message to the ESP softswitch. At state 620A, the ESP softswitch transmits a SIP 200 OK message to the VSP SIP proxy. At state 622A, the caller is provided with an indication that the fixed phone is answered. At state 624A, the VSP SIP proxy transmits a SIP ACK acknowledge response to the ESP softswitch. At state 626A, the ESP softswitch transmits a SIP acknowledge response to the BSP softswitch.

At state 628A, the ESP softswitch creates a two-way media session between the caller telecommunications device and the fixed phone, wherein the call path is not routed through the ESP softswitch. At state 630A, the fixed phone user provides a call transfer instruction (e.g., by pressing the fixed phone 2 key followed by another press of the 2 key), wherein the call is to be transferred to a mobile phone. At state 632A, the BSP softswitch transmits a SIP Info message to the ESP softswitch, informing the ESP softswitch of the call transfer key presses.

At state 634A, the ESP softswitch transmits a SIP OK response to the BSP softswitch. At state 636A, an audible indication (e.g., a voice notification or a tone/beep) is optionally provided to the caller device and the fixed phone by the ESP softswitch. At state 638A, the ESP softswitch dials the call transfer number (e.g., indicated by the second key press) to the transfer destination (e.g., second mobile phone, in this example, or a POTs phone, a VoIP phone, a softphone, a telecommunications client, etc.). At state 640A, the transfer destination device is answered, and an indication is provided to the ESP softswitch of the answer condition. At state 642A, the ESP softswitch issues a SIP reinvite invitation (call redirect) to the VSP Proxy and the BSP softswitch for a new call session with the transfer destination.

At state 646A, the BSP softswitch transmits a SIP 200 OK message to the ESP softswitch. At state 644A, the VSP SIP proxy transmits a SIP 200 OK message to the ESP softswitch. At state 648A, the ESP softswitch transmits a SIP ACK acknowledge response to the BSP softswitch. At states 650A, 652A, the ESP softswitch establishes a conferenced media session, routed via the ESP softswitch, between the caller device, the fixed phone, and the second mobile device.

At state 656A, the fixed phone is hung up, which is detected by the BSP softswitch. In response, at state 658A, the BSP softswitch transmits a SIP Bye message to the ESP softswitch. At state 660A, the ESP softswitch responds with a SIP 200 OK message. At states 662A, 664A, the call legs between the caller device/ESP softswitch, and between the ESP softswitch/second mobile device are maintained via the ESP softswitch, even though the leg to the fixed phone has been terminated.

At state 666A, the caller terminates the leg of the call with the caller device by hanging up the caller device. At state 668A, the VSP SIP proxy transmits a SIP Bye message to the ESP softswitch, which responds with a SIP 200 OK message at state 672A. Also, at state 670A, in response to the SIP Bye message and because there is only one call participant left, the SP softswitch terminates the leg of the call with the remaining participant device (the second mobile phone in this example).

Figure 19:
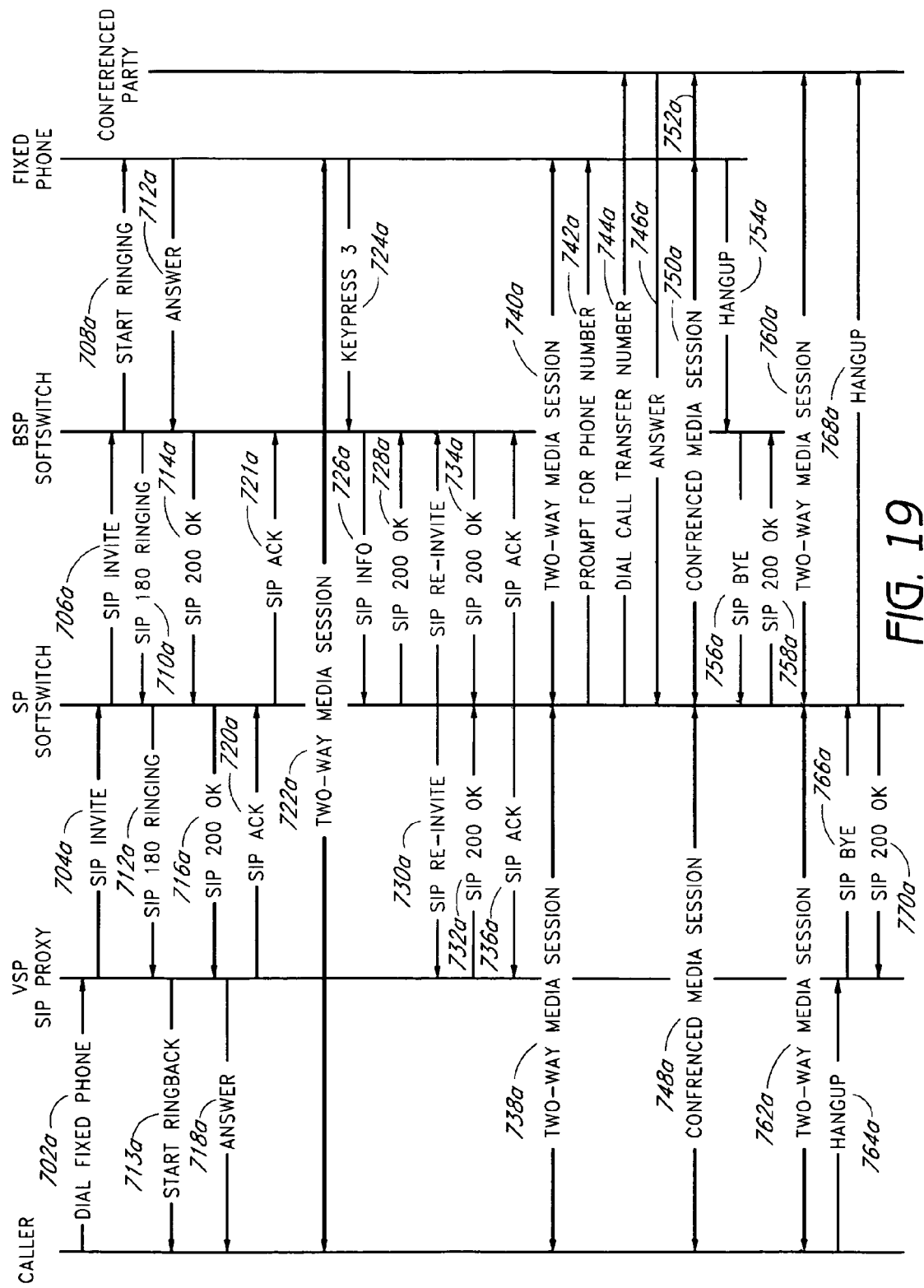
FIG. 19 illustrates an example embodiment of processing a call directed to a shared phone with call conferencing.

FIG. 19 illustrates an example call handling process, wherein a fixed phone is answered, and the fixed phone user/subscriber provides a call conferencing instruction (e.g., key presses 3 or other appropriate instruction) to conference in another party.

In an example embodiment, if during an attempt to add a person to the conference, the enhanced service provider softswitch detects that the called number associated with a conference target is busy, not answered, or answered by voice mail or an answering machine, the ESP softswitch optionally announces to the conference participants (or only to the fixed phone user) that the requested person/device is not available.

As similarly discussed above with respect to the call transfer process illustrated in FIG. 19, the transfer instruction key press (e.g., a key press of the 3 key) could have been followed by another DTMF key press to select a particular phone address associated with the fixed phone/customer/subscriber to be added to the conference.

Referring to FIG. 19, at state 702A, a caller uses a caller telecommunications device (e.g., a phone) to place a call to a fixed phone (e.g., not a cell phone). The call is directed to a VSP SIP proxy, which receives the call including signaling information (e.g., including the phone address associated with the caller phone). At state 704A, the SIP proxy transmits a SIP invite message to the ESP service provider softswitch which indicates that the fixed phone is being invited to join a call session. At state 706A, the ESP softswitch transmits the SIP invite message to a BSP softswitch. At state 708A, the BSP softswitch rings the fixed phone. At state 710A, the BSP softswitch transmits an SIP 180 Ringing message to the ESP softswitch. At state 712A, the ESP softswitch transmits the SIP 180 Ringing message to the VSP SIP proxy.

At state 712A, the fixed phone user answers the call. At state 713A, the VSP Proxy rings the caller telecommunication device. At state 714A, the BSP softswitch transmits a SIP 200 OK response message to the ESP softswitch. At state 716A, the ESP softswitch transmits a SIP 200 OK message to the VSP SIP proxy. At state 718A, the caller is provided with an indication that the fixed phone is answered. At state 720, the VSP SIP proxy transmits a SIP acknowledge response to the ESP softswitch. At state 721A, The ESP softswitch transmits a SIP acknowledge response to the BSP softswitch.

At state 722A, the ESP softswitch creates a two-way media session between the caller telecommunications device and the fixed phone, wherein the call path is not routed through the ESP softswitch. At state 724A, the fixed phone user provides a call conference instruction (e.g., presses the fixed phone 3 key). At state 726A, the BSP softswitch transmits a SIP Info message to the ESP softswitch, informing the ESP softswitch of the call conference key press.

At state 728A, the ESP softswitch transmits a SIP OK response to the BSP softswitch. An audible indication (e.g., a voice notification or a tone/beep) is optionally provided to the caller device and the fixed phone by the ESP softswitch indicating that a call conference attempt is being made. At state 730A, the ESP softswitch issues a SIP reinvite invitation (call redirect) to the VSP Proxy and the BSP softswitch for a new call session with the conference destination.

At state 734A, the BSP softswitch transmits a SIP 200 OK message to the ESP softswitch. At state 732A, the VSP SIP proxy transmits a SIP 200 OK message to the ESP softswitch. At state 736A, the ESP softswitch transmits SIP acknowledge responses to the VSP SIP proxy and the BSP softswitch. At states 738A, 740A, the ESP softswitch establishes a conferenced media session (wherein the conferenced parties can speak and hear each other), routed via the ESP softswitch, between the caller device and the fixed phone. At state 742A, the ESP softswitch plays a verbal prompt to the fixed phone user asking the user to enter in the phone address of the party to be conferenced in. The fixed phone user enters the conference party phone address (e.g., via the fix phone key pad or via speech). At state 744, the ESP softswitch dials the phone number entered by the user.

At state 746A, the conferenced party answers the telecommunications device (e.g., a phone) associated with the dialed phone address. At state 748A, the conferenced party answers his/her device, and an answer signal is communicated to the ESP softswitch. At states 748A, 750A, 752A, the caller device, the fixed phone, and the conferenced party device are conferenced together in a full duplex media session.

At state 754A, the fixed phone user hangs up the fixed phone, which is signaled to the BSP softswitch. At state 756A, the BSP softswitch transmits a SIP bye message to the ESP softswitch. At state 758A, the ESP softswitch transmits a SIP 200 OK response to the BSP softswitch. At states 760A, 762A, the call conference now includes the caller and the conferenced party in a two-way media session, with the leg to the fixed phone dropped.

At state 764A, the caller device hangs up, which is detected by the VSP SIP proxy. At state 766A, the VSP SIP proxy transmits a SIP Bye message to the ESP softswitch. In response, at state 768A, the ESP softswitch terminates the leg to the conferenced party. At state 770A, the ESP softswitch transmits a SIP 200 OK to the VSP SIP proxy.

Figure 20:
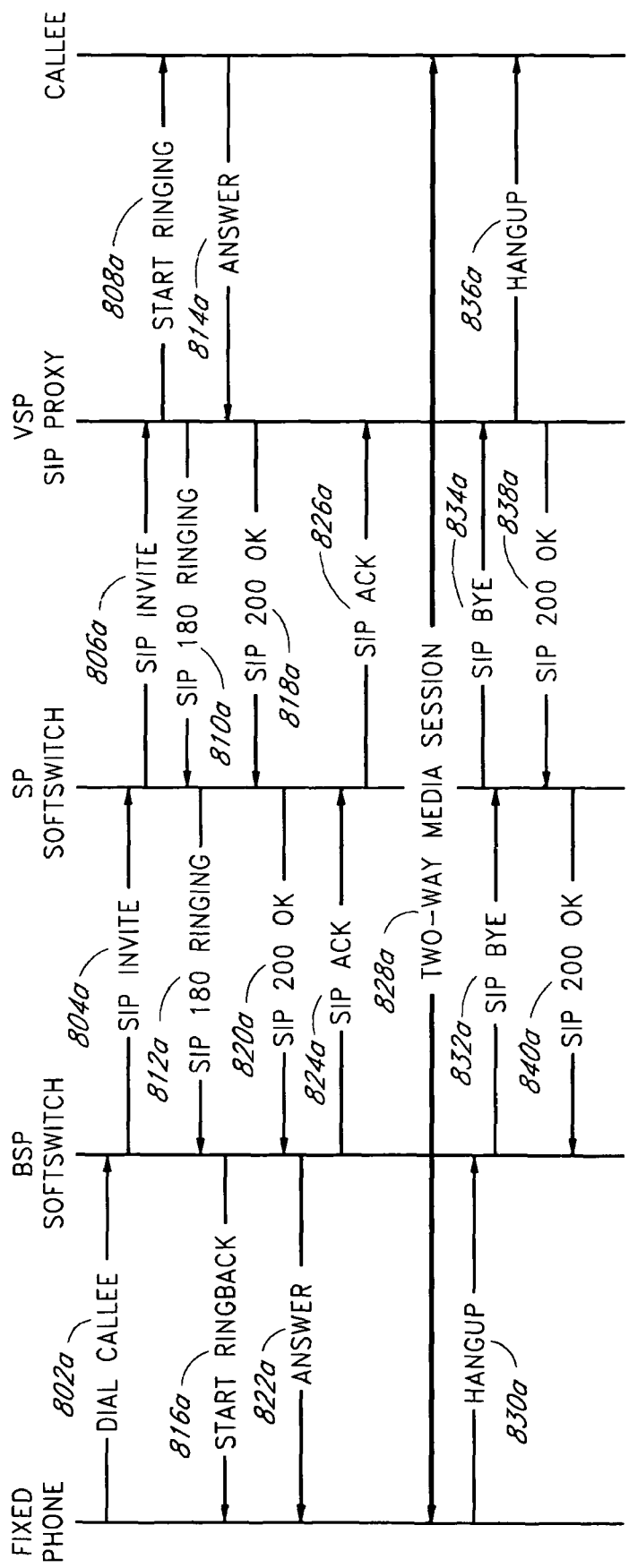
FIG. 20 illustrates an example embodiment of processing an outgoing call placed by a shared phone.

FIG. 20 illustrates an example call handling process, wherein a call is originated from the fixed phone. In this example, the enhanced service provider softswitch creates a two-way media session directly between the BSP softswitch and the VSP SIP Proxy (rather than having the session routed through the ESP softswitch). The subscriber can instruct the ESP softswitch to transfer or conference the call by providing an appropriate instruction (e.g., keypress 2 or 3). As similarly discussed above, the ESP softswitch optionally receives the keypress(es) from the BSP softswitch via a SIP Info message.

At state 802A, the user of the fixed phone calls a called party by dialing an address (e.g., a phone number) associated with the called party. At state 804A, the BSP softswitch receives the signaling associated with the call (e.g., including the fixed phone address), and transmits a SIP Invite message. At state 806, the ESP softswitch transmits a SIP Invite message to a VSP SIP proxy. At state 808A, the VSP SIP proxy rings the called party. At state 810A, the VSP SIP proxy transmits an SIP 180 Ringing message to the ESP softswitch.

At state 812A, the ESP softswitch transmits a SIP 180 Ringing message to the BSP softswitch. At state 814A, the caller party answers the call, and corresponding signaling is sent to the VSP SIP proxy. At state 816A, the BSP softswitch beings ring back to the fixed phone.

At state 818A, the VSP SIP proxy transmits a SIP 200 OK message to the ESP softswitch. At state 820A, the ESP softswitch transmits a SIP 200 OK to the BSP softswitch. At state 822A, the BSP softswitch transmits an Answer indication to the fixed phone. At state 824A, the BSP softswitch transits a SIP Acknowledge message to the ESP softswitch. At state 826A, the ESP softswitch transmits a SIP Acknowledge message to the VSP SIP proxy. At state 828A, the ESP softswitch established a two-way media session between the fixed phone and the caller party terminal. At state 830A, the fixed phone user hangs up the fixed phone to terminate the call. At state 832A, the BSP softswitch transmits a SIP Bye message to the ESP softswitch to terminate the call. At state 834A, the ESP softswitch transmits a SIP Bye message to the VSP SIP proxy. At state 836A, the VSP SIP proxy terminates the call leg with the called party device. At state 838, the VSP SIP proxy transmits a SIP 200 OK message to the ESP softswitch. At state 840A, the ESP softswitch transmits a SIP 200 OK message to the BSP softswitch.

Figure 21:
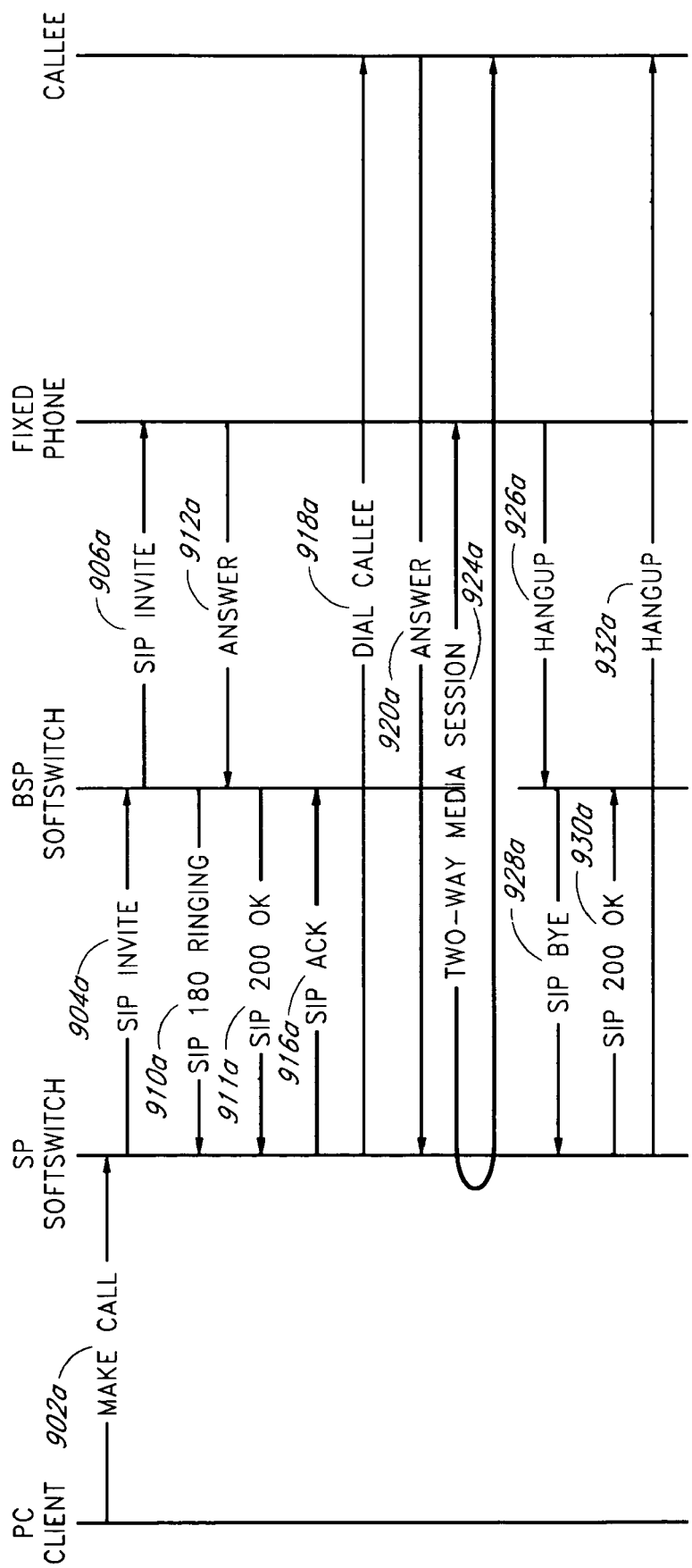
FIG. 21 illustrates an example embodiment of processing an outgoing call placed by a client application hosted on a user terminal.

FIG. 21 illustrates an example call handling process, wherein a call is originated from a telecommunications client application host on a terminal and a bridge outcall process is performed. For example, a user/subscriber can initiate a call by activating a call initiation control (e.g., a Make Call button presented via a user interface displayed on a terminal display) for a selected call or contact.

Referring to FIG. 21, at state 902A, a subscriber or other user activates a call initiation control displayed via a telecommunications client hosted on a terminal (e.g., a personal computer), and the call initiation request is transmitted to the ESP softswitch. At state 904A, the ESP softswitch transmits a SIP Invite to the BSP softswitch. At state 906A, the BSP softswitch transmits a SIP Invite message to a fixed phone. At state 910A, the BSP softswitch transmits a SIP 180 Ringing message to the ESP softswitch. At state 912A, the fixed phone is answered. At state 911A, the BSP softswitch transmits a SIP 200 OK message to the ESP softswitch. At state 916A, the ESP softswitch transmits a SIP Acknowledge message to the BSP softswitch.

At state 918A, the ESP softswitch dials the phone address selected by the user of the client application. At state 920A, the called party answers the call using the called party's telecommunications device, and corresponding signaling is transmitted to the ESP softswitch.

At state 924A, the ESP softswitch establishes a two-way media session between the BSP fixed phone and called party device. At state 926A, the fixed phone is hung up, at state 928A, a SIP message is transmits by the BSP softswitch to the ESP softswitch. At state 930A, a SIP 200 OK message is transmitted to the BSP softswitch. At state 932A, the ESP softswitch terminates the call leg with the called party device.

An example call processing system in an IP Multimedia Subsystem (IMS) framework will now be described. In this example call scenario, an application server (e.g., associated or operated by an enhanced service provider) provides enhanced voice mail and call management services (e.g., call screening) to a subscriber in an IMS environment. The IMS can provide mobile and fixed multimedia services. The IMS optionally uses a Voice-over-IP (VoIP) implementation based on a 3GPP (3rd Generation Partnership Project) standardized implementation of SIP (or other protocol), and runs over the Internet Protocol (IP). The IMS supports packet-switched and circuit-switched phone systems. The IMS optionally enables subscribers to access the services offered by the IMS when accessing their home networks and while roaming.

Figure 22:
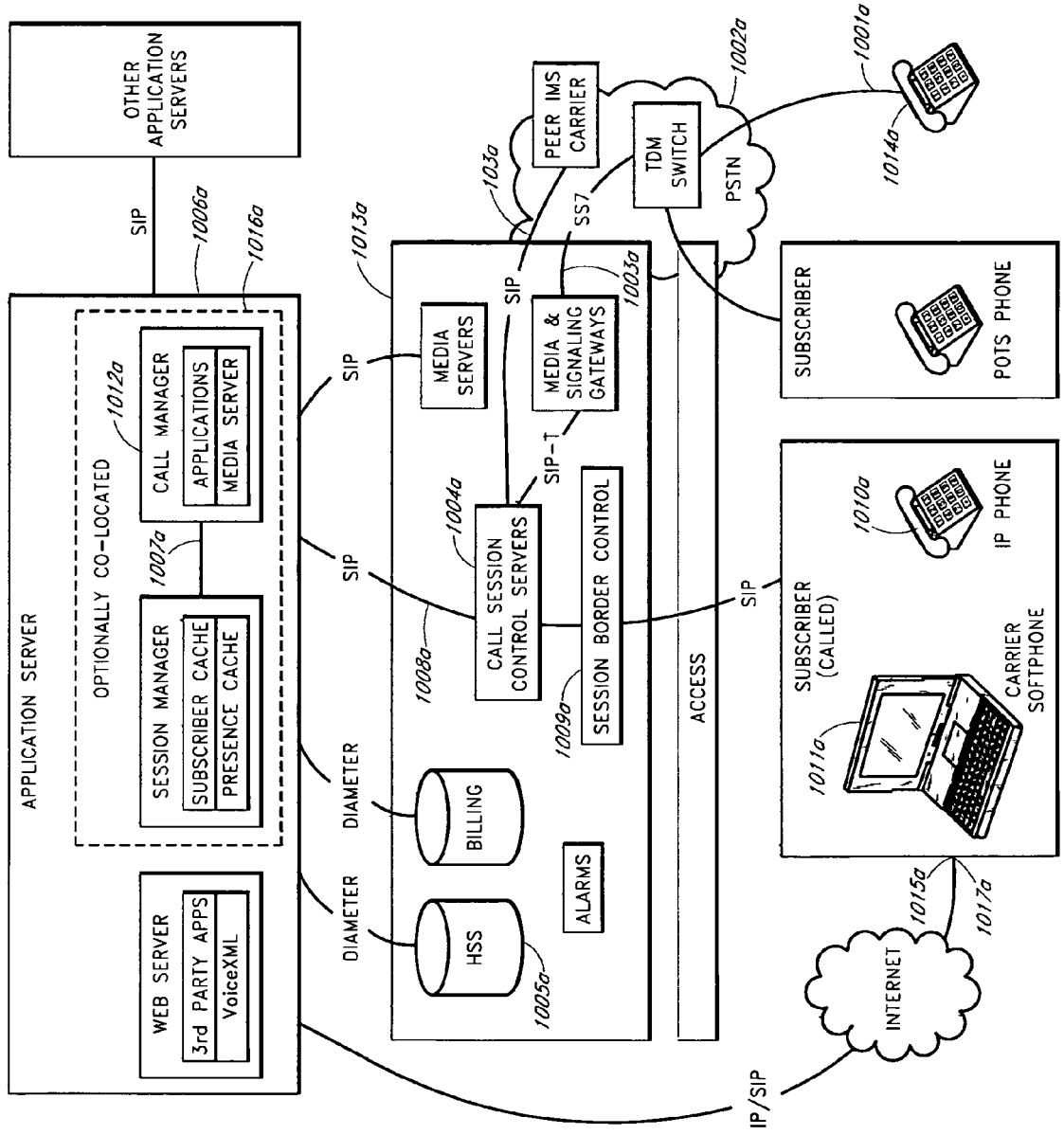
FIG. 22 illustrates an example embodiment of a system that provides voice mail and call management services to a subscriber in an Internet Protocol media system environment.

In the example environment illustrated in FIG. 22, an application server includes a Web server (including third party applications, such as those associated with a carrier, and VoiceXML), a session manager (including a subscriber cache and a presence cache), and a call manager (including one or more applications and a media server). The application server optionally communicates with one or more other servers (e.g., application servers) using SIP or other protocol.

The application server is networked to an IMS network (optionally associated with or operated by a carrier) using Diameter, SIP, or other protocol. For example the application server can be coupled to an HSS, a billing system/database, call session control servers, and/or media servers. The IMS network can further include one or more media and signaling gateways, alarms, and a session border controller (e.g., to control real-time interactive communications, such as voice, video, and/or multimedia sessions, across IP network borders). The media and signaling gateways are optionally connected to one or more TDM (time division multiplexing) switches (e.g., a switching computer used in a circuit-switched telephone network or an in-house PBX that supports circuit-switched lines) via SS7 signaling.

One or more subscribers' devices (e.g., an IP phone or carrier softphone) can be coupled (e.g., via the Internet) to the application server (e.g., using IP/SIP). Optionally, a firewall protects one or more of the subscriber devices. One or more subscriber devices (e.g., a POTs phone) can be coupled to the TDM switch.

Referring now to the states illustrates in FIG. 22:

1001A. A caller with a plain old telephone (POT) dials the subscriber's landline phone number.

1002A. The call in this example is routed through the PSTN via SS7 (although shown routed through a switch, the first touch point may be its Signaling Gateway).

1003A. The call reaches the signaling point code servicing the dialed phone number, which, in this example, is the carrier's Signaling Gateway (instead, the call may have been routed through the peer IMS-compliant carrier and the call would then be SIP routed to an Interrogating instance of the Call Session Control Server at the edge of the carrier's administrative domain (1003aA)).

1004A. The Gateway converts from SS7 to SIP-T (SIP for telephone) signaling, and sends a SIP Invite message to the carrier's Call Session Control Server with the SS7 signaling information encapsulated in the message.

1005A. The Call Session Control Server verifies the called phone number is that of a customer (e.g., a subscriber of a service offered by the carrier and/or other entity having an account associated with the carrier), optionally by determining if the called phone number or other identifier associated with the called party matches a customer number in the Customer Database or HSS (which stores customer account records). After querying the HSS for the subscriber profile to find that the Application Server is servicing all calls for this subscriber, the Call Session Control Server sends a SIP Invite message to the Application Server. If the Application Server is not co-located, the SIP traffic optionally passes through a secure network between the sites (e.g., a virtual private network over the Internet or a Wide Area Network (WAN)).

1006A. The Call Manager (CM) receives the SIP Invite message and applies a B2BUA to service the call, which then queries the Session Manager for subscriber profile and presence information.

1007A. The Session Manager references its cache to get the subscriber information. (The Session Manager maintains a cache of the subscriber's profile by periodically synchronizing with the HSS. Optionally, if the HSS has sufficient performance, the HSS performs a substantially real time query for each call). In this example, the subscriber currently has a registered IP Phone and a registered carrier Softphone (Soft Client) and the subscriber's profile indicates that all available devices associated with the subscriber in the profile are to be simultaneously alerted (alerted at substantially the same time).

1008A. The CM sends a SIP Invite message to the IP address of the subscriber's IP Phone. The Call Session Control Server proxies the request.

1009A. The SIP Invite message passes through Session Border Control.

1010A. The SIP Invite message passes through the subscriber's local firewall to the IP Phone. After responding to the Invite message, the IP Phone begins ringing, but no one is home in this example.

1011A. Substantially in parallel with steps 1008-1010, the CM sends a SIP Invite message to the subscriber's Internet-connected Softphone, which at the time is WiFi connected at the local coffee shop (or other location). A call alert notification is presented on the phone optionally including the calling party ID and calling party name. In this example, the subscriber does not recognize the name of the caller and chooses to screen the call rather than take the call immediately on the Softphone (or direct the call to another phone).

1012A. The CM, having not received an answer indication from either device, sends a SIP message request to the call originator to establish an RTP media path.

1013A. The Media & Signaling Gateway receives the message request and bridges the SS7 switched circuit to the RTP media stream.

1014A. With the call path cut through, the CM uses its Media Server to play the subscriber's personal greeting to the caller (although a standard greeting can be used as well). The caller begins leaving a message after the greeting which is recorded by the CM.

1015A. Substantially in parallel to step 1014, the CM establishes a one-way (listen only) RTP stream to the Softphone of the message being left by the caller in substantially real time so that the call can be screened by the subscriber as the caller leaves a message. In this example, the subscriber chooses not to take the call.

1016A. The CM continues recording the message. When the caller hangs up, the CM ends the two SIP sessions, logs the call in a database, and optionally sends any notifications the subscriber configured (e.g., SMS, email, and/or instant messaging) and the CM optionally updates the Message Waiting Indicator (MWI) in the IP Phone and the Softphone to indicate there is a new message.

1017A. The new call optionally appears at the top of the call log in the Softphone along with the contact automatically created for this new caller, which includes name, number, and phone type information.

It should be understood that certain variations and modifications of this invention would suggest themselves to one of ordinary skill in the art. The scope of the present invention is not to be limited by the illustrations or the foregoing descriptions thereof.

What is claimed is:

1. A method of processing calls, the method comprising:
receiving over a network at a call processing system a first call from a calling party directed to a called party's phone address, wherein signaling information associated with the first call includes the calling party's phone address;

originating a second call from the call processing system to a telephonic device associated with the called party, wherein the telephonic device is coupled to a broadband data connection;

transmitting, while the first call is in progress, a call alert notification regarding the first call, including at least a portion of the signaling information, to a networked computer associated with the called party via a communication channel;

bridging the first call with the second call and the communication channel associated with the networked computer;

providing a greeting to the calling party via the call processing system;

receiving a voice communication from the calling party at the processing system;

streaming at least a first portion of the voice communication via the call processing system in substantially real time to the telephonic device and/or the networked computer while ensuring that sound does not travel back to the calling party from the telephonic device or networked computer associated with the called party to thereby allow the called party to screen the caller call from the telephonic device or networked computer while the calling party is unaware that the call screening is being performed;

providing a first user interface via the telephonic device or networked computer that when a first input is provided by the called party, causes duplex communication to be provided to the telephonic device or networked computer so that the called party can converse with the calling party, wherein the first user interface is provided during the first call enabling the called party to indicate, during that first call, that the duplex communication is to be provided to the telephonic device or networked computer;

determining a current physical location of the called party based at least in part on GPS (Global Positioning Satellite) location information and/or latitude and longitudinal information indicating the called party's current geographic location;

identifying an alternate telephonic device and/or an alternate networked computer in geographic proximity with the called party based at least in part on the determined physical location of the called party and a record of phone address destinations associated with the called party; and providing, during the first call, a second user interface via the telephonic device or networked computer, the second user interface enabling the called party to indicate that the first call is to be transferred to a device different than the telephonic device or the networked computer, and at least partly in response to receiving an indication from the called party during the first call via the second user interface that the called party wants the first call to be transferred, providing, during the first call, a third user interface enabling the called party to select a call transfer destination from a set of destinations, and at least partly in response to receiving a selection by the called party of a destination from the set of destinations within a first period of time, the first period of time occurring during the first call, transferring the first call to the destination selected by the called party, and if the called party does not select the call transfer destination during the first period of time, the first period of time occurring during the first call, causing at least in part a third call to be originated during the first call to the identified alternate telephonic device and/or the identified alternate networked computer in geographic proximity with the called party.

2. The method as defined in claim 1, wherein the network via which the call processing system receives the first call is a Voice over Internet Protocol (VoIP) network.

3. The method as defined in claim 1, wherein the call processing system receives a Session Initiation Protocol (SIP) Invite message associated with the first call from a SIP proxy.

4. The method as defined in claim 1, wherein the call processing system transmits a SIP Invite message associated with the first call to a broadband service provider softswitch.

5. The method as defined in claim 1, the method further comprising receiving an indication that the called party provided the first input via a SIP Info message from a softswitch.

6. The method as defined in claim 1, the method further comprising receiving at the call processing system an indication that the called party provided the first input via an Internet protocol message, and in response causing duplex communication to be provided to the telephonic device or networked computer so that the called party can converse with the calling party.

7. The method as defined in claim 1, the method further comprising:

receiving an indication that the called party provided the first input; and at least partly in response to receiving the indication that the called party provided the first input, providing an Internet protocol message to a VoIP service provider system and a broadband service provider system.

8. The method as defined in claim 1, the method further comprising receiving an indication that the called party provided the second input via an Internet protocol message.

9. The method as defined in claim 1, wherein the telephonic device is a fixed phone.

10. The method as defined in claim 1, wherein the telephonic device includes an analog phone and an analog telephone adapter.

11. The method as defined in claim 1, wherein the telephonic device sends voice communications over the broadband connection in packets using an Internet protocol.

12. The method as defined in claim 1, wherein the call processing system communicates with a call session server associated with a carrier when processing the first call.

13. The method as defined in claim 1, wherein the call processing system communicates with a media gateway associated with a carrier when processing the first call.

14. The method as defined in claim 1, wherein the first call is a forwarded call.

15. The method as defined in claim 1, wherein the called party's phone address has been number ported to the call processing system.

16. The method as defined in claim 1, wherein the called party's phone address is an E.164 telephone number.

17. The method as defined in claim 1, wherein the communication channel includes a data network.

18. The method as defined in claim 1, wherein the networked computer is a mobile device.

19. The method as defined in claim 1, wherein the second and/or third call originates over a Voice over Internet Protocol (VoIP) network.

20. The method as defined in claim 1, wherein the second and/or third call originates via a wireless mobile switching center.

21. The method as defined in claim 1, wherein the second call from the call processing system is to a destination phone address which is different than the phone address called by the caller in the first call.

22. The method as defined in claim 1, wherein the third call from the call processing system is to a destination phone address which is different than the phone address called by the caller in the first call.

23. The method as defined in claim 1, wherein information included in the call alert notification is displayed on the networked computer associated with the called party.

24. The method as defined in claim 1, wherein information included in the call alert notification is displayed via a client application hosted on the networked computer.

25. The method as defined in claim 1, wherein additional information is collected regarding the first call by querying a caller name database.

26. The method as defined in claim 1, wherein information presented with the call alert includes caller name, calling phone number, caller location, whether the call is private or restricted, and/or the calling device type.

27. The method as defined in claim 1, wherein the call alert notification causes an audible sound to be played by the networked computer.

28. The method as defined in claim 1, wherein the greeting played to the calling party includes a greeting recorded by the called party.

29. The method as defined in claim 1, wherein the first or second input is a key press generated tone command.

30. The method as defined in claim 1, wherein the second input includes key presses identifying a first command and the other telephonic device and/or networked computer.

31. The method as defined in claim 1, wherein the first or second user interface is a voice command user interface.

32. The method as defined in claim 1, wherein the first or second user interface includes a selection option displayed on the networked computer.

33. The method as defined in claim 1, wherein the first or second user interface includes a selection option displayed via the wireless telephonic device.

34. The method as defined in claim 1, wherein the origination of the third call is a transfer of the second call.

35. The method as defined in claim 1, wherein the second call is not disconnected until the third call is answered.

36. The method as defined in claim 1, wherein the third call conferences with the second call upon answer.

37. The method as defined in claim 1, wherein the called party is a registered subscriber of at least a first service offered by the call processing system.

38. The method as defined in claim 1, wherein at least a portion of the information related to the call is stored in non-volatile memory on the networked computer associated with the called party and is accessible to the called party when the computer is not connected to the network.

39. The method as defined in claim 1, wherein at least part of the voice communication of the caller is recorded and stored on the call processing system and is accessible to the called party.

40. The method as defined in claim 1, wherein at least part of the voice communication of the caller is recorded and stored on the call processing system and is accessible via a telephonic device.

41. The method as defined in claim 1, wherein the communication path is opened to the networked computer at least partly in response to the call processing system determining that the computer is online.

42. The method as defined in claim 1, wherein the calling party phone address and/or an identifier associated with the calling party's phone number is included in a call log associated with the called party.

43. The method as defined in claim 42, wherein the call log is accessible via a client application hosted on the networked computer.

44. The method as defined in claim 1, wherein the calling party phone address and/or an identifier associated with the calling party's phone number is included in an address book record associated with the called party.

45. The method as defined in claim 44, wherein the address book is accessible via a client application hosted on the networked computer.

46. The method as defined in claim 1, wherein call state transitions are displayed on the networked computer.

47. The method as defined in claim 1, wherein the caller hears a ringback tone selected by the called party.

48. The method as defined in claim 1, wherein the caller is prompted to disclose caller identification information if their caller ID is blocked or restricted.

49. The method as defined in claim 1, wherein the call processing system is a softswitch.

50. The method as defined in claim 1, the method further comprising providing an audible notification to the called party via at least one telephonic device while the called party is in communication with the calling party via the at least one telephonic device, wherein the audible notification is not transmitted to the calling party and the audible notification is related to call time remaining in the call party's account.

51. A method of processing calls, the method comprising:
receiving over a network at a call processing system a first call from a caller directed to a first phone address of a called party, wherein signaling information associated with the first call includes a phone address of the caller;
originating a second call to a first telephonic destination coupled to a data network and associated with the called party, wherein signaling information associated with the second call includes an identifier associated with the caller;
providing a first user interface via a first telephonic device associated with the first telephonic destination;
enabling the called party to screen the caller via the first telephonic destination prior to receiving a first input by the called party via the first user interface, the first input causing at least in part full duplex communication between the caller and the called party;
determining a current physical location of the called party based at least in part on GPS (Global Positioning Satellite) location information and/or latitude and longitudinal information indicating the called party's current geographic location;
identifying a second telephonic device and/or a networked computer in geographic proximity with the called party based at least in part on the determined physical location of the called party and a record of phone address destinations associated with the called party; and
providing, during the first call, a second user interface via the first telephonic destination, the second user interface enabling the called party to indicate that the first call is to be transferred to a device different than the first telephonic device, and at least partly in response to receiving an indication from the called party during the first call via the second user interface indicating that the called party wants the first call to be transferred, providing, during the first call, a third user interface enabling the called party to select a call transfer destination from a set of destinations, and at least partly in response to receiving a selection by the called party of a destination from the set of destinations within a first period of time, the first period of time occurring during the first call, transferring the first call to the destination selected by the called party, and if the called party does not select the call transfer destination during the first period of time, the first period of time occurring during the first call, using an Internet protocol, at least in part, to cause the caller and the identified second telephonic device and/or the networked computer in geographic proximity with the called party to be connected with full duplex communication.

52. The method as defined in claim 51, wherein the network via which the call processing system receives the first call is a Voice over Internet Protocol (VoIP) network.

53. The method as defined in claim 51, wherein the call processing system receives a SIP Invite message associated with the first call from a SIP proxy.

54. The method as defined in claim 51, wherein the call processing system transmits a SIP Invite message associated with the first call to a broadband service provider softswitch.

55. The method as defined in claim 51, the method further comprising receiving an indication that the called party pressed a key on the first telephonic destination via a SIP Info message from a softswitch.

56. The method as defined in claim 51, the method further comprising receiving an indication that the called party pressed a key on the first telephonic destination via an Internet protocol message, and at least partly in response, causing caller and the called party to be connected.

57. The method as defined in claim 51, the method further comprising:
receiving over a data network an indication that the called party pressed a key on the first telephonic destination; and
at least partly in response to receiving the indication that the called party pressed the key, providing an Internet protocol message to a VoIP service provider system and a broadband service provider system.

58. The method as defined in claim 51, wherein the first telephonic destination is a fixed phone.

59. The method as defined in claim 51, wherein the first telephonic destination includes an analog phone and an analog telephone adapter.

60. The method as defined in claim 51, wherein the first telephonic destination sends voice communications over a broadband connection in packets using an Internet protocol.

61. The method as defined in claim 51, the method further comprising providing a call notification to a networked computer associated with the called party while the first call is in progress.

62. The method as defined in claim 51, wherein the call processing system communicates with a call session server associated with a carrier when processing the first call.

63. The method as defined in claim 51, wherein the call processing system communicates with a media gateway associated with a carrier when processing the first call.

64. The method as defined in claim 51, wherein the first call is a forwarded call.

65. The method as defined in claim 51, wherein the first phone address has been number ported to the call processing system.

66. The method as defined in claim 51, wherein the first phone address of the called party is an E.164 telephone number.

67. The method as defined in claim 51, wherein the second call originates over a Voice over Internet Protocol (VoIP) network.

68. The method as defined in claim 51, wherein the second call originates over a wireless mobile switching center.

69. The method as defined in claim 51, wherein the second call from the call processing system is to a destination phone address different than the first phone address called by the caller in the first call.

70. The method as defined in claim 51, wherein the called party is a registered subscriber of at least a first service offered by the call processing system.

71. The method as defined in claim 51, wherein the caller hears a ringback tone selected by the called party.

72. The method as defined in claim 51, wherein the caller is prompted to disclose identification information if the caller's caller ID is blocked or restricted.

73. The method as defined in claim 51, the method further comprising providing an audible notification to the called party via at least one telephonic device while the called party is in communication with the calling party via the at least one telephonic device, wherein the audible notification is not transmitted to the calling party and the audible notification is related to call time.

74. A method of processing calls, the method comprising:
receiving over a network at a call processing system a first call from a caller directed to a called party;
providing a greeting to the caller via the call processing system;
receiving a voice communication from the caller at the processing system;
streaming at least a first portion of the voice communication via the call processing system in substantially real time to a first telephonic device having a broadband connection and associated with the called party while ensuring that sound does not travel back to the caller from the first telephonic device to thereby allow the called party to screen the call from the first telephonic device while the caller is unaware that their call is being screened;
determining a current physical location of the called party based at least in part on GPS (Global Positioning Satellite) location information and/or latitude and longitudinal information indicating the called party's current geographic location;
identifying a second telephonic device and/or a networked computer in geographic proximity with the called party based at least in part on the determined physical location of the called party and a record of phone address destinations associated with the called party; and
providing, during the first call, a first user interface via the first telephonic device, wherein if the called party provides a first user interface input, the first input is then received at the call processing system using an Internet protocol and indicates that the called party wants to transfer the first call to a device other than the first telephonic device, and at least partly in response to receiving an indication from the called party during the first call via the first user interface that the called party wants the first call to be transferred, providing, during the first call, a second user interface enabling the called party to select a call transfer destination from a set of destinations, and at least partly in response to receiving a selection by the called party of a destination from the set of destinations during a first period of time, the first period of time occurring during the first call, transferring the first call to the destination selected by the called party, and if the called party does not select the call transfer destination from the set of destinations during the first period of time, the first period of time occurring during the first call, causing, at least in part, full duplex communication between the caller and the identified second telephonic device or the networked computer in geographic proximity with the called party.

75. The method as defined in claim 74, wherein the network over which the call processing system receives the first call is a Voice over Internet Protocol (VoIP) network.

76. The method as defined in claim 74, wherein the call processing system receives a SIP Invite message associated with the first call from a SIP proxy.

77. The method as defined in claim 74, wherein the call processing system transmits a SIP Invite message associated with the first call to a broadband service provider softswitch.

78. The method as defined in claim 74, the method further comprising receiving an indication that the called party pressed a key on the first telephonic device via a SIP Info message from a softswitch.

79. The method as defined in claim 74, the method further comprising receiving an indication that the called party pressed a key on the first telephonic device via an Internet protocol message, and at least partly in response, causing a call transfer to another communication device to be performed.

80. The method as defined in claim 74, the method further comprising receiving an indication that the called party pressed a key on the first telephonic device via an Internet protocol message, and at least partly in response, causing a call conference with another party to be performed.

81. The method as defined in claim 74, the method further comprising:
receiving over a data network an indication that the called party pressed a key on the first telephonic device; and
at least partly in response to receiving the indication that the called party pressed the key, providing an Internet protocol message to a VoIP service provider system and a broadband service provider system.

82. The method as defined in claim 74, wherein the first telephonic device is a fixed phone.

83. The method as defined in claim 74, wherein the first telephonic device includes an analog phone and an analog telephone adapter.

84. The method as defined in claim 74, wherein the first telephonic device sends voice communications over a broadband connection in packets using an Internet protocol.

85. The method as defined in claim 74, wherein the first call is a forwarded call.

86. The method as defined in claim 74, wherein the first phone address has been number ported to the call processing system.

87. The method as defined in claim 74, wherein the first phone address is an E.164 telephone number.

88. The method as defined in claim 74, wherein the call processing system originates a second call over a Voice over Internet Protocol (VoIP) network at least partly in response to an indication that the called party pressed a key on the first telephonic device, wherein the key press indication is received using an Internet protocol message.

89. The method as defined in claim 88, wherein a signaling protocol associated with the second call includes SIP signaling.

90. The method as defined in claim 74, wherein the Internet protocol is SIP.

91. The method as defined in claim 74, wherein the call processing system originates a second call over a wireless mobile switching center at least partly in response to an indication that the called party pressed a key on the first telephonic device, wherein the key press indication is received using an Internet protocol message.

92. The method as defined in claim 74, wherein the greeting played to the caller includes a greeting recorded by the called party.

93. The method as defined in claim 74, wherein a first user interface input is a key press generated tone command.

94. The method as defined in claim 74, wherein the first user interface includes a voice command input.

95. The method as defined in claim 74, wherein the called party is a registered subscriber of at least a first service offered by the call processing system.

96. The method as defined in claim 74, wherein at least part of the voice communication of the caller is recorded and stored on the call processing system and accessible to the called party.

97. The method as defined in claim 96, wherein at least part of the recorded voice communication is accessible via a telephonic device.

98. The method as defined in claim 74, wherein the caller hears a ringback tone selected by the called party.

99. The method as defined in claim 74, wherein the caller is prompted to disclose their caller ID if their caller ID is blocked or restricted.

100. The method as defined in claim 74, the method further comprising providing an audible notification to the called party via at least one telephonic device while the called party is in communication with the calling party via the at least one telephonic device, wherein the audible notification is not transmitted to the calling party and the audible notification is related to call time.

101. A system, comprising:
at least one computing device;
program instructions stored in non-transitory memory, that when executed by the at least one computing device, are configured to cause the at system to perform operations comprising:
receiving over a network a first call from a caller directed to a first phone address of a called party, wherein signaling information associated with the first call includes a phone address of the caller;
originating a second call from the call processing system to a first telephonic destination coupled to a data network and associated with the called party, wherein signaling information associated with the second call includes an identifier associated with the caller;

providing a first user interface via a first telephonic device associated with the first telephonic destination;

enabling the called party to screen the caller via the first telephonic destination prior to receiving a first input by the called party via the first user interface, the first input causing at least in part full duplex communication between the caller and the called party;

determining a current physical location of the called party based at least in part on:

GPS (Global Positioning Satellite) location information, and/or latitude and longitudinal information indicating the called party's current geographic location;

identifying a second telephonic device and/or a networked computer in geographic proximity with the called party based at least in part on the determined physical location of the called party and a record of phone address destinations associated with the called party; and providing, during the first call, a second user interface via the first telephonic device, the second user interface enabling the called party to indicate that the first call is to be transferred to a device different than the first telephonic device, and at least partly in response to receiving an indication from the called party during the first call via the second user interface indicating that the called party wants the first call to be transferred, providing, during the first call, a third user interface enabling the called party to select a call transfer destination from a set of destinations, and at least partly in response to receiving a selection by the called party of a destination from the set of destinations within a first period of time, the first period of time occurring during the first call, transferring the first call to the destination selected by the called party, and if the called party does not select the call transfer destination during the first period of time, the first period of time occurring during the first call, and causing, at least in part, the caller and the identified second telephonic device and/or the networked computer in geographic proximity with the called party to be connected with full duplex communication.

102. The system as defined in claim 101, wherein the network via which the call processing system receives the first call is a Voice over Internet Protocol (VoIP) network.

103. The system as defined in claim 101, the operations further comprising enabling the called party to screen the caller via the first telephonic destination using a half-duplex connection.

* * * * *